INVENTORS
H. C. A. VAN DUUREN
H. DA SILVA
W. F. BROK
BY Hugh A. Kirk
ATTORNEY

July 22, 1969 H. C. A. VAN DUUREN ET AL 3,457,373
AUTOMATIC CHANNEL SWITCHING DEVICE FOR MULTI-CHANNEL
BINARY CODE TELECOMMUNICATION SYSTEM
Filed Sept. 22, 1965 33 Sheets-Sheet 2

GENERAL VIEW

INVENTORS
H. C. A. VAN DUUREN
H. DA SILVA
W. F. BROK
BY [signature]
ATTORNEY

INVENTORS
H. C. A. VAN DUUREN
H. DA SILVA
W. F. BROK
BY
Hugh A. Kirk
ATTORNEY

BY

INVENTORS
H. C. A. VAN DUUREN
H. DA SILVA
W. F. BROK

Hugh A. Kirk
ATTORNEY

INVENTORS
H. C. A. VAN DUUREN
H. DA SILVA
W. F. BROK
BY
Hugh A. Kirk
ATTORNEY

INVENTORS
H. C. A. VAN DUUREN
H. DA SILVA
W. F. BROK
BY
Hugh A. Kirk
ATTORNEY

INVENTORS
H. C. A. VAN DUUREN
H. DA SILVA
W. F. BROK

BY Hugh A. Kirk
ATTORNEY

INVENTORS
H. C. A. VAN DUUREN
H. DA SILVA
W. F. BROK
BY Hugh A. Kirk
ATTORNEY

INVENTORS
H. C. A. VAN DUUREN
H. DA SILVA
W. F. BROK
BY
Hugh A. Kirk
ATTORNEY

July 22, 1969 H. C. A. VAN DUUREN ET AL 3,457,373

AUTOMATIC CHANNEL SWITCHING DEVICE FOR MULTI-CHANNEL BINARY CODE TELECOMMUNICATION SYSTEM

Filed Sept. 22, 1965 33 Sheets-Sheet 10

INVENTORS
H. C. A. VAN DUUREN
H. DA SILVA
W. F. BROK

BY

Hugh A. Kirk
ATTORNEY

INVENTORS
H. C. A. VAN DUUREN
H. DA SILVA
W. F. BROK
BY
Hugh A. Kirk
ATTORNEY

INVENTORS
H. C. A. VAN DUUREN
H. DA SILVA
W. F. BROK
BY
Hugh A. Kirk
ATTORNEY

INVENTORS
H. C. A. VAN DUUREN
H. DA SILVA
W. F. BROK
BY
Hugh A. Kirk
ATTORNEY

INVENTORS
H. C. A. VAN DUUREN
H. DA SILVA
W. F. BROK
BY
Hugh A. Kirk
ATTORNEY

INVENTORS
H. C. A. VAN DUUREN
H. DA SILVA
W. F. BROK
BY
Hugh A. Kirk
ATTORNEY

INVENTORS
H. C. A. VAN DUUREN
H. DA SILVA
W. F. BROK
BY
*[signature]*
ATTORNEY

| | ZM | ZL | ZK |
|---|---|---|---|
| 0 | 0 | 0 | 0 |
| 1 | 0 | 0 | 1 |
| 2 | 0 | 1 | 0 |
| 3 | 0 | 1 | 1 |
| 4 | 1 | 0 | 0 |
| 5 | 1 | 0 | 1 |
| 6 | 1 | 1 | 0 |
| 7 | 1 | 1 | 1 |

| | ZH | ZJ |
|---|---|---|
| β | 0 | 1 |
| ADDRESS | 1 | 0 |
| TRAFFIC | 1 | 1 |
| α | 0 | 0 |

INVENTORS
H. C. A. VAN DUUREN
H. DA SILVA
W. F. BROK
BY
Hugh A. Kirk
ATTORNEY

July 22, 1969 H. C. A. VAN DUUREN ET AL 3,457,373

AUTOMATIC CHANNEL SWITCHING DEVICE FOR MULTI-CHANNEL BINARY CODE TELECOMMUNICATION SYSTEM

Filed Sept. 22, 1965 33 Sheets-Sheet 18

INVENTORS
H. C. A. VAN DUUREN
H. DA SILVA
W. F. BROK

BY Hugh A. Kirk

ATTORNEY

PROGRAM COUNTER CIRCUIT PZ

INVENTORS
H. C. A. VAN DUUREN
H. DA SILVA
W. F. BROK

BY *Hugh A. Kirk*

ATTORNEY

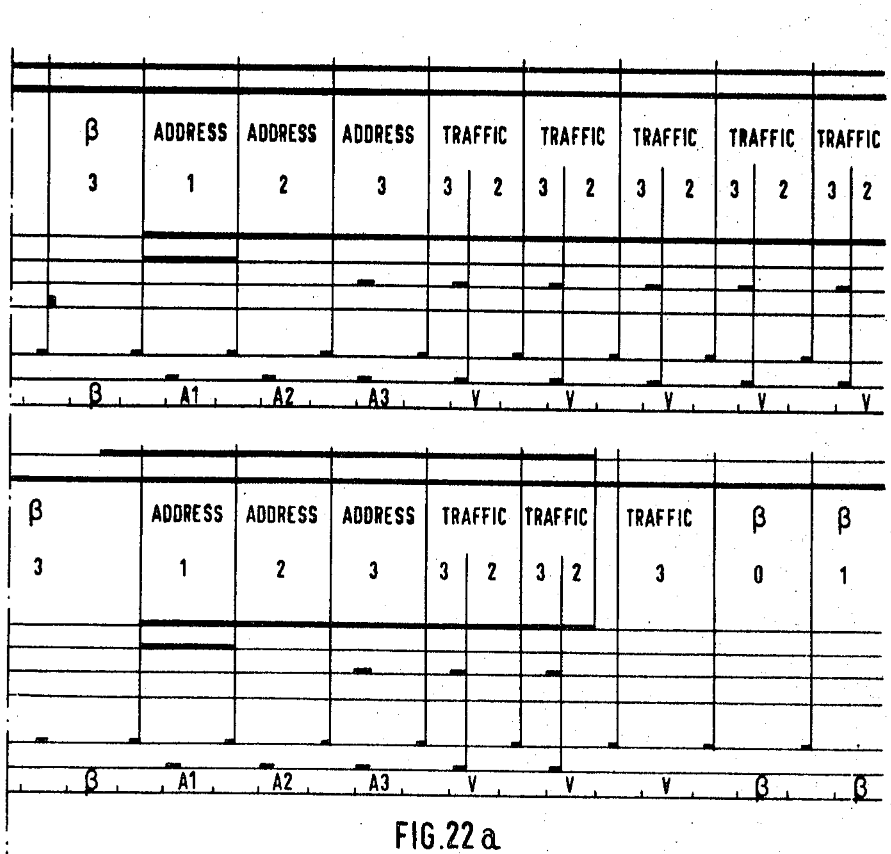
FIG. 22a
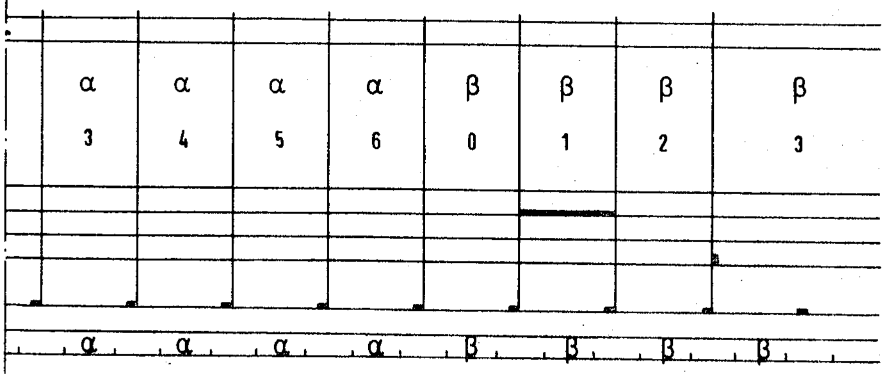
FIG. 22'a
INVENTORS
H. C. A. VAN DUUREN
H. DA SILVA
W. F. BROK
BY
Hugh A Kirk
ATTORNEY INVENTORS
H. C. A. VAN DUUREN
H. DA SILVA
W. F. BROK
BY Hugh A. Kirk
ATTORNEY

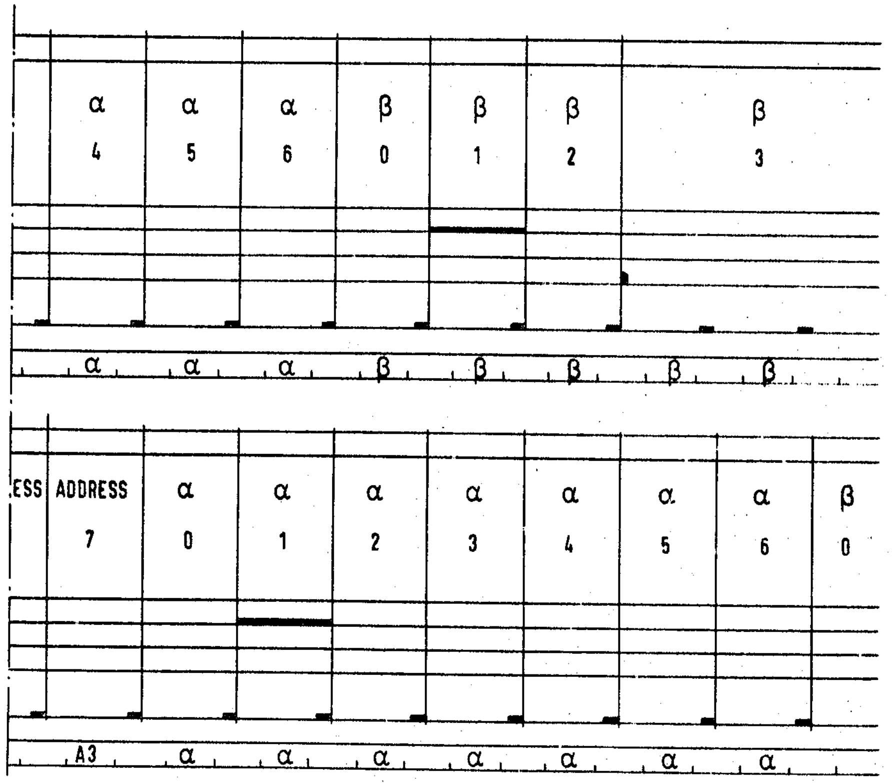
FIG. 23 a
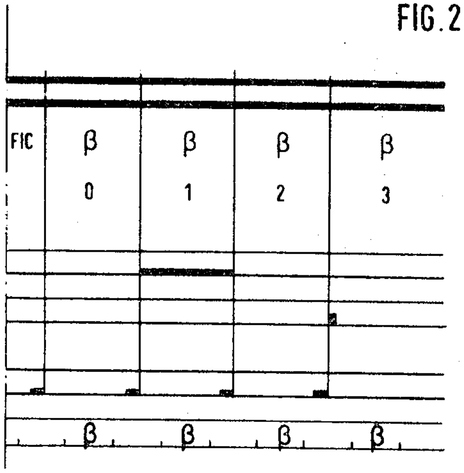
FIG. 23' a
INVENTORS
H. C. A. VAN DUUREN
H. DA SILVA
W. F. BROK
BY Hugh A. Kirk
ATTORNEY

*INVENTORS*
H. C. A. VAN DUUREN
H. DA SILVA
W. F. BROK

BY [signature]

ATTORNEY

INVENTORS
H. C. A. VAN DUUREN
H. DA SILVA
W. F. BROK
BY
Hugh A. Kirk
ATTORNEY

July 22, 1969 H. C. A. VAN DUUREN ET AL 3,457,373

AUTOMATIC CHANNEL SWITCHING DEVICE FOR MULTI-CHANNEL BINARY CODE TELECOMMUNICATION SYSTEM

Filed Sept. 22, 1965 33 Sheets-Sheet 25

INVENTORS
H. C. A. VAN DUUREN
H. DA SILVA
W. F. BROK

BY [signature]

ATTORNEY

INVENTORS
H. C. A. VAN DUUREN
H. DA SILVA
W. F. BROK

BY Hugh A. Kirk

ATTORNEY

INVENTORS
H. C. A. VAN DUUREN
H. DA SILVA
W. F. BROK
BY Hugh Kirk
ATTORNEY

INVENTORS
H. C. A. VAN DUUREN
H. DA SILVA
W. F. BROK

BY Hugh A. Kirk

ATTORNEY

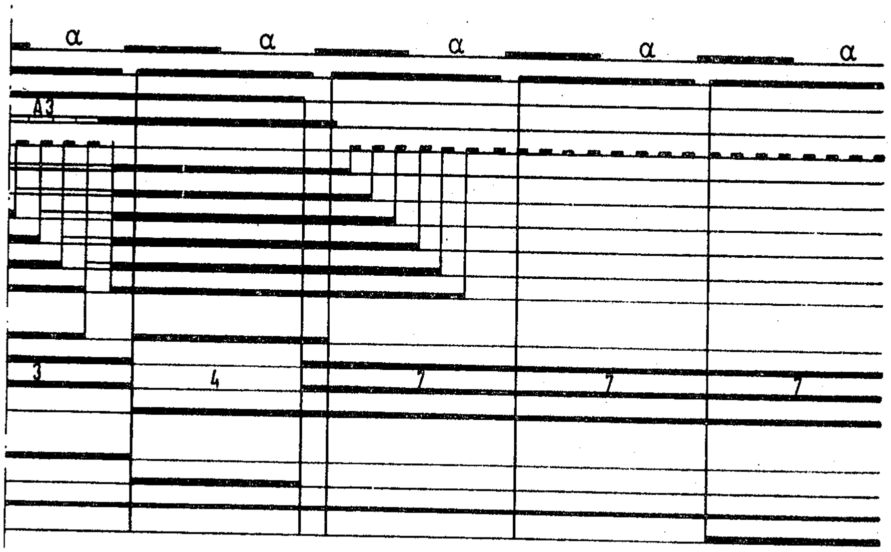
FIG. 29a
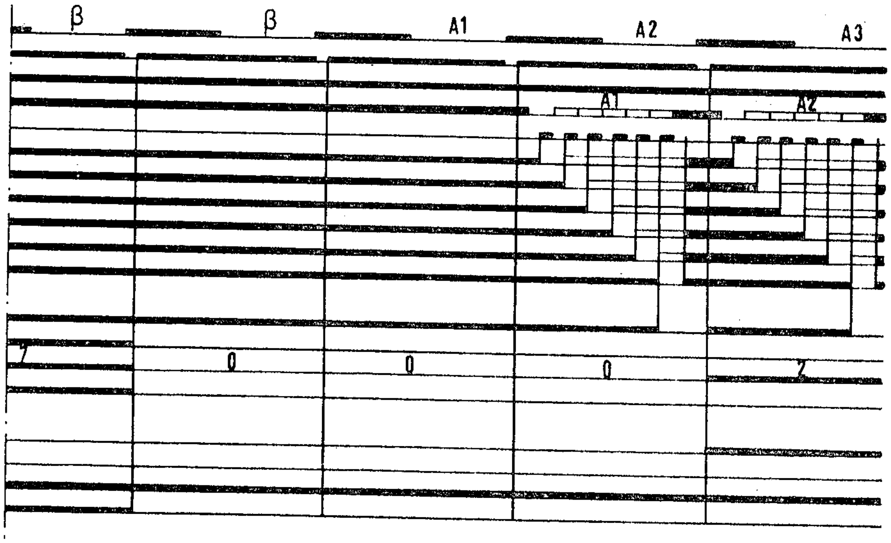
FIG. 29'a
INVENTORS
H. C. A. VAN DUUREN
H. DA SILVA
W. F. BROK
BY
Hugh A. Kirk
ATTORNEY

INVENTORS
H. C. A. VAN DUUREN
H. DA SILVA
W. F. BROK

BY [signature]

ATTORNEY

INVENTORS
H. C. A. VAN DUUREN
H. DA SILVA
W. F. BROK
BY
Hugh A Kirk
ATTORNEY

INVENTORS
H. C. A. VAN DUUREN
H. DA SILVA
W. F. BROK
BY
Hugh A. Kirk
ATTORNEY

INVENTORS
H. C. A. VAN DUUREN
H. DA SILVA
W. F. BROK
BY
Hugh A. Kirk
ATTORNEY 3,457,373
Patented July 22, 1969

3,457,373

AUTOMATIC CHANNEL SWITCHING DEVICE FOR MULTI-CHANNEL BINARY CODE TELECOMMUNICATION SYSTEM

Hendrik Cornelis Anthony Van Duuren, Wassenaar, Herman Da Silva and Wilhelm Frederik Brok, Voorburg, Netherlands, assignors to De Staat der Nederlanden, Ten Deze Vertegenwoordigd Door de Directeur-Generaal der Posterijen, Telegrafie en Telefonie, The Hague, Netherlands Filed Sept. 22, 1965, Ser. No. 489,318
Int. Cl. H04m 3/32; H04j 1/16
U.S. Cl. 179—15 30 Claims

ABSTRACT OF THE DISCLOSURE

A flexible automatic switching system between the binary code or telegraph telex (TEX) panels in an exchange and the automatic error correcting by means of automatic repetition radio or wire link (ARQ or TOR) channels, enabling the inner connection of any one of the simplex TEX panels to any available and efficient duplex TOR channel, including: transmitting programming circuits for each TEX panel; receiving programming circuits for each TOR channel; separate selecting switches including electronic time division pulse phase types switches controlled by each programming circuit; and efficiency or quality testing means, such as counting the number of errors in a predetermined time, of each TOR channel and controlling allocator means for automatically switching to another TOR channel if and when a transmitting TOR channel becomes inefficient or of insufficient quality. Also means are provided for automatically interrupting a message in a TOR channel just long enough to transmit disconnect signals in the event no remaining free and efficient TOR channel is available.

BACKGROUND OF THE INVENTION

In prior automatic error correcting multi-channel telecommunication systems over wire or radio links there was required a separate adapter such as a telex-panel hereinafter called a TEX-panel for each radio-channel such as an ARQ-channel, hereinafter called a TOR-channel, with for instance, each TEX-panel being the connecting link for controlling its associated TOR-channel from the telegraph or telex exchange. A telex-panel is a panel for telex service as defined on page 4 Article 01.15 of the "List of Definitions of Essential Telecommunication Terms" published by the International Telecommunication Union in Geneva June 1957; and an ARQ-channel is a channel as defined on page 234 Article 33.34 of the same "List of Definitions."

SUMMARY OF THE INVENTION

Generally speaking, the apparatus of this invention comprises a switching device between an adapter for panel circuits and channel circuits of a wire and/or radio communication system, with circuits at each of two spaced stations for connecting such adapters or TEX-panels with such channels or TOR-circuits, and vice versa. The adapter for the panel circuits include TEX-panel or Telex circuits, which may be connected to exchanges, offices, users, subscribers, data transmission devices, or the like. The channel circuit systems include ARQ or TOR-systems, automatic error correcting telegraph systems, AGC telephone systems, and also systems for satellite communication by either pulse time or space division communication systems. Each such adapter or simplex panel circuit it connectable to the FLEX-system switching device of this invention by means of an input terminal or source, and by means of the output terminal or sink, corresponding to a calling and called subscriber, respectively, so that each such adapter or panel circuit includes a transmitting part and a receiving part. On the other hand, each channel or TOR-circuit is a duplex circuit including a transmitting part and a receiving part and is connectable to any one of the adapter or panel circuits at its corresponding station. The number of adapter circuits and channel circuits at each station are greater than one, but need not necessarily be the same number, that is, there may be more channels than panels, or vice versa, but each of the two communication stations have the same number of channel circuits, since the channel circuits are directly connected to each other over the telecommunication TOR or ARQ link.

The switching device of the FLEX-system of this invention enables the interconnection of any one of the simplex TEX-panels to any available and efficient duplex TOR-channel, as well as automatically switches to another available and efficient channel circuit in the case the channel over which a transmission is being made becomes inefficient during the transmission. In addition, in the event that all of the channel circuits are either occupied or inefficient, so that such a switch-over cannot be made, automatic means are also provided for interrupting a message which is being transmitted over an occupied and efficient channel, just long enough to send a signal to the remote station to disconnect the panel that is connected to the channel which just has become inefficient and/or to send a disconnect or busy signal back to the sending or calling simplex TEX-panel so it can also be disconnected.

The switching device of the FLEX-system of this invention generally comprises: a transmitting programming circuit connected to each of the transmitting parts of each TEX-panel or adapter, a first selecting switch means controlled by the transmitting programming circuit which is connected to each of the transmitting parts of all of the TOR-channels at one station; a receiving programming circuit connected to each of the receiving parts of each TOR-channel at this station, a second selecting switch means controlled by the receiving programming circuit which is connected to each of the receiving parts of the TEX-panel circuits at this one station; and a separate efficiency testing means connected between the receiving part and to said first selecting switch of the transmitting programming circuit for indicating to the transmitting programming circuit which ones of the channels are efficient and which ones are inefficient.

The selection switch means, both at the transmitting and receiving parts, of the switching device of this FLEX-system may be of the multi-contact step-by-step, rotary, mechanical, cross-bar, ferrite type, or electronic type switches, including phase or time-division pulse switching wherein a phase pulse generator circuit may be employed that is common for all of the selection switching means at one station. In such a phase or time-division switching means, each of the separate panels and channels have a binary code number corresponding to each phase-time division, which binary code number also may be the address of the called panel. Thus according to such a time-division selection system, the transmitting programming switch selector circuit selects, according to a time-phase, the TOR-channel which is available and efficient, and then transmits over this channel a binary code number or address corresponding to the time-phase number of the connection for the particular TEX-panel which is sought for the connection. Once this address is correctly received, a connection is set up between the calling and called TEX-panels which permits the transmission of message signals during the particular selected phases or time-divisions each cycle, which correspond to the phase number of the available and efficient TOR-channel at the transmitting station, and which correspond to the phase number or address of the called TEX-panel at the receiving station. There is no necessity for selecting a TOR-channel at the remote station because the TOR-channel selected for transmission at the sending or calling station is automatically connected to the same TOR-channel at the remote station through the ARQ or TOR system. Accordingly each first transmitting programming circuit has an address generator corresponding to the binary code number of each of its associated TEX-panels, which numbers correspond to the phase or time division binary code numbers for the corresponding TEX-panels at the called or remote station, so that TEX-panel No. 1 in station A will always be connected to TEX-panel No. 1 in the remote station B, TEX-panel No. 2 in station A will always be connected to TEX-panel No. 2 in station B, etc.

More specifically, this phase or time division switching embodiment comprises at each station a common high frequency oscillator or generator which, through trigger circuits and a clock pulse generator, divides the five millisecond time for each telegraph signal into a plurality of pulse time divisions corresponding to the number of TEX-panels or TOR-channels, whichever is greater. However, usually the number is the same at each station. This clock pulse generator then not only controls the rest of the circuits at this station but also controls a pulse phase distributor which may comprise a plurality of trigger circuits for counting according to a binary code.

In addition there also is provided a channel allocator circuit for indicating which channels are busy, which channels are efficient, and means for interrupting a channel for transmitting a shut-off or release signal, in the event the last occupied channel becomes inefficient and there are no other free channels in which to indicate that the simplex TEX-panels at both stations must be disconnected. This channel allocator circuit may control a pulse phase register in which the allotted or selected phase of the TOR-channel over which the signals are to be transmitted is registered, such as by steady state trigger circuits. This pulse phase register may be connected to OR, NAND and NOR gates of a pulse phase comparator circuit for controlling which phase or time division of each distributor cycle the signals to be transmitted are connected to the proper TOR-channel.

Further associated with the transmitting programming circuit is a transmitter program counter circuit, which controls the repetition of the idle time and closing signals as well as the repetition of the address signals, for different given numbers of times, in order to insure their proper reception at the remote station.

The receiving programming circuits connected to each TEX-panel and TOR-channel may comprise in this phase or time-division embodiment of the FLEX-system of this invention, a plurality of step or shift registers in which each element of a multi-element address signal is successively stored as it is received from its associated TOR-channel. The first signals of each message received are the successive address signals, which are transferred to an address processor which may comprise pulse phase registers and a comparator circuit, in which two out of the three addresses which are received are compared, and if two are identical the circuit is permanently connected by means of an additional program counter receiver circuit for controlling gates in the connecting circuit to the corresponding TEX-panel. A second comparator circuit is also provided for setting up the binary code phase number of the address signal, so that only the following signals received during that numbered phase each cycle of the distributor will be passed on to that TEX-panel.

Furthermore there may be provided a common time base circuit for the efficiency testers, which time base circuit may be controlled by the pulse phase distributor at each station for measuring or counting predetermined intervals of time. These time intervals may then be employed in each efficiency tester circuit connected to the automatic error correcting or ARQ circuit of its associated TOR-channel, each of which efficiency tester circuits may comprise a counting circuit which counts the number of errors which occur in one of these periods of time, and if a predetermined number does occur within such said period of time the channel is then automatically considered to be inefficient or of insufficient quality. Each tester circuit also may comprise a manual switch for varying the efficiency or quality as desired, as well as additional means for increasing the efficiency or quality of the channel before it may be switched in again as being considered efficient after it has once been disconnected as being inefficient, such as for example, requiring a half or a quarter the number of errors within the set predetermined time before the channel is considered to be efficient again for use.

There also may be provided an intermediate connecting circuit which may comprise amplifiers and/or trigger circuits for connecting the connecting circuits of the TEX-panels with the TOR-channels, and vice versa.

In operation, the address is sent each time the channel condition changes from a no-information to an information sending condition, said condition changes being when the channel changes from (1) free time to idle time, (2) from idle time to traffic, and (3) from idle time to free time. The only other change is from traffic to idle time, and then an address need not be sent because idle time is another type of information transmission. Thus when the present FLEX-system automatically transmits idle time signals, such indicates a channel's availability for more traffic, and if more traffic is not soon proceeding, the present FLEX-system automatically disconnects that channel until traffic is available therefor. Accordingly, as soon as any telex subscriber which is connected to the present FLEX-system initiates a message, such initiation is transmitted immediately through the corresponding TEX-panel to the switching device of this invention to automatically select an available and efficient TOR-channel and place that selected channel on idle time for a predetermined period of time before disconnecting it, during which period of time the traffic from the subscriber must proceed, and if it does not proceed within this period, the channel automatically disconnects to be available for another subscriber that is ready to send a message or traffic. Thus the TEX-panels are not directly associated with the corresponding TOR-channels, but are associated therewith only through the switching device of this invention which then selects any one of the multi-TOR-channels which is available and efficient for communication and transmits thereover an address for the corresponding TEX-panel at the remote station. This available and efficient TOR-channel is first temporarily reserved or blocked when the first address signal is transmitted thereover, and then it is definitely blocked after two out of three identically transmitted address signals are received, to lock the circuit in this position until the expected traffic is transmitted thereover, provided, of course, this traffic is commenced within the pre-set period of time before this channel is automatically released and made available for another traffic or telegraph circuit.

OBJECTS AND ADVANTAGES

It is an object of this invention to increase the efficiency and/or quality of the adapter panel connections over the multi-radio channels, or in other words, to increase the possible number of radio-channels over which a given message can be connected between two stations by a switching system to interlink a plurality of telegraph and/or telex circuits over a plurality of wire and/or radio links of ARQ or TOR-channels, which switching system is readily adaptable to present telegraph and/or telex-panels and TOR-channels.

Another object is to carry a plurality of telephone links over a plurality of radio channels in parallel as determined by FLEX-systems at the extremities of these channels controlled by efficiency testers, such as detecting the noise content on each channel on the radio paths.

Another object is to assign the go and return paths of an ARQ or TOR-channel to different telegraph and/or telex circuits, thereby doubling the capacity of said circuits which normally are simplex circuits, thus converting each channel into a dual simplex circuit.

Still another object is to enable automatic disconnecting of a TEX-panel from an ARQ or TOR-channel during information pauses and during free circuit periods, that is, when idle time signals are being transmitted over the TOR-channel, thus making the TOR-channel available for the transmission of information from another TEX-panel or connectable to another TEX-panel at each end or station between which the communication is being made.

Another object is to switch a given TEX-panel to another TOR-channel when the efficiency or quality of the TOR-channel to which it is connected falls below a predetermined minimum or limit, thereby increasing the efficiency and quality of the communication of the system and safeguarding against useless charges to the subscribers thereof connected to the TEX-panels.

A further object is to automatically require the efficiency of a once determined inefficient circuit to become more efficient or of higher quality than it was before, before it will be considered to be sufficiently efficient for further message signals.

Another object of this invention is to automatically interrupt an efficient TOR-channel for a sufficient time to inform another channel at a remote station to cut off when no other unoccupied and efficient channel is available for an incompleted message because of inefficiency which developed during its transmission.

Another object is to repeat idle time and/or disconnect signals a predetermined number of times to safeguard against their erroneous reception and to insure that at least some of these signals are received to provide the necessary control for indicating the availability or disconnection of a particular TOR-channel.

Still another object is to provide an adequate delay when all TOR-channels are inefficient, to indicate unavailability of a TOR-channel to a calling TEX-panel.

Another object is to employ in the FLEX-system switching devices of this invention a special address repeated three times for connecting corresponding TEX-panels at each station for the routing of traffic over available TOR-channels, and wherein the address of each of the TEX-panels is the binary code number of the phase or time division corresponding to that TEX-panel, so that no code conversion is required, and so that the message signals are transmitted and received only during that phase division each cycle corresponding to the proper binary code address or time division number for the called TEX-panel.

BRIEF DESCRIPTION OF THE DRAWINGS

The above mentioned and other features and objects of this invention and the manner of attaining them will become more apparent and the invention itself will be understood best by reference to the following description of embodiments of the invention taken in conjunction with the accompanying drawings, wherein:

FIGS. 22, 22*a*, 22′ *and* 22′*a* is a time diagram of the operation of the programming circuit of FIG. 20 for the normal starting through to the finishing of the transmission of a message;

FIGS. 23, 23*a*, 23′ and 23′*a* are three separate time diagrams of the operation of the programming circuit of FIG. 20 for three different ways of terminating a TEX-panel connection;

FIG. 15 is a schematic wiring diagram of the pulse phase register and the pulse comparator circuit, as shown by blocks in FIG. 4 or FIG. 5;

FIGS. 27, 27*a*, 28, 28*a*, 29, 29*a*, 29′, 29′*a*, 30, 31 and 32 are time diagrams of the operation of the address processor, pulse phase register, pulse phase comparator, and program counter circuits of the TOR-channel parts of the receiver programming circuit shown in FIG. 4 or FIG. 5 and FIGS. 24, 25 and 26; wherein FIGS. 27 and 27*a* represent the reception of an address followed by idle time; FIGS. 28 and 28*a* represent the reception of an address followed by traffic; FIGS. 29, 29*a*, 29′ and 29′*a* represent the transfer of a release signal.

DETAILED DESCRIPTION OF PREFERRED EMBODIMENTS

The detailed description of the FLEX-system switching device circuits and their functions according to this invention will be described in accordance with the following outline:

I. Flex-System General Circuits (FIGS. 1–6)

Figure 6:
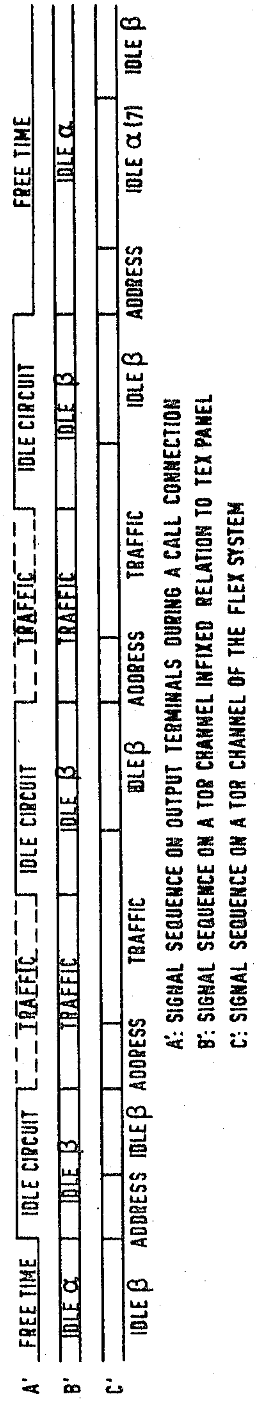
FIG. 6 is a schematic time diagram comparing two prior art type signal sequences which occur between the two telex subscribers with the signal sequence between such subscribers according to the FLEX-system of this invention.

(1) Switching Device (FIG. 2)
(2) Selector Switches (FIG. 3)
(3) Time-Division Selector Systems (FIGS. 4 and 5)
(4) Time-Division Selection in General (FIG. 6)

II. Pulse Generator Circuits (FIGS. 4–14)

Figure 14:
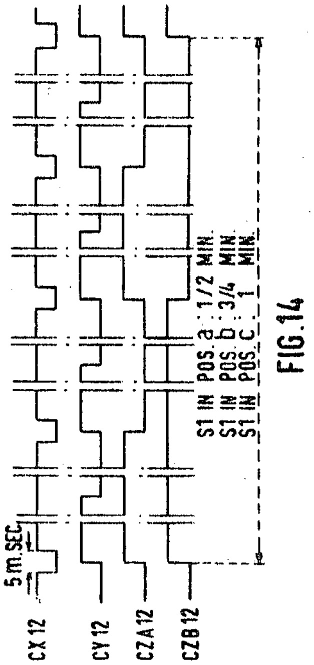
FIG. 14 is a time diagram of the output pulses generated by the time base circuit shown in FIG. 13.
Figure 11:
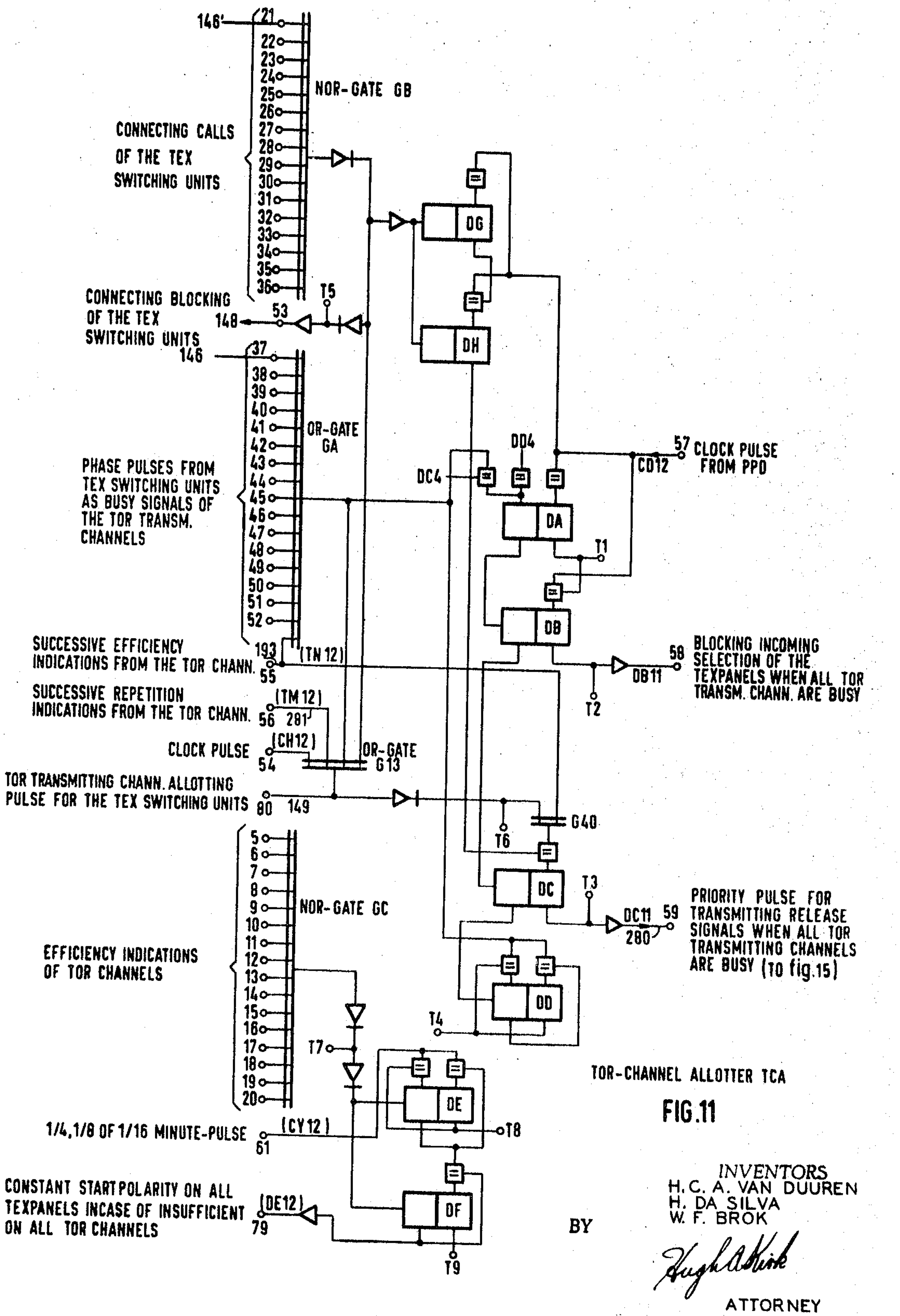
FIG. 11 is a schematic wiring diagram of the allotter circuit shown by a block in FIG. 4, or incorporated in the switching control block shown in FIG. 5, which allotter is connected to the phase distributor and to the connecting and disconnecting circuits.
Figures 12A, 13:
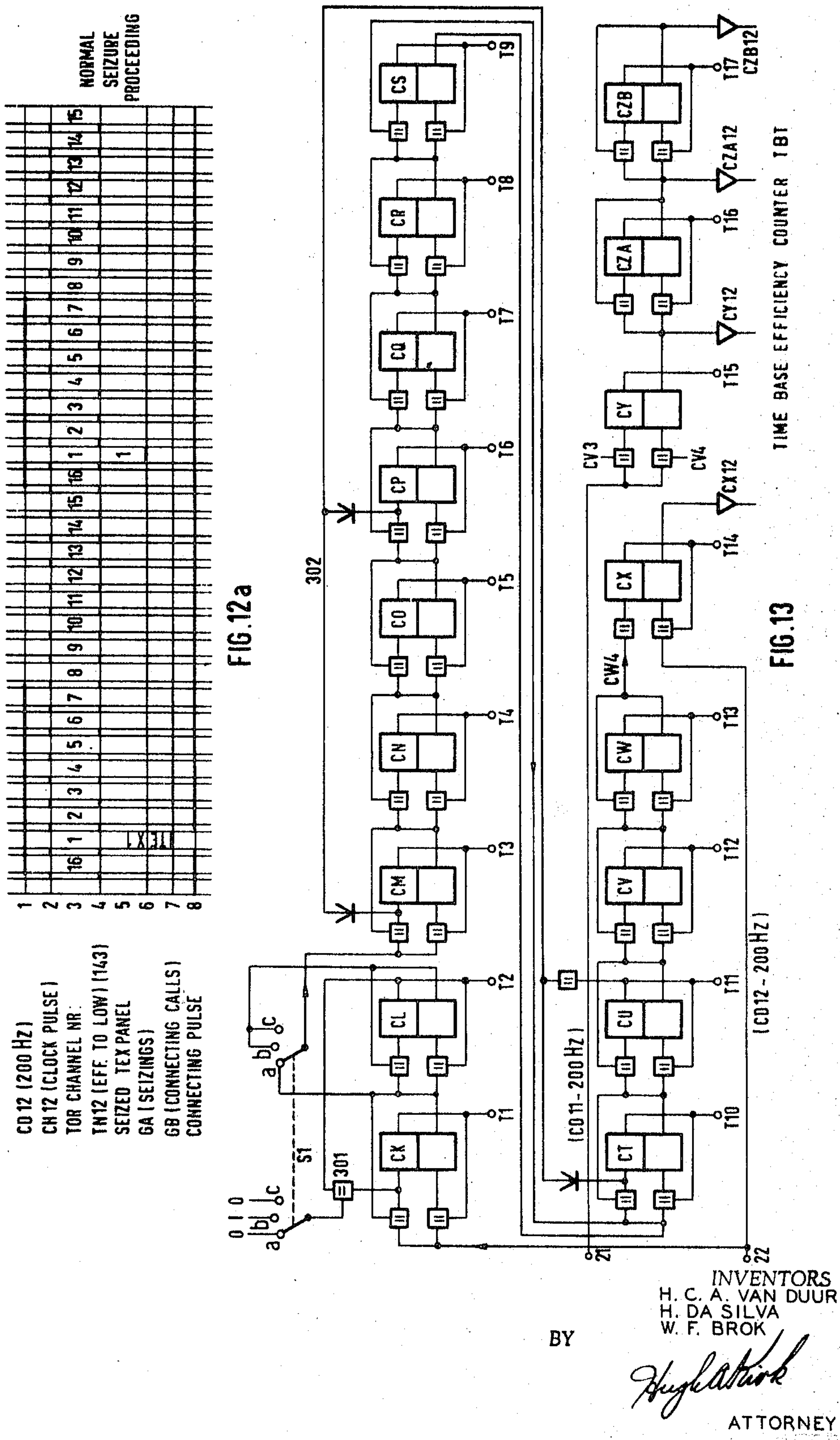
FIG. 12*a* is a time diagram of the pulses controlling and generated by the allotter circuit shown in FIG. 11 during the normal seizure of an available and efficient TOR-channel.
FIG. 13 is a schematic wiring diagram of the time base circuit for the efficiency tester, as shown by a block in FIG. 4 or FIG. 5.

(1) Clock Pulse Generator CPG (FIGS. 7, 7*a*, and 8*a*)
(2) Pulse Phase Distributor PPD (FIGS. 7 and 8*b*)
(3) Pulse Phase Selectors PPS (FIGS. 9, 9*a* and 10)
(4) TOR-channel Allotter TCA (FIGS. 11, 12*a* and 12*b*)
(5) Time Base Efficiency Counter TBT (FIGS. 13 and 14)

Figure 15:
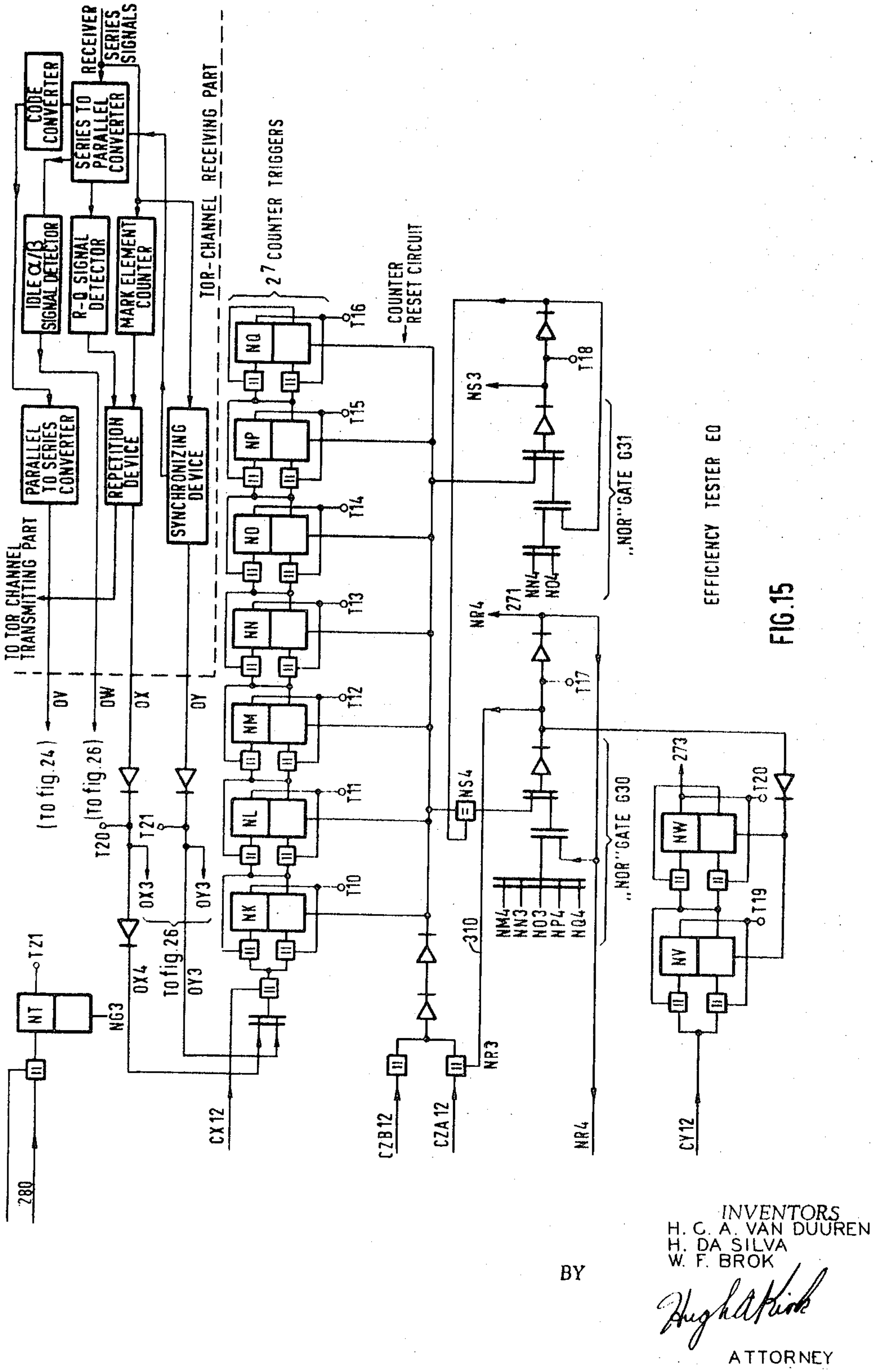
FIG. 15 is a schematic wiring diagram of one of the efficiency tester circuits, as shown by a block in FIG. 4, or FIG. 5 together with part of an associated TOR-channel receiving part.

II. Efficiency Tester EO (FIG. 15)

IV. Transmitting Part Programming Circuits (FIGS. 16–23)

Figures 17, 17A:
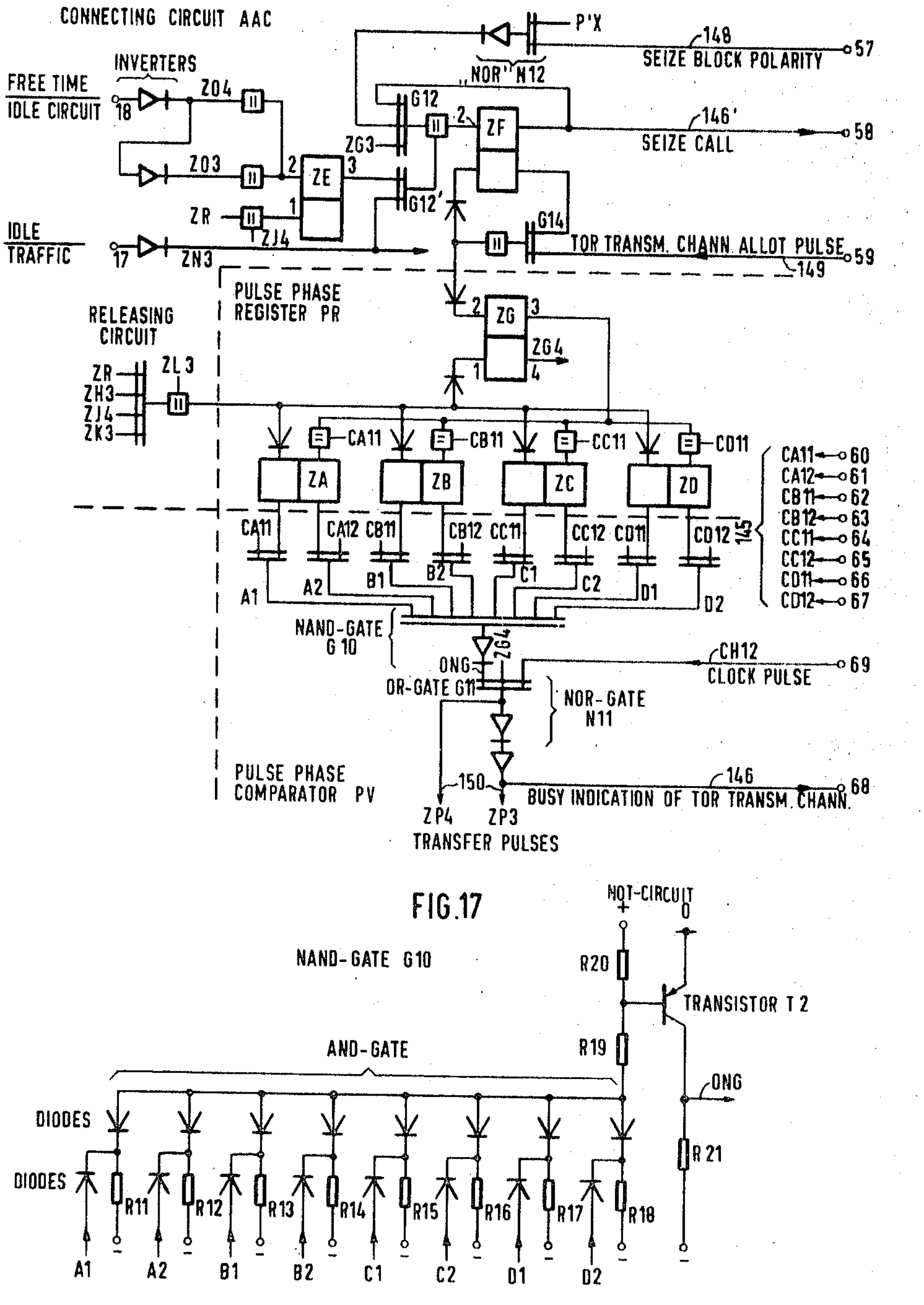
FIG. 17 is a schematic wiring diagram of the connecting and disconnecting circuit, pulse phase register, and pulse phase comparator circuits, as shown by separate adjoining blocks in FIG. 4 or FIG. 5.
FIG. 17*a* is a schematic wiring diagram of the NAND-gate shown in FIG. 17.
Figure 18A:
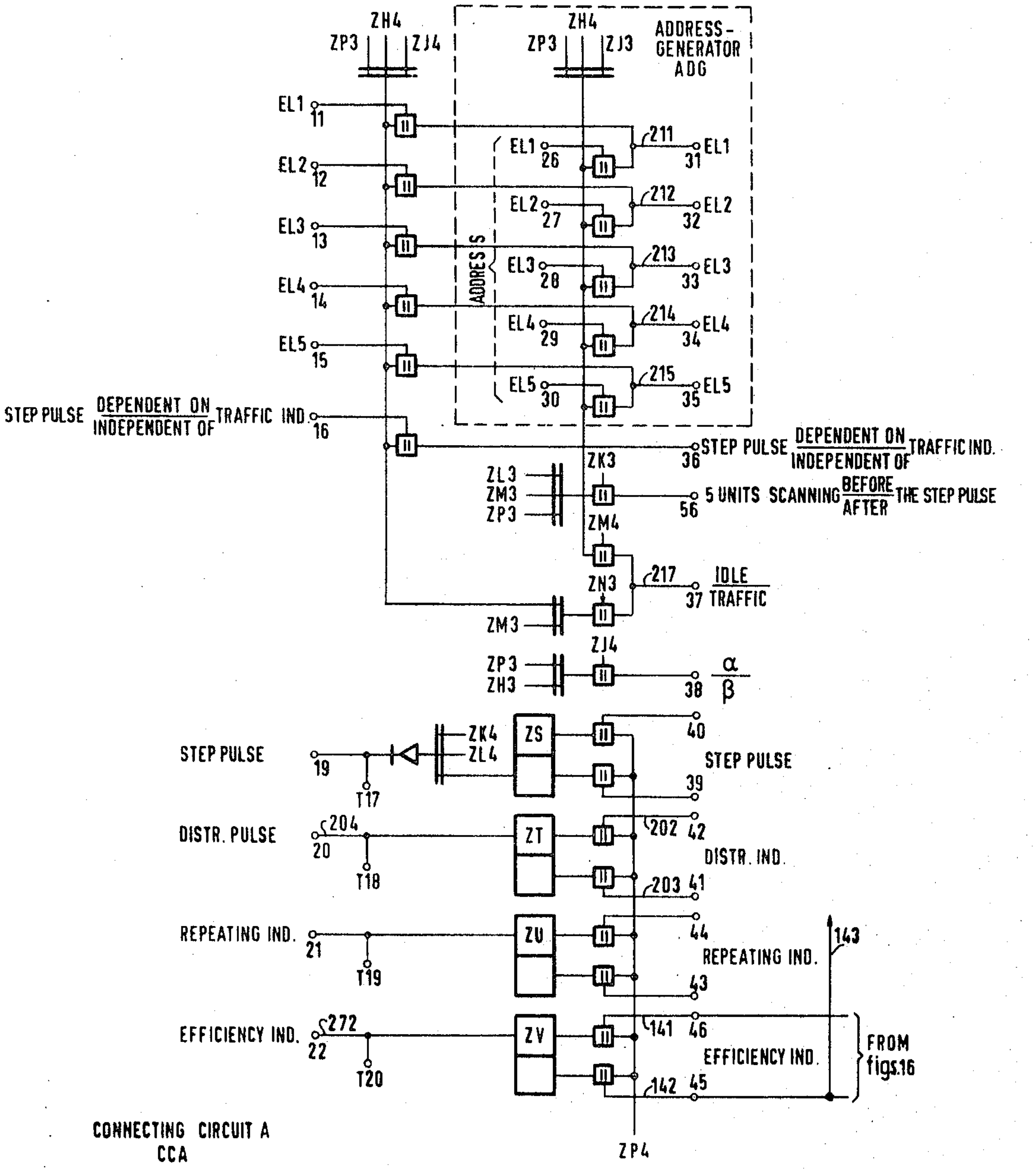
FIG. 18*a* is a schematic wiring diagram of the transmitting connecting and address generating circuits connected between the TEX-panel transmitter part and the connecting circuit to the TOR-channel transmitter part as shown by a block in FIG. 4 or FIG. 5.

(1) Connecting and Disconnecting Circuits AAC (FIG. 17)
(2) Transmitter Pulse Phase Register PR (FIG. 17)
(3) Transmitter Pulse Phase Comparator PV (FIGS. 17 and 17a)
(4) Transmitter Program Counter Circuit PZ (FIGS. 20, 21, 21′, 22 and 23)
(5) Address Generator ADG (FIG. 18*a*)
(6) Connecting Circuits A CCA (FIG. 18*a* )

V. Receiving Part Programming Circuits (FIGS. 24–32)

Figure 25:
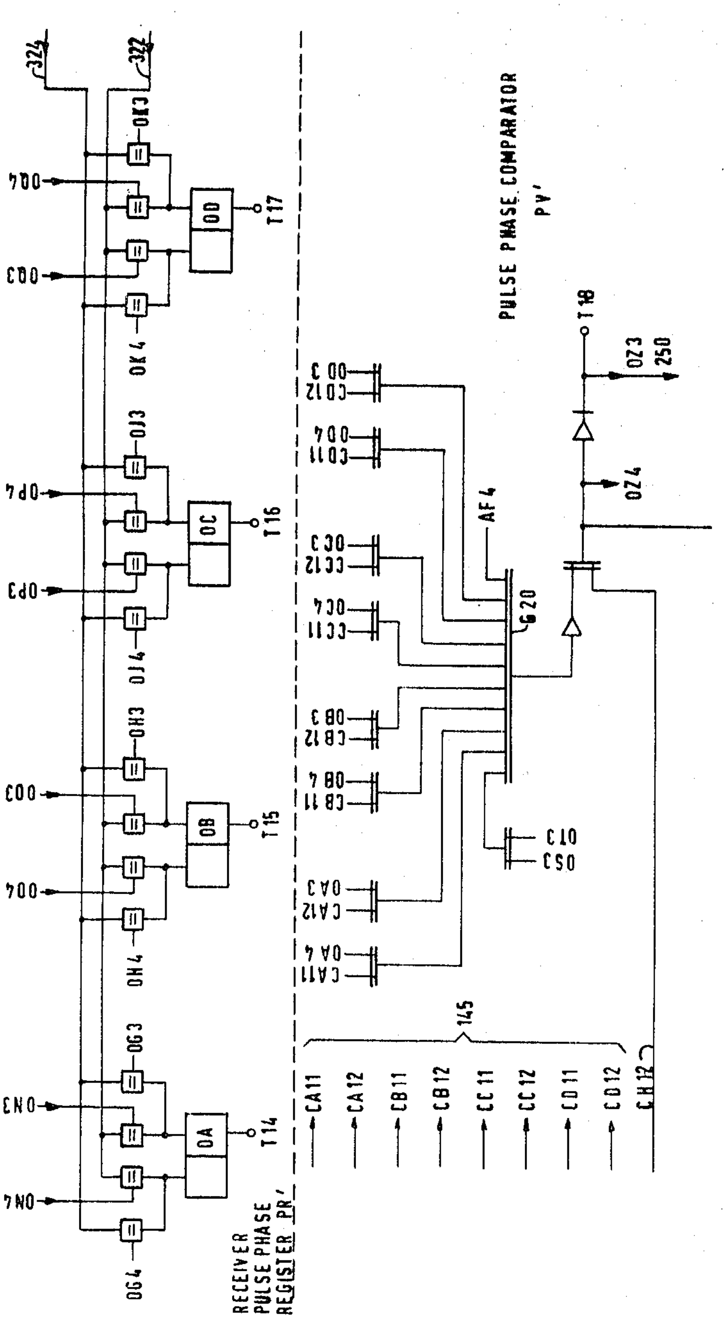
Figure 26:
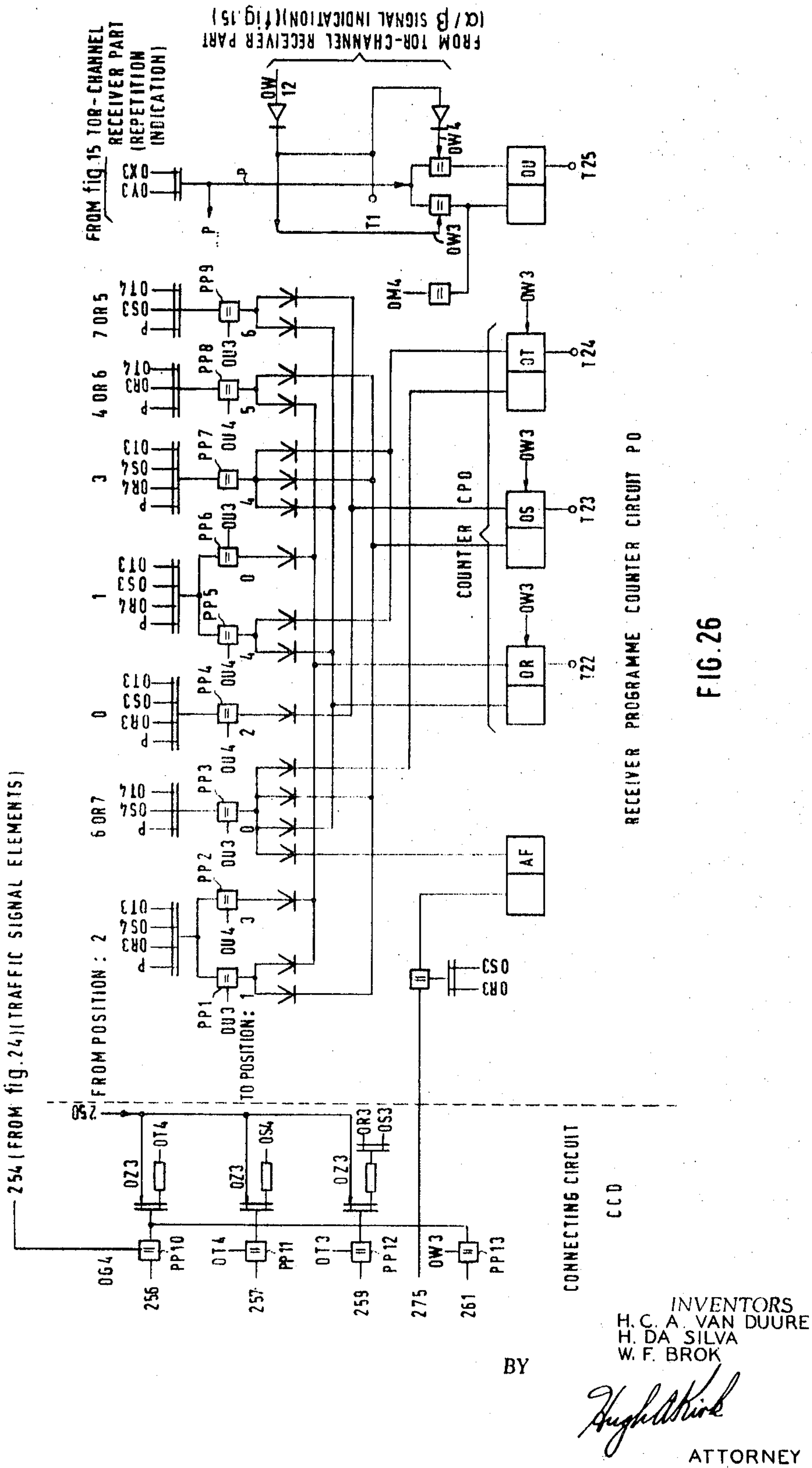
FIG. 26 is a schematic wiring diagram of the receiver program circuit and the TOR-channel receiver connecting circuit connected between the TOR-channel receiving part and the TEX-panel receiving part, as shown by blocks in FIG. 4 or FIG. 5′.

(1) The Address Processor AV (FIG. 24)
(2) Receiver Pulse Phase Register PR′ (FIG. 25)
(3) Receiver Pulse Phase Comparator PV′ (FIG. 25)
(4) Receiver Program Counter Circuit PO (FIG. 26)

I. Flex System General Circuits (FIGS. 1 through 6)

Figure 1:
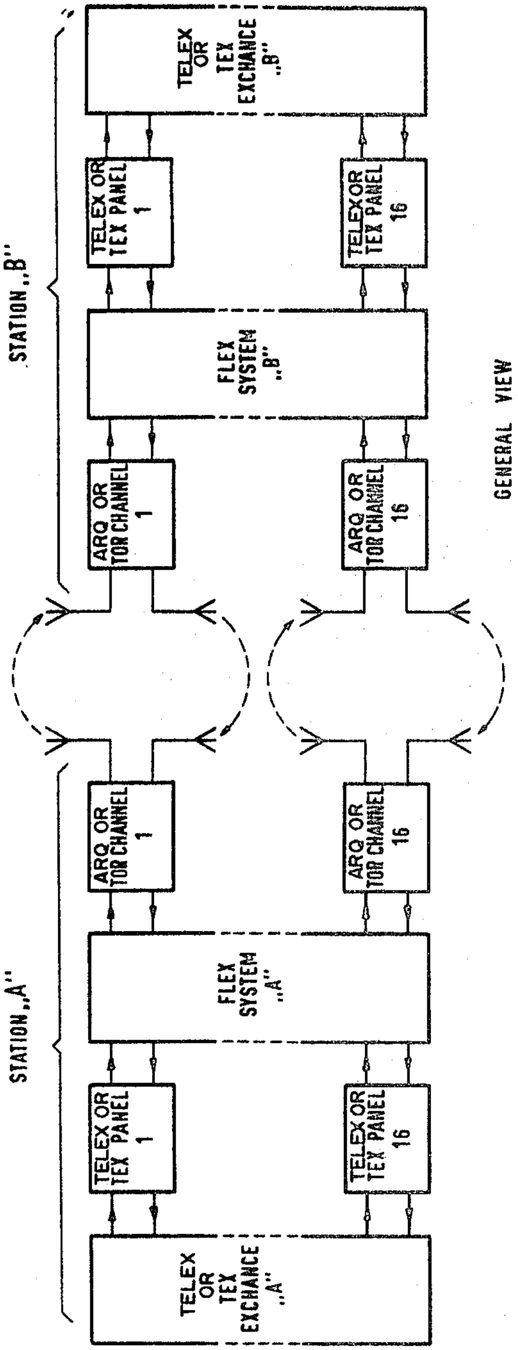
FIG. 1 is a schematic block diagram showing where the switching device of the FLEX system of this invention is placed in a radio type telegraph system of the automatic error correction type, namely between the TEX-panels and the TOR-channels at each station.

Referring first to FIG. 1 there is shown schematically in blocks the general circuits of a telegraph or telex radio telecommunication link between two stations A and B with the radio antennas for the to and from paths being connected by dotted arrows in the center of the drawing, for the first and last channel of a sixteen TOR-channel system. At each station the telegraph or telex subscribers are connected to a TEX-exchange which TEX-exchange connects with each of the sixteen TEX-panels which in turn, according to the prior art, were each directly connected to each of the TOR-channels of the automatic error correcting or ARQ radio links. However, according to the present invention, there is connected between each of the TEX-panels and each of the TOR-channels, the FLEX-system switching device of this invention, which enables any one of the TEX-panels to select any one of the TOR-channels which may be available and efficient for communication to the other station; and correspondingly, according to the address automatically transmitted from the TEX-panel which is doing the calling the corresponding TEX-panel at the remote station is automatically selected according to this system. Thus the circuits of this invention which are described hereafter are those contained in the blocks labelled FLEX-system A or FLEX -system B shown in this FIG. 1.

I–1. The FLEX-System Switching Device

Figure 2:
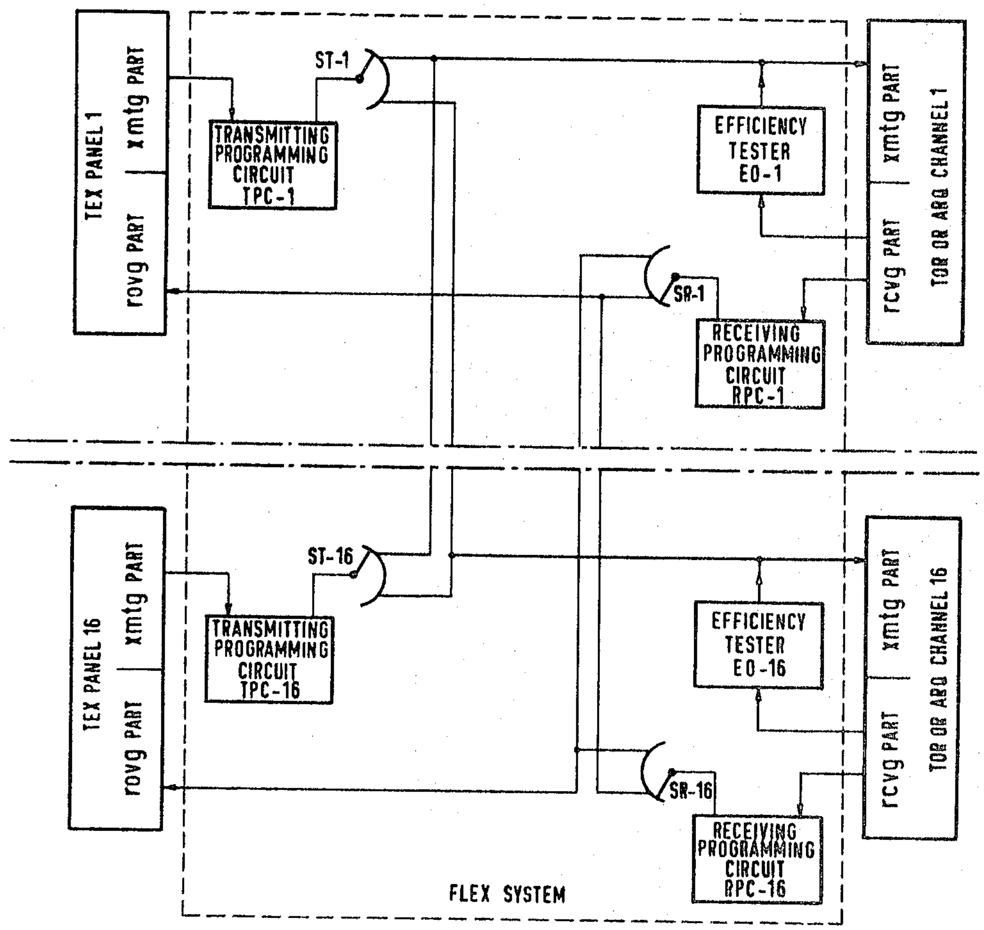
FIG. 2 is a basic schematic block diagram of part of one of the FLEX-system switching devices of FIG. 1 showing only the programming circuits, selecting switch means, and the efficiency tester circuits for the first and last of a sixteen TEX-panel and a sixteen TOR-channel station.

Referring now to FIG. 2, there is shown schematically in the dotted rectangle of the major central part of this figure, general circuits of the FLEX-system switching device which occurs at each station. Connected to this dotted rectangle are parts of four blocks representing the first and sixteenth TEX-panel and first and sixteenth TOR or ARQ channel. Each TEX-panel and each TOR or ARQ-channel block is divided into an upper transmitting part and a lower receiving part.

Referring first to the TEX-panel transmitting part from which a calling subscriber or a call originates, the initiation of the call is first transmitted to a transmitting programming circuit TPC–1 which in turn controls the transmitting selecting switch ST1 controlled by this transmitting programming circuit TPC–1 to connect over a multiconductor contact any one of the sixteen ARQ or TOR-channels, as well as being multiplied with the corresponding contacts on each of the other transmitting selecting switches ST2 through ST16.

On the other TOR or ARQ-channel side of the FLEX system switching device, the receiving part of each TOR-channel is connected to a receiving programming circuit RPC–1 through RPC–16 corresponding to each of the sixteen TOR-channels, each of which receiving programming circuits RPC–1 through RPC–16 is connected to and controls a corresponding receiving selector switch SR1 through SR16 to connect over a multi-conductor contact any one of the sixteen TEX-panels, as well as being multiplied with the corresponding contacts on each of the other receiving selector switches RPC–1 through RPC–16.

In addition to these general selector switches ST and SR and their programming circuits TPC and RPC, there is also provided for each TOR-channel an efficiency tester circuit EO1 through EO16, connected between the receiving part of each TOR-channel and one of the multi-conductor wires to each of the transmitting selector switches ST1 through ST16, so as to indicate to each of the transmitting programming circuits TPC–1 through TPC–16 which ones of the ARQ circuits are efficient and which ones are not efficient.

I–2. Selector Switches

Figure 3:
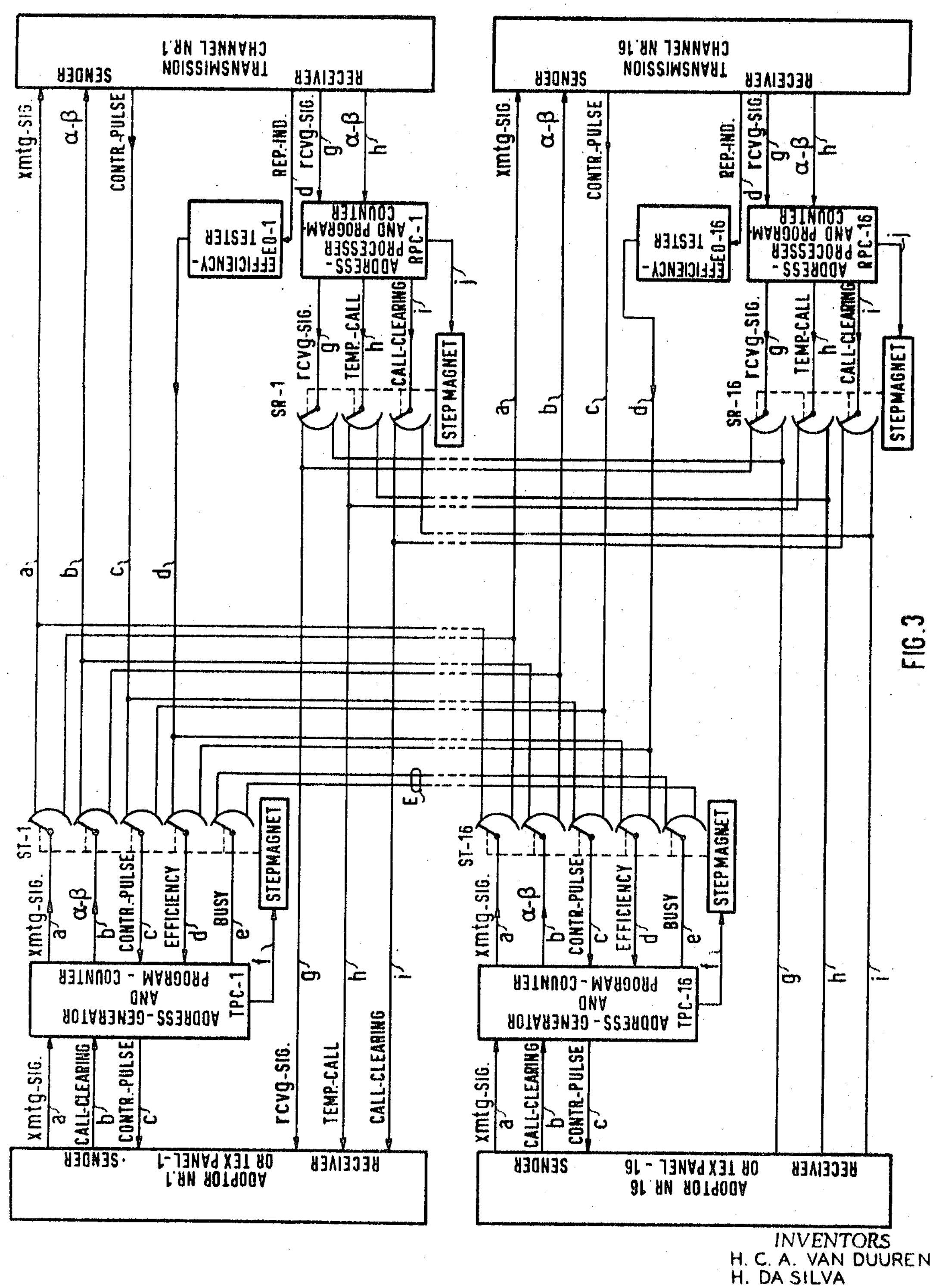
FIG. 3 is a schematic block wiring diagram similar to that shown in FIG. 2, but also including some of the connecting circuits required for transmitting the signal indications according to the FLEX-system time diagram in FIG. 6.

A more detailed circuit similar to that shown in FIG. 2 is shown in FIG. 3 wherein multi-contacts of each of the selector switches ST1 through ST16 and SR1 through SR16 are divided up generally into separate conductors to different ones of the control circuits according to the FLEX-system of this invention. Although step-by-step rotary selected type switches are schematically shown in FIG. 3, this does not means that these switches cannot be replaced by other mechanical types of step-by-step switches, or cross-bar switches, or by electronic type switches or magnetic type or ferrite type switches. The electronic type switches may be selected according to phase or time division, as will be described in more detail later in a specific embodiment of this invention.

Referring now more specifically to FIG. 3, there is connected from each of the transmitter programming circuits TPC, (which herein is indicated to include an address generator and a counter) to each TOR-channel transmitting or sending part, two connections *a* and *b*, one *a* for the address and message signals from the adapter circuit or TEX-panel to be transmitted, and the other *b* for two types of idle-time signals $\alpha$ and $\beta$, one of which is a call clearing signal indicating the end of a message. There is also a connection *c* from each TOR-channel sending part to the programming circuits TPC to: indicate whether or not that TOR-channel is ocupied, indicate if it is in repetition, maintain synchronism between the TEX-panel and its selected TOR-channel, and/or indicate when tape reader or message signals should be started. The next two of the selector switches ST are for other control indications, via conductors *d* and *e*; the first *d* of which is for indicating which TOR-channels are efficient and which are not, which indications are derived from the efficiency tester circuits EO–1 through EO–16 connected to the receiving part of each of the TOR-channels. The next connection *e* is to the transmitter programming circuit of each of the other adapter circuits or TEX-panels for indicating which ones are busy, and which ones are not and can accept calls. The last and bottom conductor *f* from each of the TPC circuits is connected to the step magnet or means for controlling the operation of its associated selector switches, which control means can be, in the case of phase or time division, a common phasing and distributor circuit for all of the panels and channels of each FLEX system switching device at each station.

Referring now to the receiving selector switches SR1 through SR16 and the receiving programming circuits RPC1 through RPC16, there are shown in FIG. 3 three conductors, *d, g* and *h* from the receiving part of each of the TOR-channels; the first one *d* of which goes to the efficiency testers EO1 through EO16 mentioned above, the second *g* of which is for receiving address and message signals, and the third *h* of which is for the two types of idle time signals $\alpha$ and $\beta$. These latter two conductors *g* and *h* are connected directly to the receiving programming circuits RPC–1 through RPC–16. From each of the receiving programming circuits RPC there are provided three different types of selector switches SR–1 through SR–16, the first, connected to conductor *g* is for conducting the received address and message signals which is connected directly to each one of the TEX-panels receiving circuits. The second, connected to conductor *h* is for temporarily occupying a TEX-panel on receipt of the first address from a remote station to reserve this particular TEX-panel until at least two out of three consecutive addresses are recieved to establish a definitely busy condition for that TEX-panel. The third conductor *i* and its selector switch SR is for the idle time type signal corresponding to the call clearing signal for releasing that particular TEX-panel and indicating that it is free and available for another call to it. Each of these three selector switches SR–1 through SR–16 is manifolded or multiplied to each of the adapter circuits or TEX-panels 1 through 16. In addition, means for controlling the selector switches SR–1 through SR–16 from their respective receiving programming circuits RPC are herein shown to be labelled as step magnets and are connected via conductors *j* from the bottom of each of the receiving programming circuits RC–1 through RC–16. However, common selector switch control means may be provided, as mentioned above for the selector switches ST, such as in a pulse phase or time-division electronic selection controlled system.

Although single connecting lines *a* through *j* are shown in FIG. 3, it is to be understood that the functions communicated over these connections often require more than one conductor and correspondingly more than one contact on the selection switches.

I–3. Pulse Phase or Time-division Selection Systems (FIGS. 4 and 5)

Figure 4:
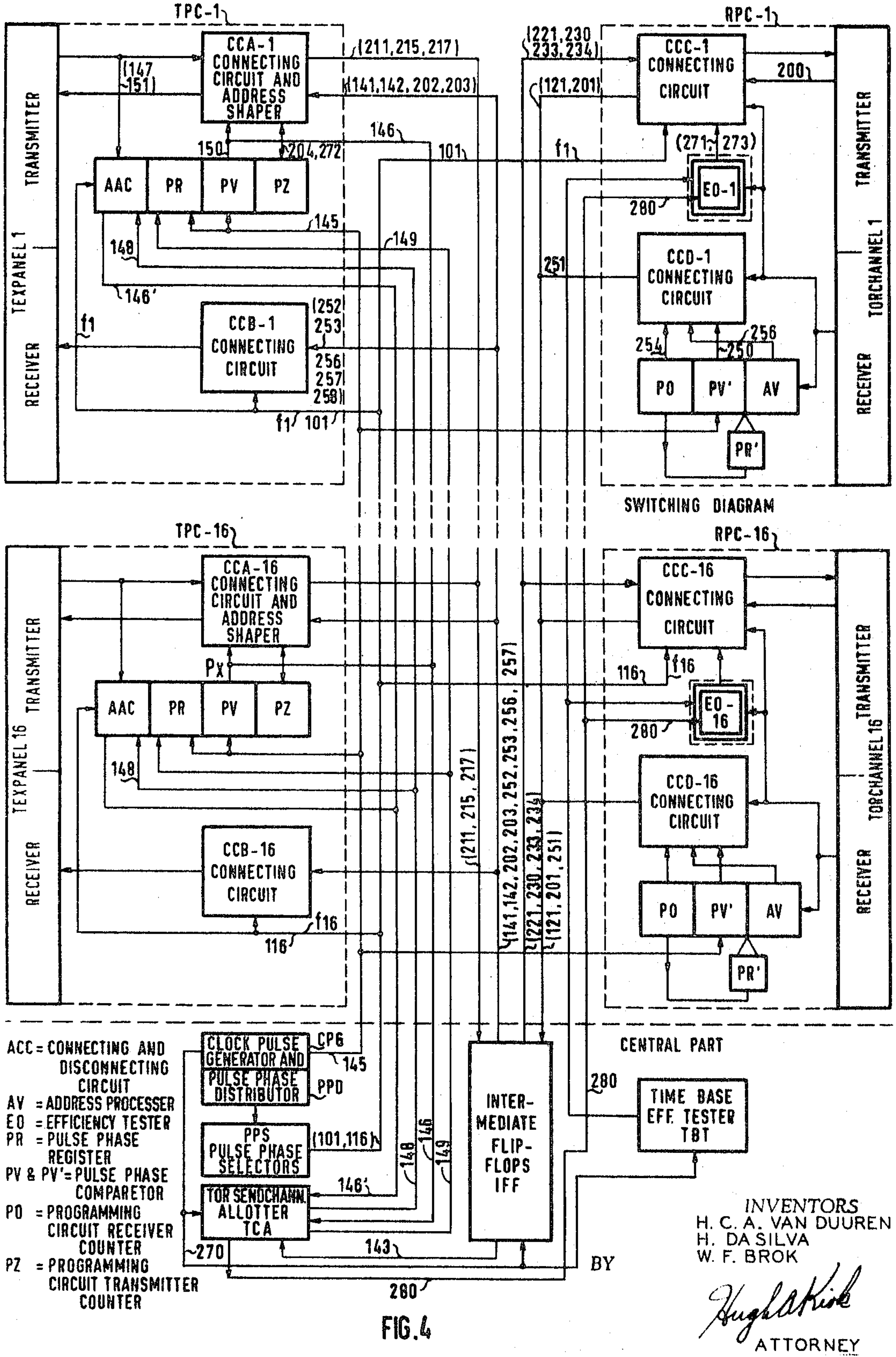
FIG. 4 is a schematic block wiring diagram of another embodiment of a FLEX-system switching device similar to that shown in FIG. 2, but employing phase or time-division selective switching.
Figure 5:
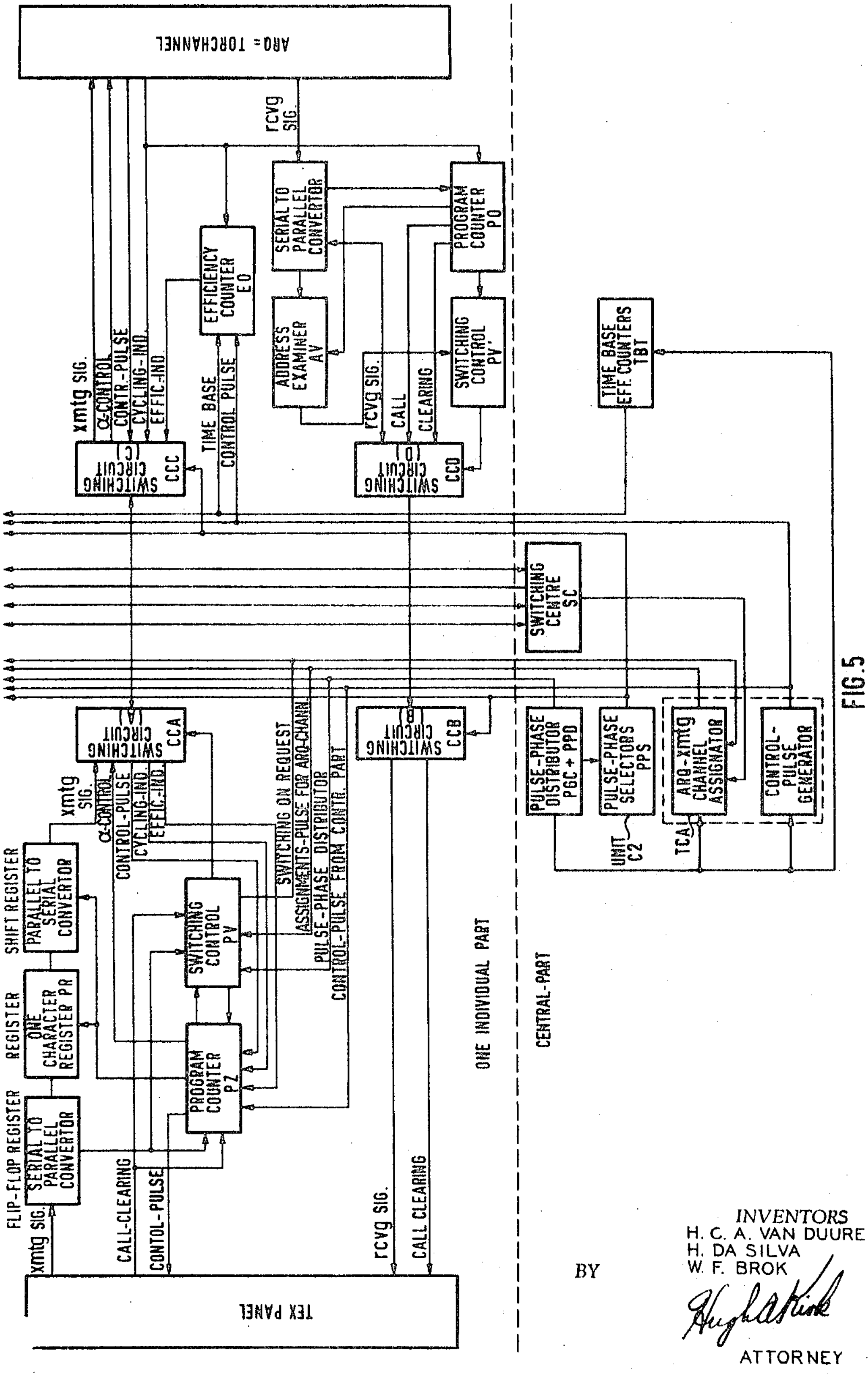
FIG. 5 is a schematic block wiring diagram similar to FIG. 4 of another embodiment of a phase or time-division FLEX-system switching device, which may be used together with the device of FIG. 4 but at another station in the system.

Referring now to FIGS. 4 and 5, there are generally shown two different embodiments which may be employed at separate communicating stations of the same pulse phase or time division electronic selecting switching system; each station having sixteen TEX-panels and sixteen TOR-channels connected according to the FLEX switching system of this invention. The common selection switching means and circuits for all of these panels and channels at each station are shown in the lower part of each figure, below the horizontal dotted line and indicated as the "Central Part" in FIGS. 4' and 5. In FIG. 4 two of the sixteen, namely the first and last, of the TEX-panels and TOR-channels, are shown with their respective connections, however, in FIG. 5 only one of the TEX-panels and one of the TOR-channels are shown with their corresponding connections.

First referring to FIG. 4, the dotted rectangles joined to each of the TEX-panel and TOR-channel blocks, refer to the corresponding transmitting and receiving programming circuits TPC and RPC, as shown in FIG. 2, however, those of the receiving programming circuits RPC have dotted rectangular holes in them for the separate efficiency tester circuits EO, which in FIG. 2 are separately indicated.

The dock diagram circuits shown in FIG. 4 will be those which will be specifically disclosed in the figures of the wiring diagrams which follow. Time or phase division selection switching means include the connecting circuits CCA, CCB, CCC and CCD. The connecting circuits CCA1 through 16 (which include the address shapers) connect each of the transmitting parts of the adapter or TEX-panels to each of the transmitting parts of the TOR-channels through connecting circuits CCC1 through 16 through intermediate flip-flop circuits IFF in the common or Central Part. This intermediate flip-flop circuit IFF may be replaced by amplifiers or another type of switching center SC as shown in FIG. 5. This intermediate flip-flop circuit IFF or switching center circuit SC, however, also may be controlled by the pulse phasing generated in the Central Part.

Controlling each connecting and address shaper circuit CCA is a connecting and disconnecting circuit AAC, a transmitter pulse phase register circuit PR, a transmitter pulse phase comparator circuit PV, and a transmitter program counter circuit PZ, all of which circuits are controlled via conductors from the Central Part as well as by each other and by the other transmitter programming circuits TPC of the system through the transmitting TOR-channel allotter circuit TCA in the Central Part described later.

In addition, each of the transmitting programming circuits TPC is provided with another connecting circuit CCB1 through CCB16, which is connected to the receiving part of each of the TEX-panels and is controlled by the common or Central Part both from the pulse phase selectors PPS described later, as well as the intermediate flip-flop circuits IFF through which they are connected to each of the connecting circuits CCD1 through CCD16 connected to the receiving parts of corresponding TOR-channels.

Referring to the receiving programming circuits RPC connected to each of the TOR-channels 1 through 16 in FIG. 4, there is shown not only the connecting circuit CCC1 through 16 as previously mentioned, but also the just mentioned connecting circuits CCD1 through 16 which are controlled by an address processing circuit AV, a receiver pulse phase register circuit PR', a receiver pulse phase compartor circuit PV' and a receiver program counter circuit PO, each of which circuits control each other in sequence, and also the operation of their associated connecting circuits CCD.

As also previously mentioned, the receiving part of each of the TOR-channels is connected to a corresponding efficiency tester circuit EO1 through 16, which is connected through its associated connecting circuit CCC and the common intermediate flip-flop circuit IFF to each of the transmitter connecting circuits CCA. These efficiency tester circuits EO also are controlled by the time base efficiency tester circuit PBT in the Central Part.

The common or Central Part includes means for generating the time divisions or pulse phase divisions for controlling the selection switching and may comprise a clock pulse generator and pulse phase distributor circuits CPG and PPD, respectively, which in turn control a pulse phase selector circuit PPS which divides each cycle of the distributor PPD into corresponding different time divisions, corresponding in this case to sixteen separate time-spaced pulses or phases, one for each of the adapter or TEX-panels and/or each of the TOR-channels. The pulse phase distributor PPD also generates the binary code number of each one of these consecutive sixteen divisions which correspond both to the number of each TOR-channel and each TEX-panel as well as to the address for each panel for direct selection of each panel and TOR-channel. Also in the Central Part is provided a transmitter channel allotter circuit TCA which detects which one of the TEX-panels is ready to transmit a message, and which TOR-channels are efficient and which ones are occupied, and also controls the interruption of a message for transmitting release signals to and through the remote station in the event no other available and efficient TOR-channel exists in the system. Accordingly, this particular allotter circuit TCA is connected with each of the TEX-panels, and controls the operations of the connecting and disconnecting circuits AAC, and the transmitter pulse phase register circuits PR. The transmitter and receiver pulse phase register circuits PR and PR' as well as the transmitter pulse phase comparator circuit PV are connected to the clock pulse generator and phase distributor circuits CPG and PPD. The time base tester TBT may also be connected to the clock pulse generator and pulse distributor circuits CPG and PPD for its control, as is the transmitter channel allotter TCA.

Referring to FIG. 5, although several of the block circuits shown contain different labels, they correspond collectively with the functions of those circuits mentioned above in FIG. 4, and are given corresponding reference characters where possible.

I–4. Time-Division Selection in General

Referring now to FIG. 6, there is shown by comparison in a time diagram, the horizontal wave forms A' and B' for the signal sequences according to the prior art link systems, while wave form C' is for a signal sequence according to the FLEX-system of the present invention.

Referring first to the wave form A', the output terminals of a prior art TEX-panel indicate a call criterion at the start of a message circuit which is a warning signal for the automatic or manual switch board to switch on the apparatus in order to process the selecting information which is to follow before the message is sent. At the end of the message a clearing criterion disconnects and clears the apparatus and ends the metering for charging. A free line or "free time" circuit is marked by a constant polarity being a start polarity and indicates the absolutely free line condition. A transition from the start to stop polarity is recognized as a call signal. This stop or negative polarity fills the traffic pauses during an established circuit and is called a temperary idle condition or "idle circuit" in wave form A'. A start polarity signal longer than 500 milliseconds, however, is detected as being a clearing signal.

Up to now the absolute free line conditions or "free time" and the temporary idle condition or "idle circuit" in wave form A' in FIG. 6 are transmitted over the ARQ channel as idle time $\alpha$ signals and idle time $\beta$ signals, respectively, according to wave form B' in FIG. 6, wherein no Flex System switching device is employed and each TEX-panel is directly connected to a corresponding TOR-channel. Thus, a call signal is marked by the change from idle time $\alpha$ signals to idle time $\beta$ signals on the ARQ channel. The idle time $\beta$ signals also indicate the pause signal in an established circuit.

According to the present FLEX-system invention, however, it is necessary to send an address because of the selection between the different TEX-panels and TOR-channels, which address for the corresponding TEX-panel at the remote station must be inserted every time a remote TEX-panel is to be connected. Thus according to this Flex System invention, the idle time $\alpha$ signals and idle time $\beta$ signals have another purpose as shown in wave form C' in FIG. 6. This is particularly the case in a time-division selection system wherein each of the transmitting paths through the selector switching devices are continually rotating or cycling on a base of time division, so that the transmitting path of each ARQ or TOR-channel disposes of one "free position" on the selector, which "free position" is taken during the "free line condition" and the "temporary idle condition" of the TEX-panel circuit. In these cases the transmitting part of the TEX-panel is not connected to any of the TOR-channels, so that each TOR-channel that is not connected to a TEX-panel automatically transmits the idle time $\beta$ signals.

The TEX-panel immediately abandons this "free position" condition of the selector in case one of the following conditions occurs at the outlet terminals of the TEX-panel:

(a) a call criterion,
(b) traffic, or
(c) a clearing criterion.

As soon as the programming circuit TPC, which is found at each TEX-panel terminal of the Flex system, detects one of the three above mentioned cases (*a*, *b* or *c*) it makes the selector switch start its selecting action which will be continued until it selects a free and efficient ARQ transmitting or TOR-channel. The information to investigate the efficiency of the channel is derived from the Efficiency Tester EO, one of which is connected to each TOR-channel. By means of the electronic switching method it is possible to complete the selecting and connecting process in a few milliseconds, provided that at least one ARQ channel is free and efficient.

Immediately after the selection is finished and a TEX-panel is connected to a TOR-channel, the programming circuit TPC makes that TOR-channel interrupt the idle time $\beta$ signal transmission on the forward way in order to transmit an address. By means of this address the remote TOR-channel receiver part knows which TEX-panel receiving part is to be connected to that TOR-channel in order to pass the information to the required TEX-panel.

The address may consist of a normal five unit telegraph code traffic symbol, the five information bits of which form the number of this address-responding TEX-panel in a binary code. For example, TEX-panel No. 1 transmits the address signal 00001 and TEX-panel No. 2 transmits the address signal 00010, etc. In order to avoid mis-routing due to transposed address signals, the address signal is transmitted three times in succession. The remote station receiver takes the address signal for correct when at least two out of the three signals are identical. One transposed signal among these three can do no harm, and in ARQ systems the chance of obtaining two transposed signals in a group of three without a fault being detected is so small that by using this method, mis-routing practically will never occur.

After this connection has been set up by the receipt of two identical address signals, the connection is ready to pass traffic and/or pass a clearing signal. If after the two identical address signals are received, no traffic is ready to be transmitted, idle time $\beta$ signals are then automatically sent, and after two of such idle time $\beta$ signals are received in succession at the receiving programming circuit RPC at the remote station, the selector at this remote station releases its connection and goes to its "free position" again. Therefore, in order to establish a connection, an additional two consecutive address signals must be transmitted and received again. These idle time $\beta$ signals are automatically transmitted when a traffic pause occurs and when the transmitting or calling TEX-panel is disconnected from a transmitter TOR-channel. However, no idle time $\beta$ signals are artificially inserted in the flow of traffic information from the TEX-panel or telex reader. Thus, the sequence of "idle $\beta$," "address," "idle $\beta$," "address," "traffic," "idle $\beta$," "address," and "traffic," shown in the wave form C′ in FIG. 6 occurs according to the FLEX-system switching device of the present invention.

For security reasons, a TEX-panel to be connected to the first released TOR-channel will not be connected before at least four idle time $\beta$ signals have been transmitted. In this case two consecutive idle time $\beta$ signals are guaranteed to show up at the receiver end of the TOR-channel before any address is sent. The reason for not disconnecting the TEX-panel from the TOR-receiver before two consecutive idle time $\beta$ signals have been registered, is to safeguard the connection from being disconnected on a single idle time $\beta$ signal which could be a transposed information signal. Again the chance of two transpositions of two $\beta$ signals in succession is very rare.

In order to pass a clearing signal after an address signal, or at the end of traffic, seven signals of idle time $\alpha$ are transmitted. On receipt of these idle time $\alpha$ signals, (see the right end portion of wave form C′ in FIG. 6), the clearing criterion is communicated to the receiving TEX-panel, which in turn sends a clearing signal or start polarity to its associated switch board and/or subscriber.

When the efficiency or quality of the ARQ transmitting route or TOR-channel drops below a predetermined value, the TEX-circuit, if any, working over this route is disconnected. This, however, will not take place before three signals of idle time $\beta$ have been transmitted. If these signals $\beta$ have been sent out, and there are no more traffic signals in the TOR-channel repetition storage, the switching over of the TEX-panel from one TOR-channel to another occurs without loss of characters. However, if during the predetermined period after the channel becomes inefficient, no $\beta$ signals can be transmitted due to constant cycling of the automatic error correction device in the TOR-channel, the TEX-panel will still be disconnected. In this case, which is expected to be very rare, once the rerouting of the TEX-panel has been performed, a loss of maximum three information characters could occur.

When all of the TOR-chanels are either inefficient or engaged, all the TEX-panels are blocked from accepting a call from the local switch board. But since the TEX-panels are all simplex circuits, this completely busy or blocking indication is conveyed to any calling TEX-panel according to this FLEX system, only through the duplex TOR-channel system from the remote station. Also if one of the efficient and engaged TOR-channels becomes inefficient, its associated TEX-panel should pass a clearing signal (seven $\alpha$ signals) to notify the remote TEX-panel to disconnect the circuit and release its charges, because now no more traffic can be sent to it. Under these two specific circumstances, one of the TOR-channels that still is passing traffic from another TEX-panel is temporarily disconnected from the same and assigned to the TEX-panel that has to be given a busy signal or to send the clearing signal or seven idle time $\alpha$ signals. This TEX-panel can now send these clearing signals over this temporarily interrupted TOR-channel to its associated and/or formerly connected and remote TEX-panel in order to clear the remote subscriber from the circuit and release its charges and send the necessary disconnect or release signal back to the calling TEX-panel. After this clearing signal has been transmitted, the associated TEX-panels at each station are disconnected from the interrupted TOR-channel, and this TOR-channel is reconnected to the original TEX-panel user and its message is continued.

In the case that all of the TOR-channels have become inefficient, all the TEX-panels are forced to send clearing signals to their local switch boards after a predetermined guard time of, say, about thirty seconds. This guard time is so long that one is sure that the remote station has also disconnected its TEX-panels, so that they also are cleared from the circuit.

II Pulse Generator Circuits (Figs. 4 through 12)

As illustrative of one specific embodiment of this invention according to the circuit shown in FIG. 4, the details of the blocks shown therein will now respectively be described in combination with the following figures and time diagrams. Of these circuits there will first be described the common circuits or pulse generator circuits shown in the bottom half on the Central Part of FIG. 4.

II–1. Clock Pulse Generator CPG (FIGS. 7 and 8*a*)

Figure 7:
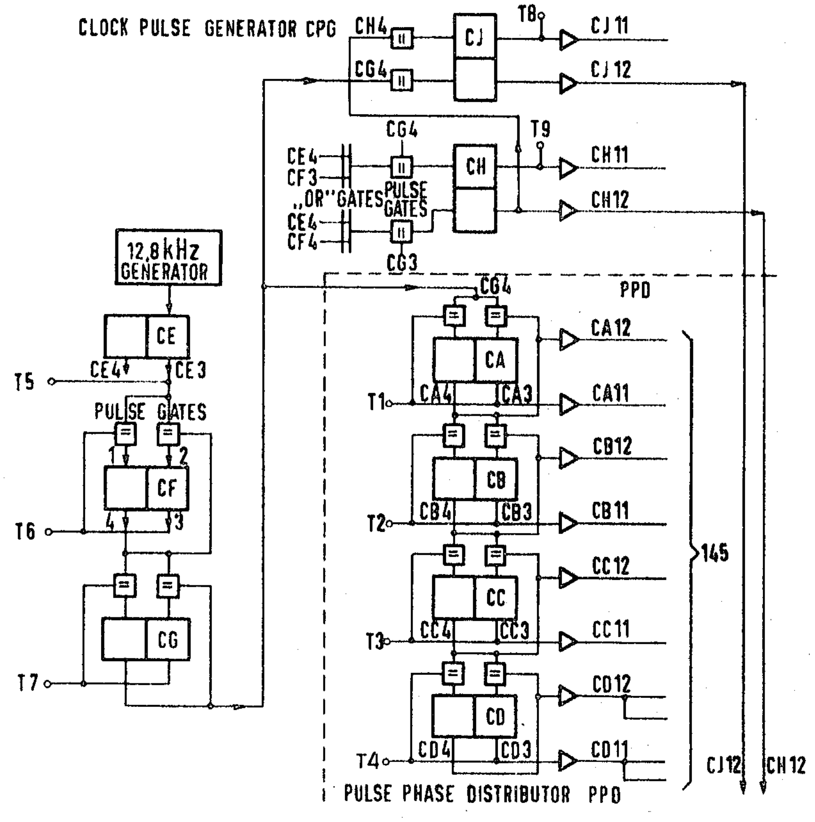
FIG. 7 is a schematic wiring diagram of the clock pulse generating and pulse phase distributor circuits which may be employed in the diagram of FIG. 4 or FIG. 5.
Figure 7A:
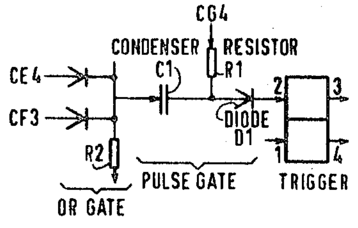
FIG. 7*a* is a schematic wiring diagram of one of the pulse gates shown in FIG. 7.
Figure 8A:
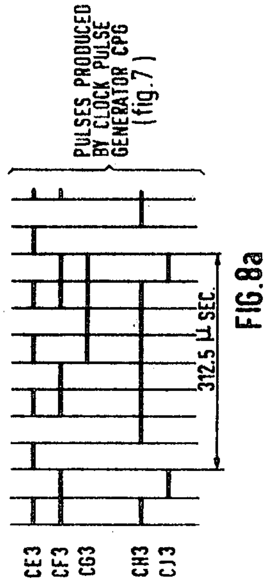
FIGS. 8*a* and 8*b* are time diagrams of the pulses generated in the clock pulse generator and the pulse phase distributor circuits, respectively, shown in FIG. 7.

Referring now to FIG. 7, there is shown in combination the clock pulse generator circuit CPG and separated therefrom by dotted lines the pulse phase distributor circuit PPD. The clock pulse generator circuit may start from a 12.8 kHz, or kilocycle oscillator or generator which controls a multivibrator, flip-flop or trigger circuit CE, the CE3 output from which produces the pulses shown along the top line in the time diagram of FIG. 8*a*. These pulses CE3 in turn control a pair of trigger circuits CF and CG to produce at their corresponding outputs the pulses CF3 and CG3 as shown in the second and third lines in time diagram of FIG. 8*a*, the latter one CG3 of which occurs each 312.2 micro-seconds for half that time. The opposite polarity inputs 1 and 2 and opposite polarity outputs 3 and 4 of all the triggers hereinafter referred to in the rest of the description of this invention will be numbered as shown for trigger CF in FIG. 7. Thus the flip-flop or trigger CE acts as a follower for the output of this 12.8 kHz. generator, while the flip-flops or triggers CF and CG, as shown in the time diagram of FIG. 8*a*, act as binary dividers. The output pulses CE4, CF3, CF4, CG3 and CG4 are employed as shown in FIG. 7 to control through OR- and pulse-gates the triggers CH and CJ, the outputs CH3 and CJ3 of which latter triggers produce the pulses as shown in the last two lines of the time diagram of FIG. 8*a*. Each of these pulse gates comprises a differentiating condenser C1 and resistor R1 circuit connected to a diode D1 as shown in FIG. 7*a*. On transition of the input of this pulse gate from "zero" to "one" (that is, a different potential level), which input is derived from the output of its connected OR-gate (comprising diodes connected to inputs CE4 and CF3 and the resistor R2), this transition pulse is differentiated and only reaches the trigger CH through the diode D1 if the condenser C1 on the resistor R1 from input CG just before this transition, is "one".

The trigger CJ produces clock pulses for resetting the circuits and particularly the intermediate flip-flops of the intermediate flip-flop circuits IFF shown in the central part of the circuit of FIG. 4, but such a circuit is not required according to the other embodiment shown in FIG. 5.

The terminals T5 through T9 shown are only used for testing purposes.

II–2. Pulse Phase Distributor PPD (FIGS. 7 and 8*b*)

Figure 8B:
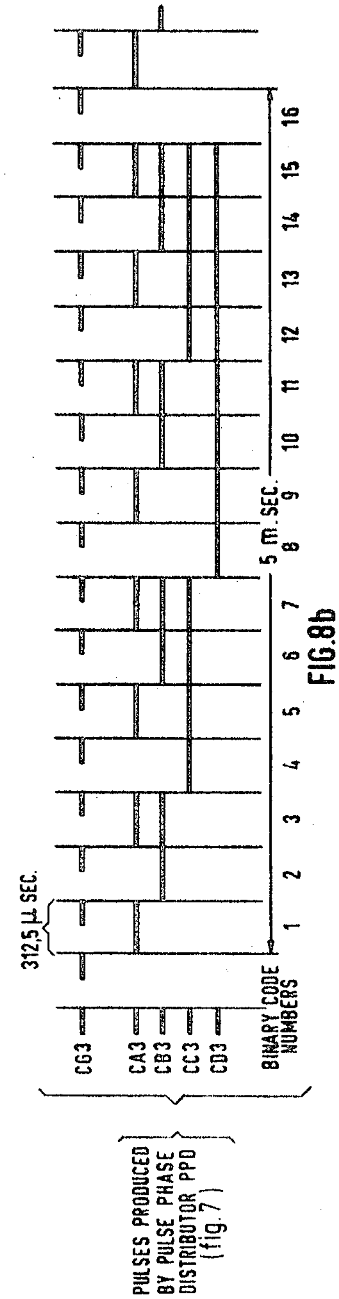

The pulses CG4 are also connected to one end of the counting chain of four triggers CA through CD of the pulse phase distributor PPD to produce from their outputs CA3 through CD3 separate pulses shown in the time diagram of FIG. 8*b*, dividing each five milliseconds into sixteen times divisions and corresponding directly to the binary code numbers from one through sixteen of each of the sixteen phases or time divisions. Thus, it is the outputs CA3 through CD4 of these triggers CA through CD after passing through amplifiers CA11 and CA12 through CD 11 and CD12, together with the pulses at a frequency of 3.2 kilocycles from the trigger CH that control the switching of all of the TEX-panel and TOR-channel circuits of this invention.

II–3. Pulse Phase Selector PPS (FIGS. 9 and 10)

Figure 9:
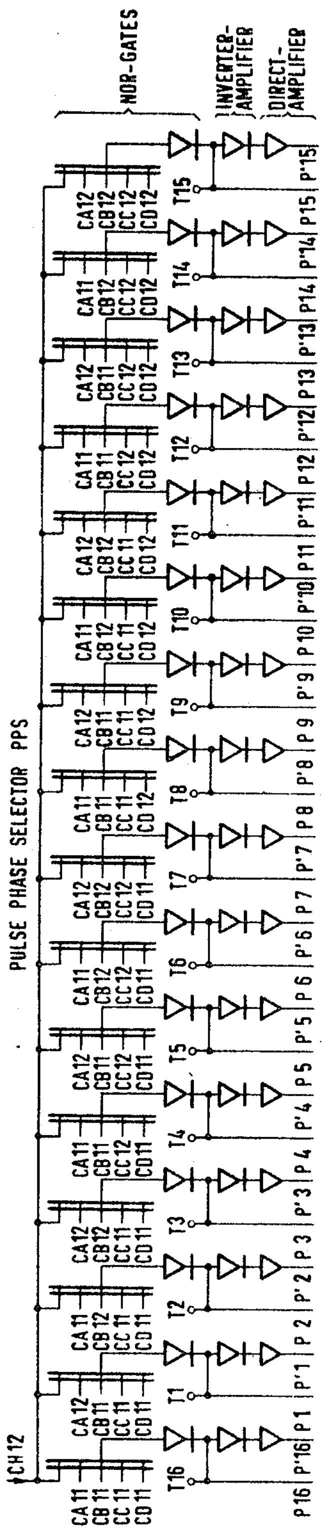
FIG. 9 is a schematic wiring diagram of a pulse phase selector circuit connectable to the pulse distributor circuit shown in FIG. 7, as shown by a block in FIG. 4 or FIG. 5.
Figure 10:
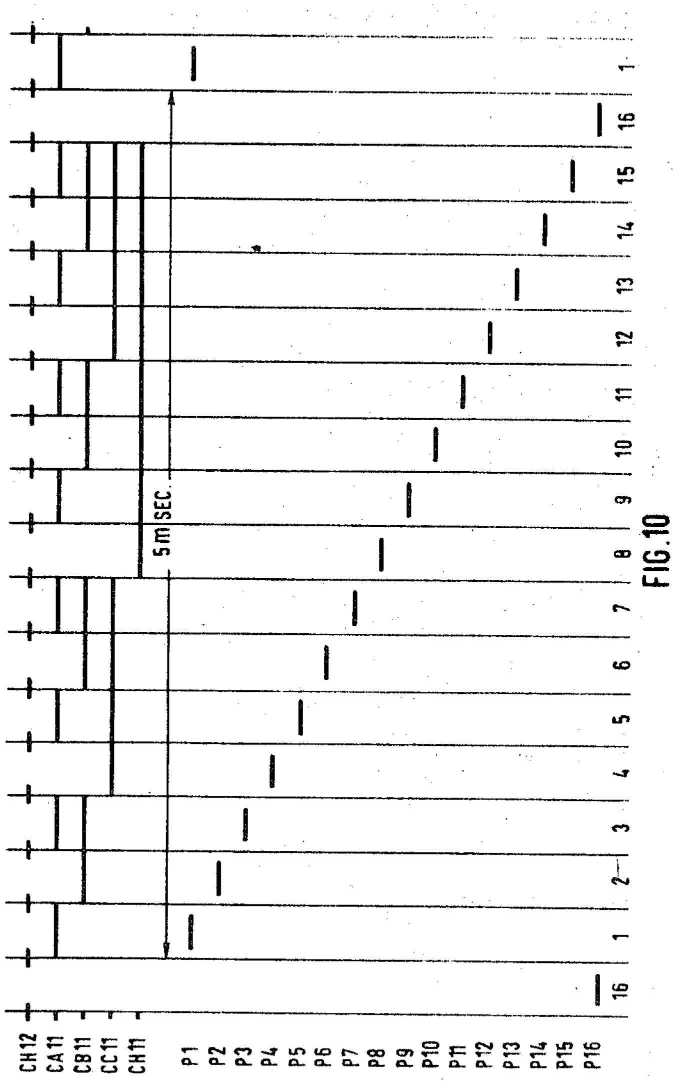
FIG. 10 is a time diagram of the pulse outputs of the pulse phase distributor circuit shown in FIG. 9.

Referring now to FIG. 9 there are shown the sixteen sequences of NOR-gates each controlling in series one inverter amplifier or NOT-circuit and one direct amplifier for producing the sixteen separate consecutive pulses according to the time division selection of the sixteen different TEX-panels or TOR-channels of this embodiment, as shown in the time diagram of FIG. 10.

Figure 9A:
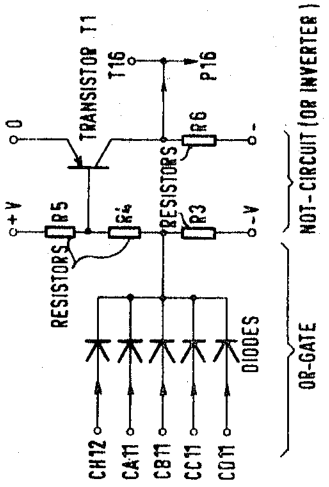
FIG. 9*a* is a schematic wiring diagram of one of the NOR-circuits shown in FIG. 9.

In FIG. 9*a* there is shown a schematic wiring diagram of the NOR-gate for the P16 pulse, which NOR-gate comprises an OR-gate represented by the diodes having inputs CH12, CA11, CB11, CC11 and CD11 connected to resistor R3 connected to a negative potential. This resistor R3 also may be common to the inverter or NOT-circuit which comprises several other resistors R4, R5 and R6 and a transistor T1. In such a NOT-circuit, the collector voltage of the conductive transistor (T1) corresponds to the logical "one" (that is, a given potential value) and that of a nonconducting transistor (T1) corresponds to the logical "zero" (a lower potential value). For example, the battery voltage for "zero" may be negative 24 volts indicated as the minus (−) terminals in FIG. 9*a*, with the ground level being (0) volt to which the emitter is connected, and a positive 12 volts at the positive terminal (+). If a "zero" value is present at the output of the OR-gate, the input to the NOT-circuit is negative 24 volts from the negative terminal through the resistors R3 and R4, and the basis of the transistor is at a negative voltage so that the transistor T1 is brought into conducting condition, and the output pulse P16 therefrom has a value of 0 volts, which corresponds to the higher potential value and thus is "one." On the other hand, if a "one" value potential is applied at the output of the OR-gate, a more positive voltage is applied to the basis of the transistor T1 from the positive 12 volts through resistor R5, and the transistor T1 becomes blocked, and the output pulse P16 then will be a negative 24 volts from the negative terminal through resistor R6, and thus the output pulse P16 has a lower potential, that is a "zero" value. Thus according to a logical table, when the input to the inverter is "zero" its output is "one," and when the input is "one the output is zero."

Now regarding the combination of this inverter or NOT-circuit with the OR-gate to form the NOR-gate in FIG. 9*a*, if any or all of the inputs CH12, CA11, CB11, CC11, or CD11 are at the "one" or higher potential value, the basis of the transistor T1 becomes positive and the transistor is non-conducting, and the pulse P16 output of the NOR-circuit will be a "zero" value or a negative 24 volts derived from the battery supply from the negative terminal through resistor R6. However, if no one of the inputs CH12, CA11, CB11, and CD11 have any potential applied to them at all or are at "zero," the transistor T1 will then become conductive, and NOR-gate shown in FIG. 9*a* will have a pulse P16 output of the "one" value as indicated by the pulse shown in the last line P16 in the table of FIG. 10, in the first and next to the last columns (16) thereof.

The two output conductors P1 and P'1 through P16 and P'16 shown in FIG. 9 correspond to simultaneous pairs of opposite polarity pulses from the NOR-gates and inverter-amplifiers for the proper selection switching control of the separate TEX and TOR circuits. Accordingly these sixteen NOR-gates show input terminal having reference characters corresponding to the output conductors CH12 and CA11 through CD12 from the amplifiers in the clock pulse generator circuit CPG and the pulse phase distributor circuit PPD in FIG. 7 described in sections II–1 and II–2 above, and are energized according to the correspondingly identified pulses shown in the upper portion of the time diagram of FIG. 10, to produce the sequence of pulses P1 through P16 corresponding to the binary code numbers 1 through 16 produced in the pulse phase distributor circuit PPD mentioned above. Thus the pulse phase selector PPS gates form, in the center three-quarters part of each of the 312.5 millisecond period, a different selection pulse for sixteen successive periods in five milliseconds forming one complete cycle of the selector switching circuit of this embodiment of this invention.

Figure 12B:
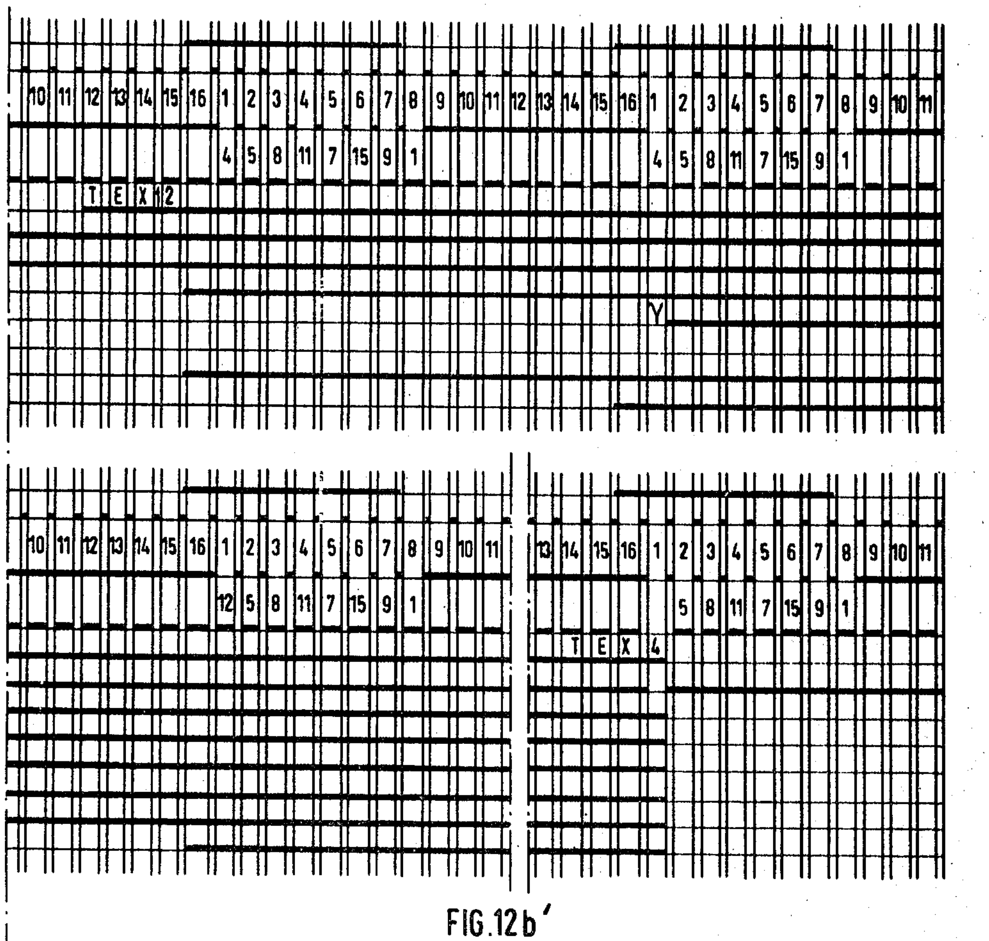
FIGS. 12*b* and 12*b'* is a continuous time diagram of the pulses controlling and generated by the allotter circuit shown in FIG. 11 during the interruption of a busy channel to borrow it for transmitting disconnecting signals.

II–4. TOR-channel Allotter TCA (FIGS. 11, 12*a* and 12*b*)

Another circuit in the common part of FIG. 4 includes a TOR-channel Allotter Circuit TCA shown in more detail in FIG. 11. This circuit TCA comprises a plurality of NOR- and OR-gates, three of which (GA, GB and GC) have inputs corresponding to each of the sixteen different TOR-channels and TEX-panel circuits of this embodiment of the invention, for detecting and indicating the relative conditions of said panel and channel circuits for and to said panel and channel circuits.

The OR-gate GA detects which of the sixteen TOR-channels have occupied or busy contacts connected thereto. The NOR-gate GB detects which one of the sixteen TEX-panels have switched-on and request a TOR-channel connection. The NOR-gate GC detects which of the sixteen TOR-channels are inefficient, and controls the sending of closing signals to remote TEX-panels when such inefficiency first occurs. The channel alloter TCA also contains other gates and triggers; the OR-gate G13 allotting the TEX-panel to the TOR-channel that is available, and flip-flops or triggers DA and DB indicating when all the TOR-channels are either occupied or inefficient.

Another OR-gate G40 detects which of these TOR-channels are efficient and occupied, so one of them can be interrupted by means of the trigger DC, when a busy signal is to be given to a calling TEX-panel or a switching-off or closing signal is to be sent to a remote TEX-panel which was connected to a TOR-channel that just became inefficient. The flip-flop or trigger DC, via conductor 280 to the efficiency testor EO described later in Section II, therefore switches off the TEX-panel connected to the found efficient and occupied TOR-channel, interrupting that TEX-panel's communication to insert the closure signal which is to be transmitted to said remote TEX-panel. This interruption, of course, is only temporary, and the trigger DD remembers which TEX-panel was interrupted so that it can be reconnected again after the closing signal has been transmitted thereover.

The triggers DG and DH are for transferring the signals from the NOR-gate GB and OR-gate G13; and triggers DE and DF are for transferring the signals from the NOR-gate GC.

This allotter circuit TCA will be referred to again later in the detailed description, in tracing circuits for describing the operation of the transmitting programming circuits TPC, and particularly the connecting and disconnecting circuits AAC thereof as shown in FIGS. 4 and 5. Nevertheless, FIGS. 12*a*, 12*b*, and 12*b'* are time diagrams of the operation of the triggers which control the allotter circuit TCA wherein FIG. 12*a* is an eight line pulse time diagram for the normal procedure for seizing an available and efficient TOR-channel when a calling subscriber energizes its corresponding TEX-panel to send a call. FIGS. 12*b*, and 12*b'*, however, show the operation of the triggers in the allotter circuit TCA during an interrupt sequence when all of the channels are either occupied, unavailable or inefficient, the fourteen consecutive time lines of the lower section of this diagram are a continuation of the time lines in the upper section. This interrupt is for the sending of a busy signal back to a new calling subscriber or TEX-panel and/or to disconnect or release a remote TEX-panel when the TOR-channel over which it is receiving signals has become too inefficient.

Referring first to both the time diagrams of FIGS. 12*a*, 12*b*, and 12*b'*, lines 1 thereof show the alternating voltages or pulses with a frequency of 200 Hz. or cycles connected to the allotter TCA in FIG. 11 via the conductor CD12 from the output of the last dividing stage of the pulse phase distributor PPD in FIG. 7.

Lines 2 show the clock pulses introduced over conductor CH12 from the output of the flip-flop in the clock pulse generator CPG in FIG. 7 connected to the OR-gate G13 in the allotter TCA. The pulse phase distributor PPD in FIG. 7, divides each 200 cycle period into sixteen equal parts, and in each sixteenth part the clock pulse CH12 is in the "one" position a quarter of the time and in its "zero" position during three-quarters of the time. It is in the successive "zero" positions of this clock pulse CH12 that the information is transferred from the TEX-panels to the TOR-channels and vice versa.

In lines 3, the sixteen successive time divisions allotted to the sixteen TOR-channels are numbered, in each three-quarters period space.

In lines 4, the efficiency indications of the TOR-channels arriving over the conductor 143 to terminal TN12 shown in FIG. 11, are shown in sequence. In FIG. 12*a*, it is assumed that all of the TOR-channels have sufficient efficiency, which is indicated by the "zero" values of the conductor 143 and at terminals TN12 during the transmission moments of the three-quarter periods for these TOR-channels.

In lines 5 are indicated the numbers of the TEX-panels which occupy or are connected to the TOR-channels numbered in lines 3. In FIG. 12*a* only TEX-panel 1 is shown connected to TOR-channel 1 in the second half of the diagram, while in FIG. 12*b* there are shown a series of different TEX-panels 4 or 12, 5, 8, 11, 7, 15, 9 and 1 being connected to TOR-channels 1, 2, 3, 4, 5, 6, 7 and 8, respectively.

In lines 6 the output pulses from the OR-gate GA in the allotter TCA are indicated. The input conditions to the OR-gate GA include the efficiency indications of the TOR-channels in the time sequence and the pulse phase pulses generated in the pulse phase comparator circuit PV described later in section IV–3 with FIG. 17, and shown in block in FIG. 4. The pulse phase comparator circuit PV supplies only pulses as long as the TEX-panels concerned are connected to the TOR transmitting channels. Thus if the outward pulse of the OR-gate GA is "zero" during the transmission period of the TOR-channel, this TOR-channel is therefor efficient and free or available. Thus the time diagram in FIG. 12*a* shows that it is efficient and free except during the second half thereof, during the time division 1 when it is seized as mentioned above for the line 5 of this diagram.

In lines 7 the output pulses of the NOR-gate GB in the allotter circuit TCA is shown. The inputs for this NOR-gate GB are derived via conductors 146' from the flip-flops ZF in the connecting circuits AAC associated with each of the sixteen TEX-panels, as described later in section IV–1 with FIG. 17. These triggers ZF move into their "one" positions, if the TEX-panels associated therewith desire a connection for the transmission of a call, traffic, or a release criterion. The "one" condition from these different flip-flops ZF can only arrive successively due to the pulses P'1, P'2, P'3 . . . P'16 which act as pick-up timers derived from the pulse phase selector PPS shown in FIG. 9. Thus, as soon as a single one of the triggers or flip-flops ZF associated with one of the sixteen TEX-panels has been picked up, the other flip-flops ZF of all the other fifteen TEX-panels are blocked by way of the conductor 148 from the NOR-gate GB in the allotter circuit in FIG. 11. This conductor 148 is also shown at the top of FIG. 17 connected to the connecting circuit AAC. Thus the allotter circuit TCA never receives more than a single connection request at a time, that is, during a period of five milliseconds which is one cycle of operation of this particular circuit. In other words, the pulses in lines 7, indicate the calling of TEX-panel 1, indicated by "TEX 1" in the first part of FIG. 12*a*, which causes the NOR-gate GB to be energized only for that pulse time division for one cycle during its request for connection to a TOR-channel in order to determine whether it has found a free and available TOR-channel which is then seized in the next cycle.

In lines 8, the pulse output of the OR-gate G13 in the allotter circuit TCA is shown, which output is conducted through conductor 149 shown in FIG. 11 and is only "zero" during the transmitting time division of the TOR-channel when all four of the following conditions are satisfied: (a) the allotter circuit TCA receives a connection request which is indicated as a "zero" value by way of NOR-gate GB; (b) no pulse appears at the output of the OR-gate GA as indicated in line 6 of the graph of FIG. 12*a* which means that the TOR-channel will be free and available; (c) the repetition indication on the terminal TM12 and conductor 281 is "zero" derived from flip-flop TM in FIG. 19, and conductor 282 from pulse gate in FIG. 19 controlled by repetition indication OX4 from the receiver part of the associated TOR-channel shown in FIG. 15, indicating that no repetition is now in progress on this particular TOR-channel; and (d) the clock pulse CH12 has also a "zero" value.

Thus in FIG. 12*a* these four conditions are satisfied during the transfer moment of TOR-channel 1 so that the transition from "zero" to "one" condition in the connecting pulse on line 7 of FIG. 12*a* indicated by output of the OR-gate GB enables the pulse transition in TEX-panel 1 of FIG. 17 via conductor 149 for trigger ZG in FIG. 17 to be brought to its "one" position shown in pulse phase register circuit PR (as described later in section IV–2 with FIG. 17), which in turn sets up the register triggers ZA, ZB, ZC and ZD in the pulse phase comparator circuit PV also shown in FIG. 17, so that these triggers will correspond to the then positions of the triggers CA, CB, CC and CD in the pulse phase distributor circuit PPD in FIG. 7 which is the pulse phase time selection of this particular TEX-panel for the proper TOR-channel 1. At this same moment the trigger ZF in the connecting circuit AAC in FIG. 17 is brought to its "zero" position so that the connection request of the TEX-panel disappears and therefore also does the blocking of the connections to the other TEX-panels as previously mentioned. Then during the next cycle of the OR-gate GA, the connection is set up so that pulse P1 occurs at the time division for TOR-channel 1 as shown at the first of the second half of FIG. 12*a*.

Referring now more specifically to FIGS. 12*b* and 12*b'* the functions of the pulses shown in lines 1 through 8 have been described already in connection with FIG. 12*a* above. However, regarding lines 5, it is supposed that channels 1 through 7 are initially occupied as follows: TOR-channel 1 being connected to TEX-panel 4; TOR-channel 2 being connected to TEX-panel 5; TOR-channel 3 being connected to TEX-panel 8; TOR-channel 4 being connected to TEX-panel 11; TOR-channel 5 being connected to TEX-panel 7; TOR-channel 6 being connected to TEX-panel 15; and TOR-channel 7 being connected to TEX-panel 9. In lines 6 and 7 of the FIGS. 12*b* and 12*b'* it is indicated that all the TOR-channels are either occupied or inefficient.

Initially in line 7 of FIGS. 12*b* and 12*b'*, the TEX-panel 1 emits a request for a connection. After this TEX-panel 1 has been connected to TOR-channel 8, the last efficient and available channel, the simplex TEX-panel 12 also makes a request for a connection. In order for this TEX-panel 12 to receive a busy signal and release itself from the FLEX-system of this invention, it must interrupt the first occurring occupied TOR-channel, which herein is TOR-channel 1 connected to TEX-panel 4, release and hold TEX-panel 4 temporarily, send the release signal back to itself over duplex TOR-channel 1, and then release TOR-channel 1 to be seized again by TEX-panel 4.

In line 8, the connecting pulse from OR-gate G13 in the allotter TCA makes a transition from "one" to "zero" during the first moment allotted to TOR-channel 8, and at this instant X the TEX-panel 1 is connected to TOR-channel 8. Thus a following call for connection from TEX-panel 12 may not yet be acted upon because all efficient channels are now occupied.

Line 9 of FIGS. 12*b* and 12*b'* indicates that each "zero" to "one" transition of the 200 cycle pulses CD12 or at each five milliseconds, see line 1 at the top of the diagram, the flip-flop DA of the allotter circuit TCA will be brought into its "one" position. This flip-flop DA is brought back to its "zero" position if and when, during this five millisecond period, at least a single TOR-channel proves to be free and efficient, and such occurs when TOR-channel 8 was available in the first cycle of FIGS. 12*b* and 12*b'*.

Line 10 of the graph of FIGS. 12*b* and 12*b'* shows the output DB3 of trigger DB in the allotter TCA changing from "zero" to "one" at the end of each five millisecond period or 200 cycle pulse CD12, when the trigger DA has not been brought to its "zero" position during the preceding five millisecond period, that is to say that not a single free and efficient TOR-channel was available during said preceding period. Under these conditions, the trigger DB indicates that all of the efficient TOR-channels are occupied.

In line 11 of FIGS. 12*b* and 12*b'*, if during the "one" position of the trigger DB, a request for connection is emitted by one of the TEX-panels, one of the occupied TOR transmitting channels must be freed for the transmission of the release signal to the TEX-panel now requesting connection, which herein is TEX-panel 12. This is the interrupt feature. The liberation of TOR-channel 1 and the bringing into the closure position of the TEX-panel 12 is effected by the flip-flop DC in the allotter TCA. If at least one period distance of the 200 cycle pulses CD12 (i.e. five milliseconds) after TEX-panel 12 transmits the request for connection, the flip-flop DB will be still in position "one," the flip-flop DC (FIG. 11) will now be brought into its "one" position at the end of the transmitting period of that TOR-channel now first getting its turn for transmission, if this TOR-channel is occupied and efficient, which in this case is TOR-channel 1, indicated at Y at the diagram of FIG. 12*b*.

The delay of a period of one 200 cycle pulse CD12, is provided by the flip-flops DG and DG in FIG. 11 of the allotter circuit TCA, of which the picking-up and release has been indicated in lines 13 and 14 of the first part of the time diagram of FIGS. 12*b* and 12*b'*. This delay is necessary because the indication from the trigger DB lags with a maximum of five milliseconds on actuation by the trigger or flip-flop DA.

Since TOR-channel 1 is the first TOR-channel to emit an indication of sufficient efficiency after picking up the impulse from the trigger DH as shown in line 14 in FIG. 12*b'*, the trigger DC in FIG. 11 of the allotter TCA is brought into its "one" position Y at the end of the transmission period of TOR-channel 1. This transition of the "zero" to "one" position for the trigger DC via its output DC3 provides for the bringing into the "one" position flip-flop NT in the efficiency tester EO shown in FIG. 15 via the output conductor 280 in FIG. 11. This occurs during the time division for TOR-channel 1. This flip-flop NT in FIG. 15 simulates in its "one" position insufficient efficiency in TOR-channel 1 whereby the TEX-panel 4 will disconnect within a certain delay, from this TOR-channel 1. Thereafter the TEX-panel 12 which is now requesting connection, can seize this TOR-channel 1 for the transmission of a release or busy signal to release itself, namely TEX-panel 12. This release indication for TEX-panel 12 is given by way of the flip-flop YD in the connecting circuit CCB shown in FIG. 18*b* described later, which flip-flop YD will be brought into its "one" position by a transition from "zero" to "one" of the flip-flops DC via the same conductor 280 from its output DC3 in the allotter circuit TCA.

In the lower section of the time diagram in FIGS. 12*b* and 12*b'* it is indicated how the TEX-panel 12 connects up with the TOR-channel 1 directly after TEX-panel 4 has disassociated itself from the TOR-channel 1. It also indicates that the TEX-panel 4 immediately after its release, again makes a request for a connection in order to be brought into connection again with another TOR-channel, as soon as one is released, including TOR-channel 1 after the release of the interrupting TEX-panel 12.

At the seizure of TEX-panel 12, the flip-flop DD of the allotter circuit TCA in FIG. 11 will come into its "one" position as shown in line 12 of the second section of FIG. 12*b*, which indicates that all efficient TOR-channels are now occupied, which is true, but that one of these channels is used for the transition of a release signal. With this "one" position of the flip-flop DD, we prevent TEX-panel 4 now requesting connection from also receiving a release indication.

The parts of the other circuits particularly mentioned in FIGS. 15 and 17 will be referred to again and described in detail below so as to tie-in better with the description of the operation of the above mentioned time diagrams in FIGS. 12*a* and 12*b* and 12*b'*.

II–5. Time base efficiency counter TBT (FIGS. 13 and 14)

As previously mentioned, the only other common circuit in the Central Part according to the time-division embodiment of this invention as shown in FIGS. 4 and 5 comprises the time base efficiency counter or tester circuit TBT for controlling each of the efficiency testers EO. This circuit TBT is shown in FIG. 13 in which there is provided a counter circuit of triggers CM through CW for counting a predetermined number of pulses from the pulse phase distributor circuit PPD to establish one or more periods of time, say of, one-half minute, three-quarters of a minute, or one minute, corresponding to what has been selected by the manual switches S1 shown at the top of FIG. 13. The selected predetermined time or time-base is then conducted to all of the efficiency tester circuits EO of the switching device at this station, which efficiency tester circuits then count the number of errors detected in the corresponding TOR-channel ARQ circuit during each such selected time-base or period, and if the number is higher than a certain predetermined number, then the efficiency is considered too low, and the efficiency tester EO operates to indicate that this particular TOR-channel is not sufficiently efficient to be used, and the corresponding inefficiency signal for said TOR-channel is given to each of the programming circuits TPC of the corresponding TEX-panels at this particular station.

Thus the series of counting triggers of CK through CW in FIG. 13 count successively five millisecond spaced pulses of the 200 Hz. or cycle output of the pulse phase distributor PPD from amplifier CD11 and CD12 in FIG. 7, until sufficient times in the ratios of 2, 3 and 4 to each other can be obtained, according to the settings *a*, *b*, and *c*, respectively, of the manual selector switch S1. The switch S1 is connected between the feedback pulse gate 301 for the first two binary counting triggers CK and CL of the series and the different input potentials, $a=0$, $b=1$, or $c=0$, which respectively count the numbers of 2, 3 or 4 as the output from these first two counting triggers CK and CL. The remaining counting triggers CM through CW of the series count sufficient pulses via the feedback connection 302 to count 1500 of the 200 cycle pulses or 7.5 seconds (1/8 of a minute of time), which time when multiplied by 2, 3 or 4 from triggers CK and CL, produce pulses of 1/4, 3/8 or 1/2 minute time spacings respectively, which are transmitted to input terminal CW4 of the flip-flop CX to stop the flow of 200 cycle pulses via output CX12 to the corresponding input in efficiency tester circuit EO of FIG. 15, and at half these times, pulses from the outputs of trigger CV to operate trigger CY via its input terminals CV3 and CV4, which trigger CY in turn passes these spaced time pulses to counting triggers CZA and CZB for doubling their times twice, over a range of times from 1/8 minute at output CX12 to up to 1 minute at output CZB12 to produce the reset potential pulses for the counting triggers NK through NQ (see FIG. 15) in the efficiency testers EO, at the corresponding different times for use as will be described later in section III which follows. The relationship between the different output potential pulses from triggers CX, CY, CZA and CZB during any one of the selected three different times by switch S1 are shown by broken wave forms in the diagram of FIG. 14. Thus when switch S1 is in its positions *a*, *b* and *c*, the times between successive output pulses from terminals CY12, CZA12 and CZB12 will be as follows:

| Switch S1 position | a | b | c |
|---|---|---|---|
| Output terminals CY 12 | 1/8 minute | 3/16 minute | 1/4 minute. |
| Output terminals CZA 12 | 1/4 minute | 3/8 minute | 1/2 minute. |
| Output terminals CZB 12 | 1/2 minute | 3/4 minute | 1 minute. |

II. Efficiency Tester EO (FIG. 15)

Since one of the important features of this invention which distinguishes it from other selecting circuits known in the prior art of other systems, is the efficiency tester circuit EO, the elements and function thereof will now be described.

Since each character cycle of the particular telegraph system herein involved is of 150 milliseconds duration, these character cycles are counted, in each efficiency tester EO connected to its corresponding automatic error correcting or ARQ circuit of the TOR-channel receiving part, only when its TOR-channel is in repetition. Then if the number of repetition of character cycles or repetition cycles counted is greater than a predetermined amount during the selected proportional half, three-quarters, or one minute period, set by the manual switch S1 in the time base tester TBT, that TOR-channel is considered to be inefficient or of insufficient quality. Thus, during one minute there are 400 character cycles, in a half minute 200 character cycles, and in three-quarters of a minute 300 character cycles.

Referring to FIG. 15 there is shown in the upper right-hand corner thereof, a corner of an associated TOR-channel receiving part with a block wiring diagram of those circuits therein which produce the outputs which are connected to the FLEX-system switching device of this invention, namely: (a) the five-unit stop-start signal on the conductor OV, (b) the idle time indicator on conductor OW for the idle time signals $\alpha$ and $\beta$; (c) the synchronizing or timing pulses on conductor OY; and (d) repetition indicator signal on conductor OX. In this TOR-channel receiving part, there is shown the conductor for the received series signals from the TOR-channel radio link coming in from the right, which signals may be connected directly to a series parallel converter, and then to the RQ signal detector, the idle time $\alpha$ and $\beta$ signal detector, and another code converter which latter may be then connected to a parallel series code converter for connection to conductor OV to FIG. 24. The idle time detector is directly connected to the conductor OW. The incoming series signals are connected to the synchronizing device from which the timing pulse OY is obtained, as well as a signal for controlling the series-to-parallel converter in the TOR-channel receiving part. This synchronizing device also includes a clock pulse generator incorporated therewith. The incoming series signals are also connected to the mark element counter which determines errors in or mutilation of the incoming series constant mark/space ratio signals by counting the number of mark elements in each signal. This error detector or mark element counter together with the RQ signal detector are connected to the repetition device; the RQ signal detector determining whether a repetition is to be made because an error has occurred at a remote station. This repetition device produces the signal which is a repetition indicator on the conductor OX which is used in this efficiency tester circuit EO and which repetitions or repetition cycles are counted in this tester circuit EO.

Thus, FIG. 15 shows specifically a counting circuit of triggers NK through NQ, which count the number of repetitions up to $2^7$ or 128 which are fed thereto via input terminals OX4 and OY3 connected to the associated TOR-channel receiver part. Thus if during these particular periods of time, errors or repetitions occur more than about 25% of the time, then its associated TOR-channel is considered not to be efficient, that is, when the counter counts up to about 25% of the total number of character cycles which can occur during the time set by the switch S1 in the time base tester circuit TBT in FIG. 13. After the expiration of each set time, the counter circuit NK through NQ is set back to zero, when the predetermined number of characters for inefficiency has not been reached during that time, and thus the associated TOR-channel continues to be indicated as being efficient. This efficiency is indicated either by continued traffic transmission or by the presence of idle time signals $\beta$ which are always transmitted over all TOR-channels when the TOR-channel is in its "on" or "no traffic" condition, and is not connected to any TEX-panel.

However, if the number of repetition cycles counted is up to about 25% of the total number of character cycles which can occur within the set period or time, the TOR-channel is then cut-off as will be described later, and the time interval for that TOR-channel to become efficient again is automatically doubled so that its efficiency must be twice as good as it was, before it can be made available for reconnection to a calling TEX-panel.

The first inefficiency indication is determined by the NOR-gate G30 shown in FIG. 15, so that when this NOR-gate G30 is operated, it closes via conductor 310 the pulse gate NR3 in input conductor CZA12 from the time base tester circuit TBT in FIG. 13, so that only the twice as long timing pulses from input conductor CZB12 can then reset the counter triggers NK through NQ. This potential on the pulse gate NR3 is a steady potential as long as the inefficiency exists. Now the number of repetition cycles (or errors) in twice the previous time that they were counted is counted, and this new inefficiency is then detected by the NOR-gate 31 which does not release the steady potential on pulse gate NR3 until the NOR-gate 30 is released by pulse gate NS4 controlled by NOR-gate G31 when this latter NOR-gate G31 detects efficiency, which is twice that of the previous efficiency permitted by NOR-gate G30.

Figure 19:
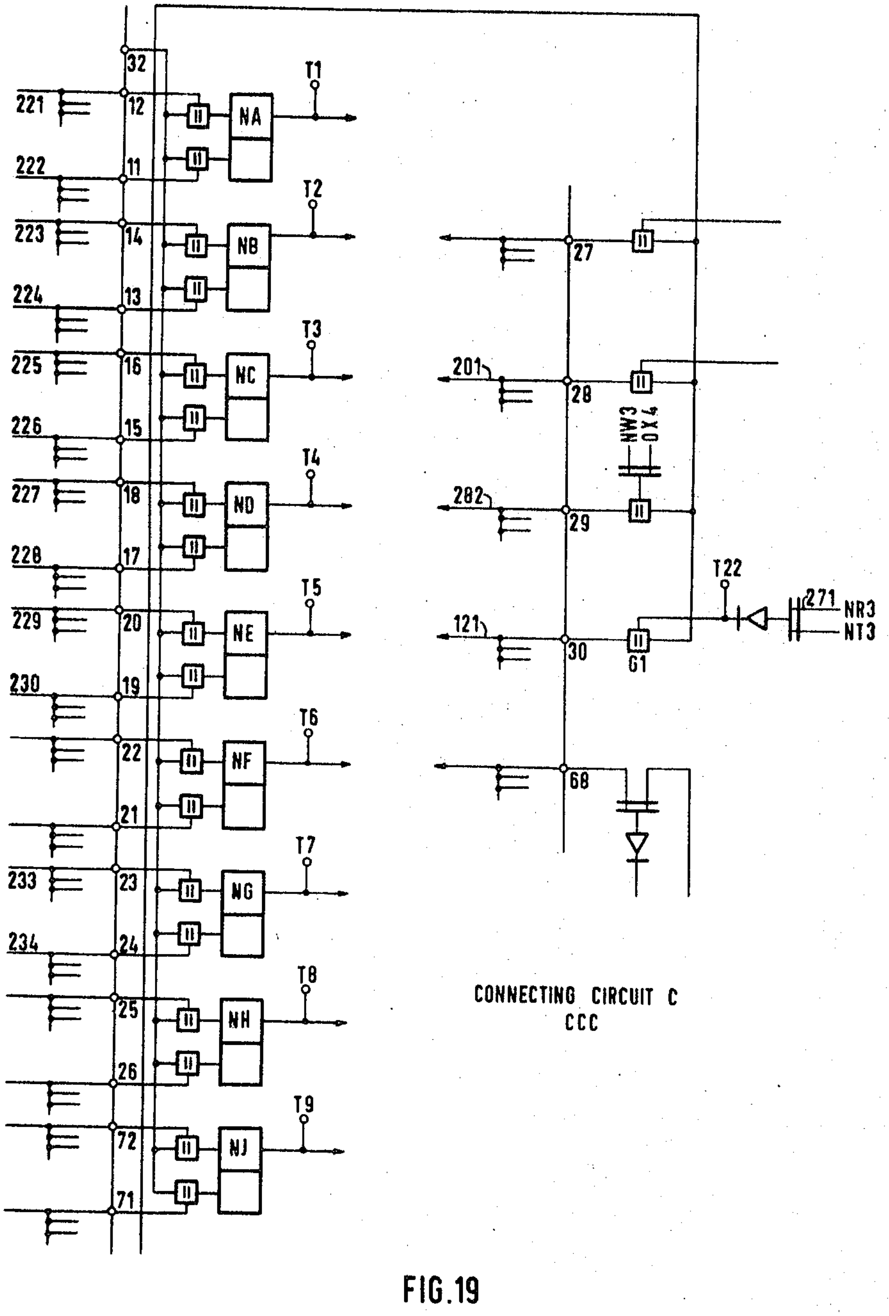
FIG. 19 is a schematic wiring diagram of the connecting circuit to the TOR-channel transmitter part as shown by a block in FIG. 4 or FIG. 5, and connected to the circuits of FIGS. 18*a* and 18*b* through the intermediate flip-flop circuit of FIGS. 16*a* and 16*b*.
Figure 20:
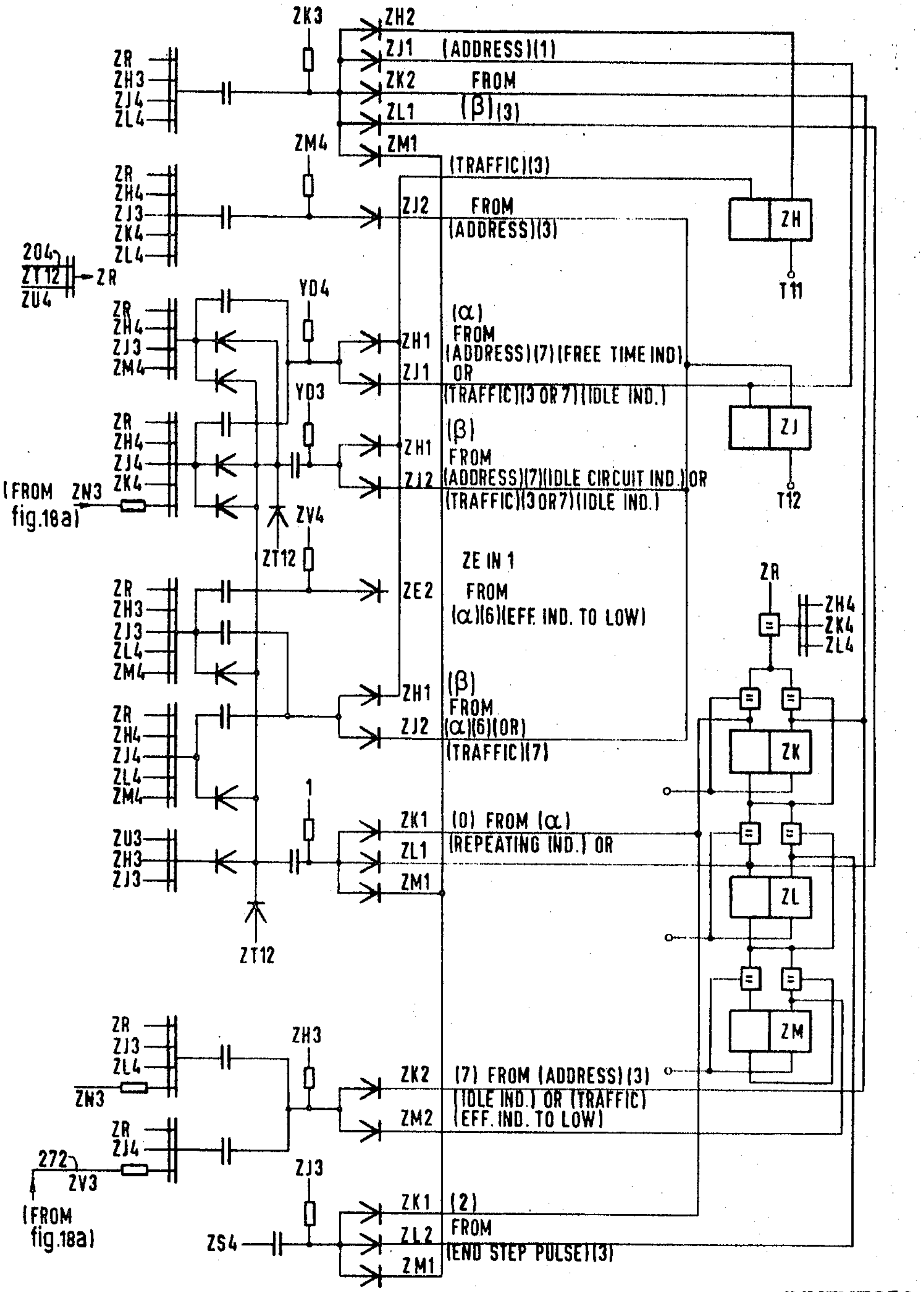
FIG. 20 is a schematic wiring diagram of the transmitter programming counter circuit as shown by a block in FIG. 4 or FIG. 5.

Thus the efficiency or inefficiency condition is transmitted through conductor 271 (see also FIG. 4) to the pulse gate G1 in the connecting circuit CCC (see FIG. 19) and thence through conductor 121 through trigger TN of the intermediate flip-flop IFF shown in FIG. 16, and thence via conductors 141 and 142 to the connecting circuit CCA shown in FIG. 18*a* to trigger ZV, and thence through conductor 272 as the efficiency indication to the input of the programming counter circuit PZ shown in FIGS. 4 and 20. The conductor 121 is multiplied to each of the other transmission program circuits TPC of each of the other TEX-panels of the switching network, so as to give corresponding indications of the condition of that particular TOR-channel to each of the other TEX-panels. Thus the flip-flop or trigger TN in the intermediate flip-flop circuit IFF (FIG. 16) gives the sequential efficiency indications of all sixteen of the TOR-channels to the connecting circuits CCA–1 through CCA–16 via the conductors 141 and 142, and via conductor 143 (see FIGS. 4 and 18*a*) to the channel allotter circuit TCA shown in FIG. 11.

Thus if a going traffic circuit is cut off by inefficiency from the inefficiency tester EO, such is accomplished via conductor 271 from outlet terminal NR4 through the connecting circuit CCC, intermediate flip-flop IFF, connecting circuits CCA and thence to program counter circuit PZ. In this program counter circuit PZ, the traffic circuit itself cannot be cut off until the repetition is stopped, the inefficiency is detected, the end of the character cycle occurs, and after four idle time $\beta$ signals are transmitted, as will be described later in section IV–6. However, if the particular TOR-channel is still inefficient, it still tries to send the four idle time $\beta$ signals anyway, and from one-quarter to one-half of a minute more time is given for this to be done by the triggers NV and NW shown in FIG. 15 of the efficiency tester circuit EO, which triggers NV and NW over-ride the inefficiency indication via conductor 273, which is connected also through the connecting circuit CCC, intermediate flip-flop IFF, and connecting circuit CCA to the corresponding TEX-panel receiving part. After this additional one-quarter to one-half minute expires, even though the four idle time $\beta$ nel then will be disconnected. In this case, however, three characters in the TOR-channel memory could be lost but signals have not as yet been transmitted, the TOR-chan-such rarely occurs.

The time for the transmission of the four idle time $\beta$ signals is sufficient so that the ordinary memory associated with each channel may be emptied. Thus the TOR-channel first tries to transmit the characters from the ordinary memory before any idle time $\beta$ are transmitted, and sometimes none or only one idle time $\beta$ signal is transmitted, which causes difficulty. This difficulty may be overcome by an additional flip-flop or trigger AF (see FIG. 26) in the receiver programming circuit PO described later in section V–4, so that the two TOR-channel receivers will not be connected at the same time to the same TEX-panel. This occurs when the inefficiency indicator EO has already disconnected its associated TOR-channel transmitter part via the connecting circuits CCA and CCC and has already found and connected the particular TEX-panel to another TOR-channel, but the remote station of the TOR-channel has not yet received the four idle time $\beta$ signals to disconnect it. Now since the two TOR-channels at the remote station would be connected to the same TEX-panel, a comparison is made before the second TOR-channel connects to this TEX-panel, and this comparator then cuts off the first TOR-channel which has become so inefficient that it could not even transmit the four idle time $\beta$ signals to disconnect itself. This cut-off of this first or inefficient TOR-channel enables the second TOR-channel then to be connected through the trigger AF operated via conductor 275 (see FIG. 26), which is connected through connecting circuit CCC and intermediate flip-flop IFF, connecting circuit CCB, to the receiver part of the TEX-panel.

The efficiency tester circuit EO also contains an additional trigger NT, shown in the upper left part of FIG. 15, which is controlled by the TOR-channel allotter circuit TCA via conductor 280, as mentioned in section II–4 above, to simulate inefficiency of its associated TOR-channel during and when said TOR-channel is interrupted temporarily for sending a closure or release signal to a different TEX-panel, both calling and at a remote station, under those conditions when no other TOR-channel is available for sending said closure signal. This trigger NT, when energized causes this occupied and disconnected TOR-channel to send a closure signal (i.e. an address, seven $\alpha$ signals, and then idle time $\beta$ signals, and since the TEX-panel to be switched-off is waitning for an available TOR-channel, it immediately grabs this just disconnected and now available TOR-channel as soon as its first $\beta$ signal is detected, and sends the address of the TEX-panel to be shut off thereover. When this TEX-panel is then connected, it may send any stored traffic signals which may remain in a storage register which could not be sent because of the inefficiency of the formerly connected TOR-channel, and then the $\alpha$ closing signals. This cut-off or closing of this TEX-panel is to prevent further charges therefor when no message can be received by it. As soon as this TEX-panel has been closed, the interrupted TOR-channel is free to seek another TEX-panel or to seek back its formerly connected TEX-panel connection by transmitting its address again, which interrupted TEX-panel was kept in a calling condition by trigger DD in the allotter circuit TCA in FIG. 11, and then when reconnected, it continues its traffic which has been interrupted.

Further reference to the operation of the efficiency tester EO and the operation thereof will be made later in combination with the other circuits of this invention.

IV Transmitting Part Programming Circuits (FIGS. 16–23)

Figure 16B:
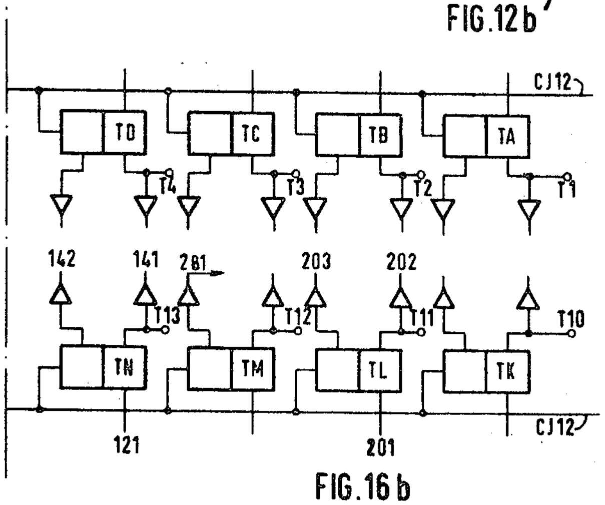
FIGS. 16*a* and 16*b* is a schematic wiring diagram of the intermediate flip-flop connecting circuit connected between the TEX-panel and a TOR-channel, as shown by a block in FIG. 4.
Figures 12B, 16A:
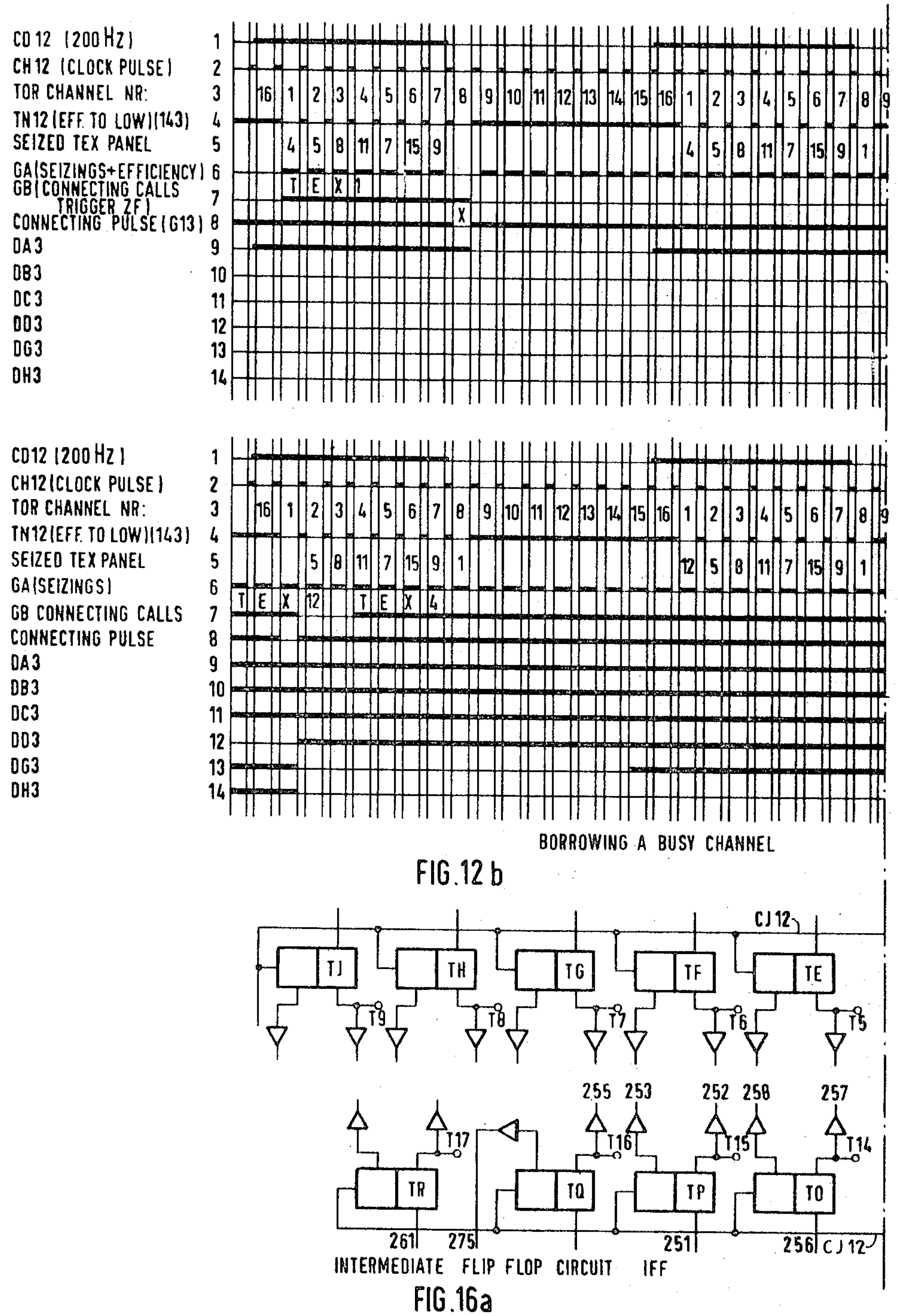

Before going into the details of the other circuits, there is provided in the specific embodiment shown herein, an intermediate connecting flip-flop circuit IFF which is shown in more detail in FIGS. 16*a* and 16*b*. Each of the flip-flops or triggers TA through TN and TO through TR has both of its outputs amplified in separate amplifiers, and each of these triggers is reset according to the pulses from the clock pulse generator circuit CPG via conductor CJ12 shown also at the top of FIG. 7. The triggers TA through TJ are for the signals transmitted from the connected TEX-panel transmitting part connecting circuit CCA to the connecting circuit CCC of the connected TOR-channel transmitting part; the triggers TK through TN are for transmitting indications and conditions from the connecting circuit CCC back to the connecting circuit CCA; and the triggers TO through TR are for transmitting the signals from connecting circuits CCD from the receiver part of the connected TOR-channel receiving part of the connecting circuit CCB of the corresponding TEX-panel receiving part. As previously stated, such triggers are not necessarily employed according to the circuit in FIGS. 5 and 5′, and may comprise only amplifiers, if desired.

IV–1. Connecting and Disconnecting Circuits AAC (FIG. 17)

A TEX-panel must be connected to a TOR-channel, when and only when:

A. It wishes to send a call, that is, when it converts from idle time $\beta$ signals to the address for a call, B. It wishes to send traffic, that is, when it changes from idle time $\beta$ signals to traffic, and C. It wishes to send a closing signal, that is, it changes from idle time $\beta$ signals to the address, and then to seven idle time $\alpha$ signals, which $\alpha$ signals are the indication of the closing signal as previously mentioned and referred to in section I–4 and FIG. 6 above.

Under the condition A above the indication of a call, for example, from the TEX-panel changes the potential on the conductor 18 from negative to positive which indicates the presence of a call. This then passes through the inverter-amplifier in the upper left-hand corner of FIG. 17 in the connecting and disconnecting circuit AAC so that the positive is changed to a negative on conductor ZO4 and this negative to a positive on conductor ZO3 after it passes through a second inverter-amplifier. These two opposite potentials are connected to pulse gates to the input 2 of trigger ZE. This puts the trigger or flip-flop ZE into its "on" position to produce a potential which passes through the OR-gate G12′ and thence through a pulse gate to input 2 of the trigger ZF to put it in its "on" position, which trigger ZF remains "on" until the TEX-panel finds an available and efficient TOR-channel (see point X on the "GB connecting pulse" line 8 in the upper section of the time division graph of FIG. 12*b*). Trigger ZF then applies a potential via conductor 146′ to the NOR-gate GB of the allotter circuit TCA shown in FIG. 11 which applies a "zero" potential to the OR-gate G13 in said allotter circuit as long as a TOR-channel is not connected to this particular TEX-panel.

When a "switching-on" request is given by a TEX-panel, only one TEX-panel can be "on" at one time because of the corresponding TEX-panel, say *x*, pulse phase selector timing pulse P′*x* and the blocking polarity from the allotter TCA via conductor 148 from OR-gate GB and amplifiers and inverter (see FIG. 11), both of which are connected to NOR-gate N12 (at the top of FIG. 17) and thence to the OR-gates G12 in all the TEX-panels associated connecting and disconnecting circuits AAC.

Referring again to the TOR-channel allotter circuit TCA shown in FIG. 11, the OR-gate GA therein passes an output pulse via conductors 146 from all the TEX-panels, which is the busy indication of each TEX-panel, which conductors 146 are connected to the outputs of the phase pulse comparator circuit PV shown in the lower part of FIG. 17 and described later in section IV–3. Also the OR-gate GA in the allotter TCA of FIG. 11 indicates sequentially the efficiency of each of the TOR-channels via conductors 143 (see also FIG. 18*a*) from the efficiency tester circuits EO previously described in section III. Thus when no output is applied over the TEX-panel conductor 146, and when no output is applied over the conductor 143, that is, when the TOR-channel is efficient, then that TOR-channel for this particular phase-position is available and efficient, which then permits a pulse to pass the OR-gate G13 in the allotter TCA by the clock pulse CH12 when it makes a transition from "zero" to "one" at the point X, shown in the time diagram of FIG. 12*b* (also mentioned above). This clock pulse then passes OR-gate G13 in allotter TCA to become the allotter pulse at the time-division connection for the available and efficient selected TOR-channel. This allotter pulse is then conducted at the selected time division via the conductor 149 to OR-gate G14 in the connecting and disconnecting circuit AAC shown near the top of FIG. 17. This allotter pulse then changes the trigger ZF back onto its "off" position indicating a TOR-channel has been found, and simultaneously operates trigger ZG in the pulse phase register PR also in FIG. 17 to its "on" position, to set up the pulse phase registers therein for the time-division or phase connecting to said selected TOR-channel.

In the case B above wherein the TEX-panel wishes to send traffic, that is, when the change is from transmitting idle time $\beta$ signals to that of traffic, the terminal 17 in the upper left of FIG. 17 of connecting and disconnecting circuit AAC, from the TEX-panel transmitter part, changes potential, say from positive to negative, which means that there is traffic to be sent from this TEX-panel. Then the output conductor ZN3 from the inverter amplifier connected to terminal 17 conducts a potential to the program counter circuit PZ, described later in section IV–4 and shown in FIG. 20, to the connecting circuit CCA shown in FIG. 18*a*, and also to OR-gate G12′ in FIG. 17 to operate the trigger ZF in the connecting and disconnecting circuit AAC into its "on" position, and then into its "off" position when the corresponding selector pulse P′*x* occurs when there is no blocking from the allotter TCA via the conductor 148 as previously described. Trigger ZG in the pulse phase register PR is then put into its "on" position the same as for case A.

For the condition in case C above, in which a closure signal is sent such as when the message is completed, then the conductor terminal 18 in FIG. 17 from the TEX-panel transmitter part changes, say from positive to negative potential, which indicates the closure of the TEX-circuit, that is, from traffic or idle time to free line condition. The inverters connected to terminal 18 then change from negative to positive, and from positive to negative on conductors ZO4 and ZO3, respectively, to switch trigger ZE as described in case A above for sending of the special closing signal $\alpha$, as will be further described later in section IV–4.

IV–2. Transmitter Pulse Phase Register PR (FIG. 17)

The pulse phase register comprises the initial trigger ZG mentioned in sections II–4 and IV–1 above, which controls the time-division setting for the four register triggers ZA through ZD, which in turn controls the pulse phase comparator PV described later in section IV–3. The four flip-flop or bi-stable trigger registers ZA through ZD, determine which of the sixteen phase pulses in the pulse phase comparator PV corresponds to the fixed phase pulse of the selected TOR-channel for connecting the connecting circuit CCA to that selected TOR-channel for transmission of the signals from this associated TEX-panel. Thus the register triggers ZA through ZD are set up and permanently stay in their particular positions for this binary phase code number of the selected TOR-channel throughout the transmission of the message from this TEX-panel.

This is according to the time or phase that the allotter pulse from the TOR-channel allotter circuit TCA is passed over conductor 149 to operate the trigger ZG to open the pulse gates at the inputs of the register triggers ZA through ZD, so that the binary-code number or pulse phase time division signal from the pulse phase distributor triggers CA through CD can be set up in said register triggers. Thus the four register triggers ZA through ZD at this selected phase instant are in the same position as the four flip-flops or triggers in the pulse phase distributor PPD shown in FIG. 7, since the two outputs of each of the pulse phase distributor triggers CA through CD are connected via the conductors 145 (shown in FIGS. 4, 7 and 17) labelled CA11 through CD12, to the pulse gates at the inputs 2 of each of the register triggers ZA through ZD. The eight outputs of these four register triggers are connected to each of the eight OR-gates at the inputs to the transmitter pulse phase comparator PV.

IV–3. Transmitter Pulse Phase Comparator PV (FIGS. 17 and 17*a*)

The transmitter pulse phase comparator shown also in FIG. 17 comprises the eight OR-gates from the outputs of the register triggers ZA through ZD, all of which feed via conductors A1, A2, B1, B2, C1, C2, D1 and D2 of the NAND-gate G10 which in turn feeds the OR-gate G11. The NAND-gate G10 compares the states of the registers ZA through ZD with the registers of the pulse phase distributor PPD for the proper phase selected connection of the signals to the selected TOR-channel, and the OR-gate G11 blocks the phase pulses during the phase times within which this TEX-panel is not to be connected to any TOR-channel. Thus, the register triggers ZA through ZD are in a steady state position, while the triggers CA through CD are in continuous rotation, so that only once each rotation are both sets of these triggers in phase and the NAND-gate G10 is opened, and that is at the time-phase division for the connection to the selected TOR-channel.

In FIG. 17*a* there is shown a more detailed wiring diagram of the NAND-gate G10 which comprises an AND-gate in combination with a NOT-circuit, similar to the combination of the OR-gate with the NOT-circuit shown in FIG. 9*a* of a NOR-gate. The inputs to the A1, A2, B1, B2, C1, C2, D1 and D2 of the AND-gate, corresponding to the output conductors from each of the eight OR-gates controlled by the pulse register circuit PR in FIG. 17, are connected by a series of diodes in parallel with a plurality of resistors R11 through R18 connected to a negative potential, the combintion of each said diode and resistor being connected by another separate diode to the resistor R19 of the NOT-circuit which resistor R19 corresponds to the resistor R4 in FIG. 9*a*. Resistors R20 and R21 and transistor T2 correspond respectively to resistors R5, R6 and transistor T1 described above in FIG. 9*a* in section II–3 above. Also, any one or combination of the resistors R11 through R18 act similarly to the resistor R3 in the NOT-circuit of FIG. 9*a*, and are in common for both the AND-gate as well as the NOT-circuit of the particular NAND-gate G10 herein. Therefore, as long as any one of the inputs A1, A2, B1, B2, C1, C2, D1, D2 does not have a "one" value applied thereto, the negative potential connected to the corresponding resistor R11 through R18 will apply a negative to the basis of the transistor T2, and it will become conductive so that the output ONG of the NAND-gate will be at its "one" value. However, if all of the inputs A1, A2, B1, B2, C1, C2, D1 and D2 are of a "one" value, then the basis of the transistor T2 will become positive through resistor R20, and the transistor T2 will be blocked, so that the negative potential through resistor R21 will be applied to the output ONG and it will have a "zero" value or, the lower of the two potential values selected.

The OR-gate G11 is also controlled by output 4 of the trigger ZG in the pulse phase register PR, via conductor ZG4, as well as by the clock pulse CH12 from the clock pulse generator CPG. When the trigger ZG is in its "off" position, the potential on its terminal ZG to OR-gate G11 insures that the NOR-gate N11 comprising the OR-gate G11 will have no ouput, but when the trigger ZG is in its "on" position, it permits a pulse to be sent via the conductor 146 to the allotter which tells the allotter TCA that this particular TEX-panel is connected to one of the TOR-channels at a given phase or time division, which phase corresponds to the particular TOR-channel according to the pulses P1 through P16 derived from the pulse phase selector PPS previously described. For instance when the phase of the output pulse on 146 corresponds with the pulse 7, then the TOR-channel 7 is occupied by the connection of this TEX-panel. Thus the connections are made in phase or pulse time division.

IV.—4. Programming Counter Circuit PZ (FIGS. 20–23)

Referring now to the circuit shown in FIG. 20 of the program counter PZ, it comprises primarily gates shown at the left and triggers or flip-flops shown at the right. The flip-flops ZH and ZJ determine the transmission of the idle time $\alpha$ and $\beta$ signals, the address signals and the traffic when they are in the different positions shown therefor in the table in FIG. 21*b*. The flip-flops ZK, ZL and ZM provide a counter circuit which counts the four idle time $\beta$ signals, the seven idle time $\alpha$ signals, and the three address signals, which are transmitted according to the FLEX system of this invention. The OR- and pulse-type gates shown at the left hand side of FIG. 20 control the triggers ZH and ZJ for the proper signals, and also the counters ZK through ZL for counting the four, seven and three repetitions when in their corresponding positions shown in the tables of FIG. 21, for each of the different types of signals to be transmitted as mentioned above.

If trigger ZH is in its "off" or "zero" position and trigger ZJ is in its "on" or "one" position, idled time $\beta$ signals are sent via output conductor ZJ4 when it is negative, also shown at the top of the connecting circuit CCA in FIG. 18*a*. When the trigger ZH is in its "on" or "one" position and trigger ZJ is in its "off" or "zero" position, the address signal is sent via the gates of the address signal circuit ADG shown at the top of FIG. 18*a*. When triggers ZH and ZJ are both in their "on" or "one" positions traffic is communicated via the gates of the connecting circuits CCA shown in FIG. 18*a* via the five code element terminals 11 through 15. When both triggers ZH and ZJ are in their "off" or "zero" positions, idle time $\alpha$ signals are transmitted via the pulse gates in the connecting circuit CCA in FIG. 18*a*, which pulse gates are so controlled by connection ZJ4 when it is positive. The output ZR in the program counter circuit PZ also controls the connecting and disconnecting circuit AAC via the OR- and pulse gates, when the TEX-panel circuit is to be switched off as is seen at the top of FIG. 17 through its connection to the input terminal 1 of the trigger ZE.

Figure 22:
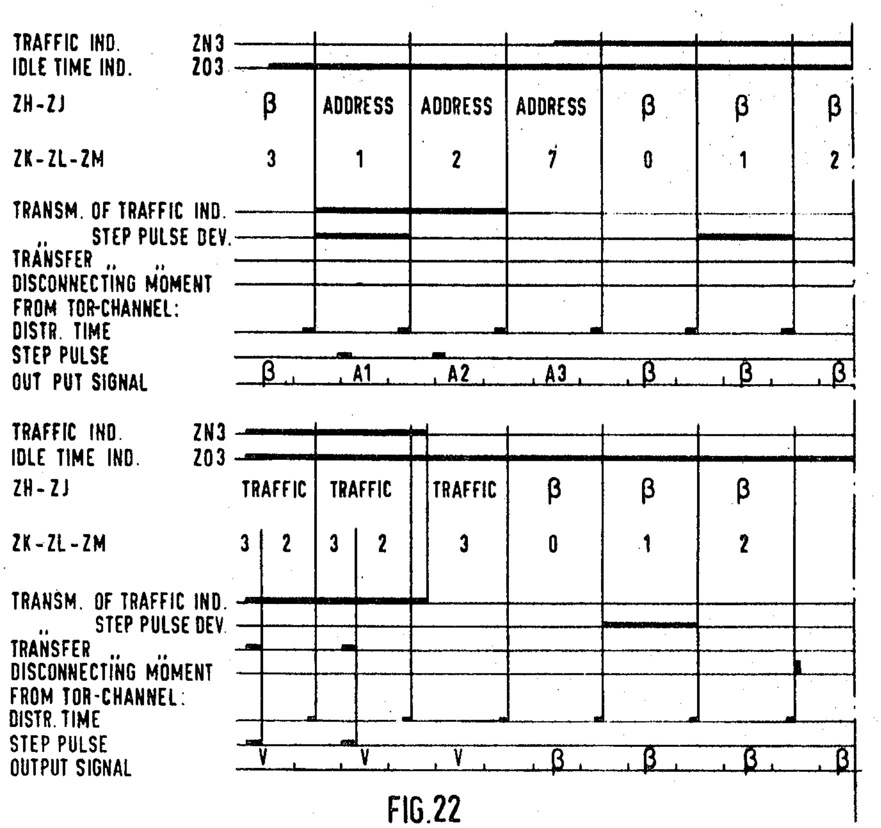
Figure 22:
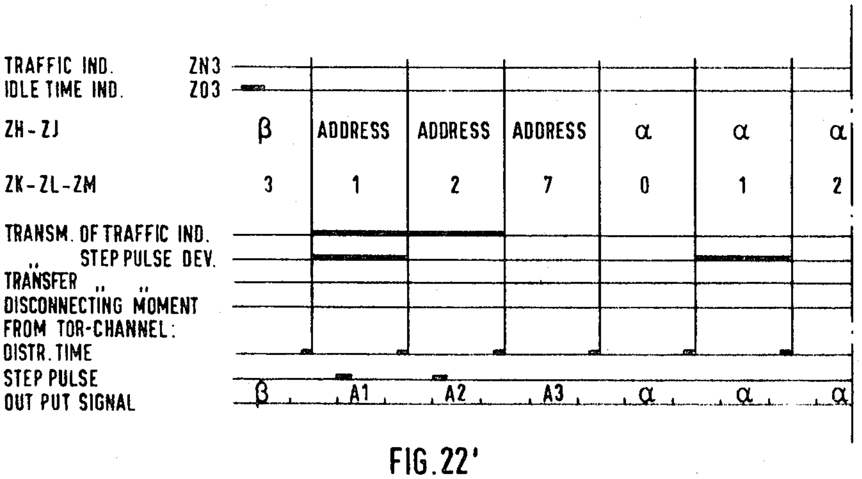
Figure 23:
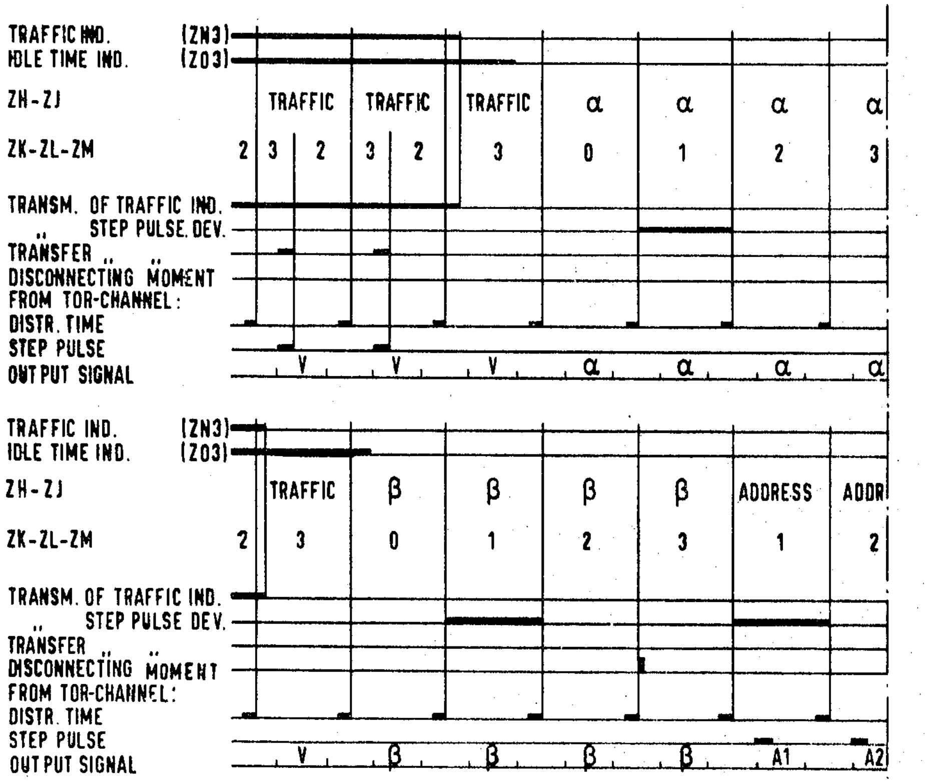
Figure 23:
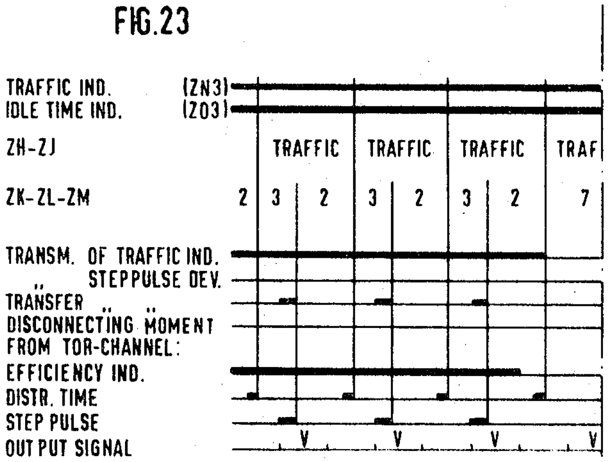

FIGS. 22*a*, 22′, 22′*a*, 23, 23*a*, 23′, *and* 23′*a* disclose time diagrams of different connections for transmitting the address, idle time $\beta$, traffic, and idle time $\alpha$ signals according to the operation of the triggers in the program counter circuit PZ, showing the respective times of their operation relative to the pulses from the distributor PPD and the pulse phase selector PPS circuits.

IV–5. The Address Generator ADG (FIG. 18)

The TEX-panel addresses are pre-set and automatically generated for each TEX-panel by the FLEX system of this invention, and are sent to connect the corresponding TEX-panels at the remote station, via the selected available and efficient TOR-channel.

For example, let us assume that TOR-channel 8 is connected to TEX-panel 1, so that TEX-panel 1 at the remote station is to be selected by the address which is transmitted, which address is that of TEX-panel 1 and corresponds to the binary code number of time division or phase "1." This address of binary code "1" is sent out over the address generator ADG shown in the dotted rectangle or box at the top of FIG. 18*a*, and comprises a series of pulse gates which are controlled according to the repetition circuit of the program counter PZ mentioned in the just preceding section IV–4.

As soon as the TOR-channel 8 is connected, it sends back through the switching circuit CCA a distributor pulse of 10 milliseconds duration each character cycle, which is received directly from the TOR-channel receiving part through conductor 201 in the connecting circuit CCC in FIG. 19, trigger TL in the intermediate flip-flop circuit IFF and conductors 202 and 203 to the trigger ZT in the connecting circuit CCA of FIG. 18*a* and thence via conductor 204 to the OR-gate having output ZR shown at the upper left of the program counter circuit PZ in FIG. 20. This output ZR pulse is connected as shown in FIG. 20 to different ones of these OR- and pulse gates, which control the program counter circuit PZ to first send three consecutive binary code "1" address signals corresponding to TEX-panel 1 phase time-division connection always applied to the five input terminals 26 through 30 connected to the five pulse gates controlled by the pulse-phase comparator circuit PV and the program counter circuit PZ via a common OR-gate having inputs ZB3, ZH4 and ZJ3. This corresponds to case A mentioned in section IV–1 above and is illustrated in the time diagram of the operations of the program counter circuit triggers shown in the top part of FIGS. 22 and 22*a*. Next according to case B in section IV–1 above, four $\beta$ signals are generated and counted before switching off the TEX-panel 1 if no traffic is ready to be sent. Then according to case C in section IV–1 above, seven $\alpha$ signals are generated and counted before closing the circuit, after transmission of four $\beta$ idle time signals, shown in the bottom part of FIGS. 22' and 22'*a* and FIGS. 23 and 23*a*.

IV–6. Connecting Circuits—A CCA (FIG. 18*a*)

As previously described the connecting circuit CCA is composed not only of gates for the transmission of the traffic and the address signals, but also contains the triggers ZS through ZV for the connection of step or successive message signal pulses, the distributor pulses, and the repeating and efficiency indications, to the TEX-panel from the receiving part of the connected TOR-channel as controlled from the remote station. All of these pulses and indications or potentials pass through the triggers TK through TN of the intermediate flip-flop circuit IFF previously described. The different terminals through which these connections are made through the connecting circuits CCA are labelled in FIG. 18*a*.

V. The Receiving Part Programming Circuits (FIGS. 24 through 32)

Now that the circuits for the transmitting of the two different types of idle time ($\beta$ and $\alpha$ or free time) signals, the generation and transmission of the address signal which corresponds in phase number to that of the TEX-panels to be connected, the traffic signals, and the terminals for the indication of information from the TOR-channels to determine their efficiency and availability, have been described, the circuits which are used for receiving the signals from the TOR-channels will now be described. These circuits are those disclosed in the receiving part programming circuits RPC shown in FIGS. 4 and 5, which are shown in more detail in FIGS. 24 through 32 together with some time diagrams therefor.

V–1. The Address Processor AV (FIGS. 24 and 27 through 32)

The transmission of the address from the sending or calling station, which is the binary code number of the phase of the TEX-panel to be connected, is from the address generator ADG via conductors 211 through 215 from the connecting circuit CCA shown in FIG. 18*a*, and thence passed through the intermediate flip-flop IFF triggers TA through TE shown in FIG. 16 to the selected TOR-channel connecting circuit CCC triggers NA through NE via conductors 221 through 230 in FIG. 19. These five signal element storing triggers NA through NE are directly connected to the selected TOR-channel transmitting part, which transmits these five stored signal elements separately and in succession from said triggers NA through NE, which signal elements herein now comprise the address signal binary code number of the phase of the TEX-panel to be connected.

Figure 24:
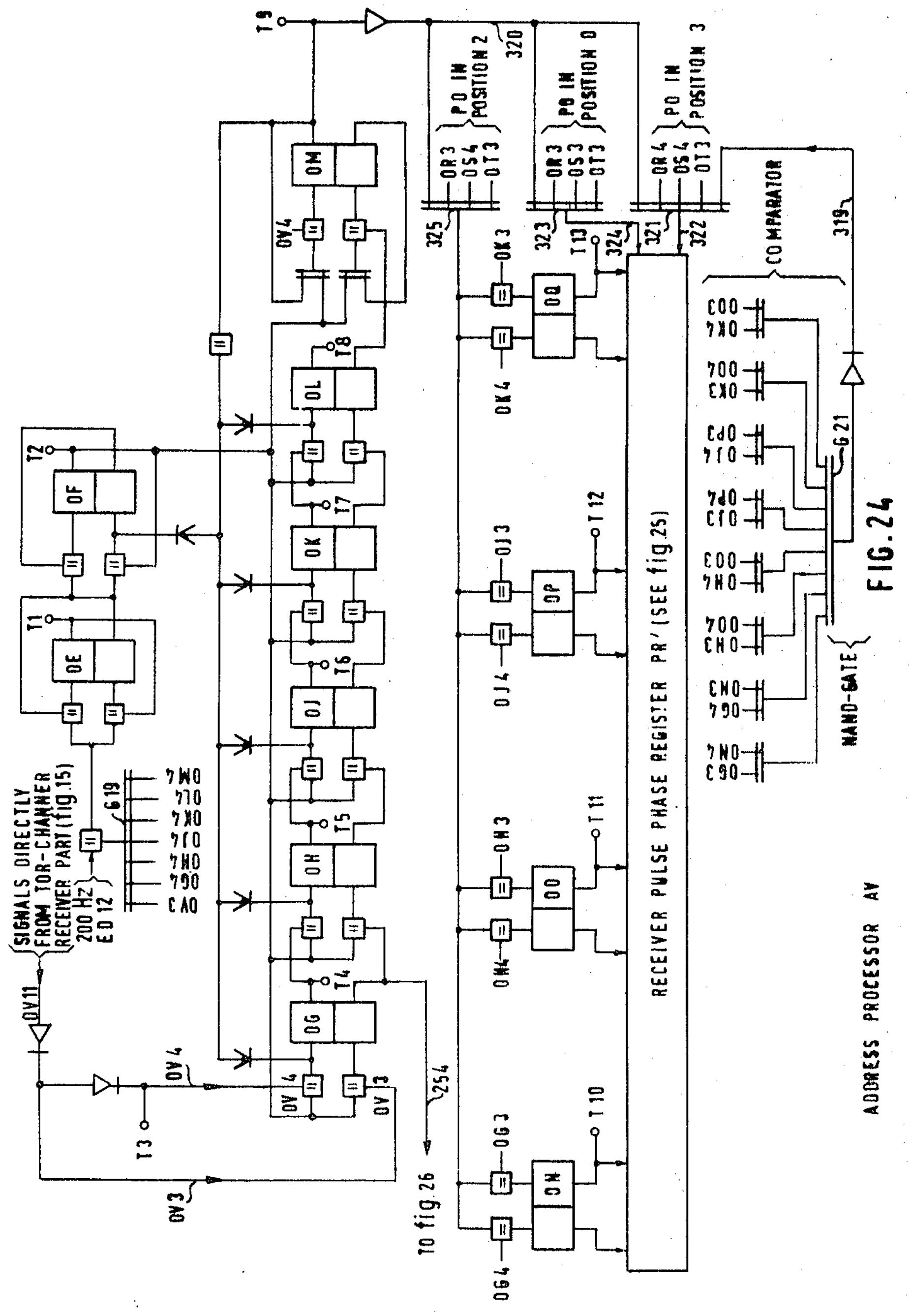
FIG. 24 is a schematic wiring diagram of the address processor circuit connected to the TOR-channel receiving part, as shown by a block in FIG. 4 or FIG. 5′.

At the remote station, from the TOR-channel receiving part (see upper right portion of FIG. 15), the sequentially received elements of the address signal as well as all further signals from the TOR-channel receiving part, are passed via conductor OV to the address processor AV shown in FIG. 24 where they are first passed through the inverters having outputs OV3 and OV4. The elements of each address signal, however, also are passed into the left end of the shift register triggers OG through OM, all of which are in the "on" position before the first address signal is received, plus the start element which precedes the five elements of every signal and is added by the TOR-channel. The address signal elements are shifted until this start element reaches the flip-flop OM, which indicates that a complete first address signal (A1) of five elements has been received. The first element of the address in the flip-flop OL is ignored in that it is not needed because there are only sixteen different TEX-panels in this specific system embodiment. This is because the binary code number for sixteen is "1111," which has only four digits or elements that need to be transferred and stored for comparison in four separate parallel triggers.

In addition, there are provided in this processor circuit AV, input triggers OE and OF for timing and scanning the incoming signals for the shift register triggers OG through OM. Since all of the signal elements are twenty milliseconds long, they are separately scanned in the center of each twenty millisecond period by the timed operation of these triggers OE and OF controlling the input pulse gates to each of the storage triggers OG through OM.

The first address signal (A1), as soon as it is completely received in the first four triggers OG through OK, it is immediately transferred to the four triggers OA through OD in the receiver pulse phase register circuit PR' (see FIG. 25), the operation of which register circuit PR' will be described later in section V–2.

The second (A2) of the three consecutive address signals which are received, also passes into the shift register triggers OG through OM, and is then transferred to a second series of flip-flop registers ON through OQ shown in FIG. 24 where it is stored. This transfer is made when the start element of this second address signal operates the trigger OM to apply a potential via conductor 320 to OR-gate 325 to open the pulse gates at the inputs of each of the second series of triggers ON through OQ.

The third address signal (A3) is then fed into the shift register triggers OG through OM and is compared with the second address signal stored in the flip-flops ON through OQ in the NAND-gate G21 at the bottom of FIG. 24, which NAND-gate operates similarly to the NAND-gate shown in FIG. 17*a* and described in section IV–3 above.

The similarity of two of these three received addresses is determined as follows:

When the second (A2) and third (A3) addresses are compared in NAND-gate G21 to be identical, the second address (A2) stored in the triggers ON through OQ, is transferred to the pulse phase register PR' triggers OA through OD in FIG. 25. This transfer is made via conductor 319, OR-gate 321, and conductor 322 which controls the pulse gates to the series of triggers OA through OD. However, if the second (A2) and third (A3) addresses are not identical, then the first address (A1) must be correct and no transfer is made. Although one transposition of elements is possible in one out of three successive multi-element signals, the chance of having the same transposition in two of three successive signals is so rare that a comparison of any two of the three successively received address signals is adequate. Thus only the second and third received addresses (A2) and (A3) are compared in the comparator NAND-gate G21.

V–2. Pulse Phase Register PR' (FIG. 25)

As soon as the first address signal is received, its second to fifth elements are transferred from the flip-flops OG through OK to the triggers OA through OD of the receiver pulse phase register PR', respectively, by the operation start element operating trigger OM in FIG. 24 to pass a potential via conductor 320, OR-gate 323, and conductor 324 to operate input pulse gates to the triggers OA through OD in FIG. 25.

After the second address or binary code number of the time-division phase of the called TEX-panel is received, stored in the triggers ON through OQ, and compared with the third address, and also transferred to the register triggers OA through OD if the second and third addresses are the same, then these register triggers OA through OD remain with the address phase code number thereon throughout the rest of the transmission of the message or traffic for the proper phase time selection of each element of each message signal which follows. This setting of these triggers OA through OD are therefore retained until this TEX-panel is disconnected from its TOR-channel by the reception of more than two successive idle time $\beta$ signals, or by the closing signals $\alpha$.

Thus the flip-flop registers OA through OD of the pulse phase register PR′ sets up and maintains which of the sixteen pulse phases controlled by the address received by the address processing circuit AV, corresponds to the fixed phase pulse through the connecting circuit CCD to the desired TEX-panel receiver part.

V–3. Pulse Phase Comparator PV′ (FIG. 25)

The outputs of these pulse phase register PR′ triggers OA and OD are applied to the phase comparator circuit PV′ through separate OR-gates to a common AND-gate G20 shown in FIG. 25, for temporary selection and occupation of the TEX-panel corresponding to this first address signal. This is possible because the address also is the binary code number of phase time-division for the selected connection to this TEX-panel, and because each of the four triggers CA through CD of the pulse phase distributor PPD (FIG. 7) has its outputs also connected via conductors 145 to the eight OR-gates feeding the AND-gate G20. Thus each cycle of the pulse phase distributor a connection is made through the AND-gate to the corresponding time or phase connected TEX-panel. For example, TEX-panels 1 at each station have the same address number of phase of P1, TEX-panels 2 at each station have the same address number of phase P2, TEX-panels 3 at each station have the same address number of phase P3, etc. This is similar to the operation of previously mentioned comparator PV for the pulse phase register PR described in sections IV–2, and IV–3, above.

The output of the pulse phase comparator AND-gate G20 in the pulse phase comparator circuit PV′ in FIG. 25 is conducted via the conductor 250 to the connecting circuit CCD shown at the left in FIG. 26, through the pulse gate PP11 controlled by terminal OT4 (described later in section V–4), and conductor 251 through the flip-flop TP in the intermediate flip-flop circuits IFF of FIG. 16, and thence via conductors 252 and 253 to the connecting circuit CCB in FIG. 18*b*. In this connecting circuit CCB, the potential on the conductors 252 and/or 253 operate the trigger YB to connect the receiver part of the selected TEX-panel through terminal 24, to give a temporary call indication to that particular TEX-panel, so that said TEX-panel will know as soon as possible that the call to it has been made, thereby reducing the number of registers required in the TEX-panels or telex exchange. (As in telephony, the shorter the time a register needs to be connected the fewer number of registers are required for the number of subscribers.)

Thus this AND-gate G20 compares the states of the registers OA through OD with the pulse phase distributor pulses from the PPD. However, these pulses are blocked by the trigger AF in the receiver programming counter circuit PO (FIG. 26) when the circuit is to be interrupted and when two idle time $\beta$ signals are received for disconnecting the TEX-panel receiver from its TOR-channel receiver (as will be described below in section V–4).

V–4. Receiver Program Counter Circuit PO (FIG. 26)

The receiver counter program counter circuit PO shown in the right hand portion of FIG. 26 comprises a flip-flop or trigger OU which is controlled by the trigger OM for the start element of each signal shown in the address processor AV, and by the OR-gate P from the repetition indications OX3 and OY3 from FIG. 15, and by the reception of the idle time $\beta$ and $\alpha$ signals via conductor OW also from the associated TOR-channel receiver part in FIG. 15. Thus trigger OU determines when idle time $\alpha$, $\beta$ and traffic signals are received.

The three triggers OR, OS and OT of the counter CPO in this receiver program counter circuit PO count the number of address signals and the number of idle time $\beta$ signals received, that is, three for the address and two for the $\beta$ signals.

The remaining flip-flop or trigger AF in this receiver program circuit PO, switches off the TOR-channel when the same address is received twice from two different TEX-panels, that is, when two calls are received at the same time.

The OR-gate at the upper right corner of FIG. 26 produces a pulse P from its inputs OY3 and OX3 from the TOR-channel receiver part through inverters shown in FIG. 15. These inputs OY3 and OX3, respectively, control the timing of pulse P and indicate when there is repetition so pulse P will prevent operation of this circuit PO. This pulse P also controls the counting triggers OR, OS, OT and OU through the gates connected to their inputs, which triggers in turn control the gates in connecting circuit CCD shown at the left in FIG. 26.

First the trigger OT blocks the OR-gate of pulse gate PP10 to conductor 256 via its output OT4 in the connecting circuit CCD at the left part of FIG. 26, to prevent the address from being transmitted to the TEX-panel as a character for printing via said conductor 256.

After two out of the three consecutive received address signals are determined to be identical, the program counter circuit PO is then operated from the trigger OM in the address processing circuit AV. Specifically the trigger OS via its output OS3 opens the OR-gate to pulse gate PP12 to conductor 259 in the connecting circuit CCD in FIG. 26 to pass a potential pulse to the temporarily connected TEX-panel that it is now definitely connected. This indication is made via the intermediate flip-flop TQ in the intermediate flip-flop circuit IFF of FIGS. 16*a* and 16*b*, thence via conductor 255 to the connecting circuit CCB of FIG. 18*b* to operate the trigger YC therein, thereby signalling via conductor 263 directly to the TEX-panel that its connection to the remote station is now definite, and that traffic can proceed over the conductors 256, 257, 258 and 270 from the connecting circuit CCD in FIG. 26.

If the subscriber which turned its circuit "on" to initiate the above selection of a TOR-channel and remote TEX-panel does not immediately start with the traffic (that is, the subscriber's call number followed by the message), then the idle time $\beta$ signals are transmitted over the selected TOR-channel to this now definitely connected and called TEX-panel, directly after the three address signals are sent, which $\beta$ signals are sent via program counting circuit PZ (FIG. 20) at the calling station's end of the circuit. These idle time $\beta$ signals are generated in the TOR-channel circuit as a result of a negative potential produced at the output of trigger NH in the connecting circuit CCC of FIG. 19. When the called TEX-panel is in its idle position, the output of trigger NH is always in its $\beta$ signal sending position, and remains so until the TEX-panel circuit is closed.

The program counter circuit PO now counts the $\beta$ signals received, and if no traffic has started by the time that it has detected the second successive unmutilated $\beta$ signal, in the counting triggers OR, OS, and OT, the receiving part of the TOR-channel is disconnected from this selected called TEX-panel. At the transmitting end, however, the calling TEX-panel is only disconnected after it has sent four $\beta$ signals after the three address signals under the control of its program counter circuit PV, provided of course no traffic is started before this time. If no traffic is ready for sending after the third address and the fourth $\beta$ signal is sent, then no traffic can thereafter be sent until after a new address is sent and a new TOR-channel is selected, which may be the same TOR-channel, because it has been disconnected after the second $\beta$ signal has been detected in the program circuit PO which made it again available as any other available TOR-channel.

Figures 18B, 21A, 21B:
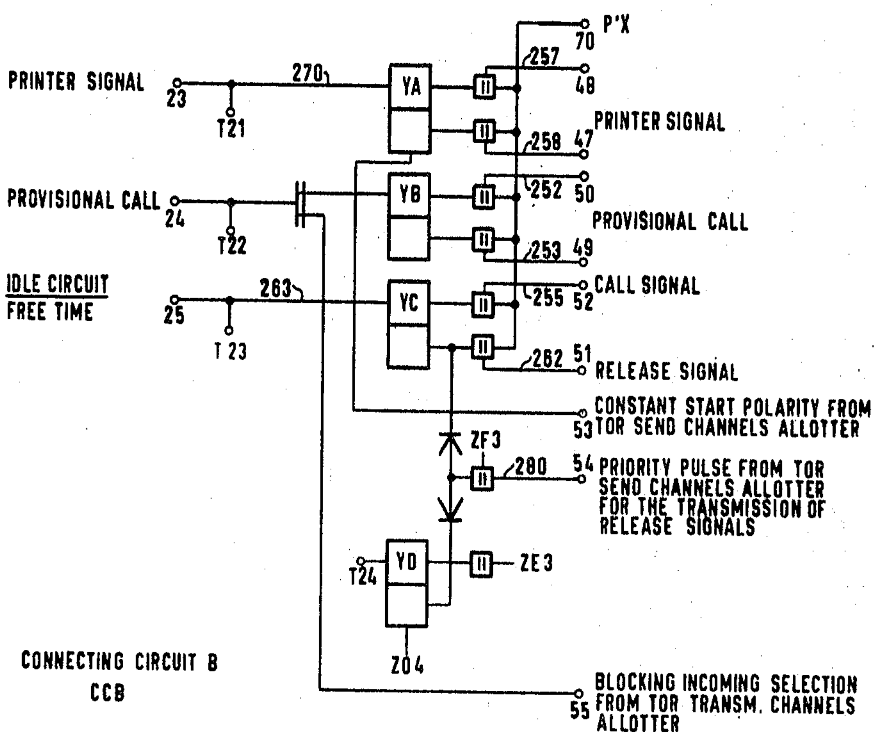
FIG. 18*b* is a schematic wiring diagram of the receiving connecting circuit between the TOR-channel receiver part and the TEX-panel receiver part, as shown by a block in FIG. 4 or FIG. 5.
FIGS. 21*a* and 21*b* are tables of the positions of the triggers shown in FIG. 20 corresponding to the different special signals and numbers to be determined and counted thereby.

When the traffic is sent right after two identical address signals have been received and a definite connection has been made to the called TEX-panel, this traffic successively triggers only the first trigger OG of the first series of shift register triggers OG through OM in the address processor circuit AV of FIG. 24, and the traffic signal elements are sent in succession as received (without being stored or compared in this system device) via the conductor 254 to the pulse gate PP10 input OG4 shown in the connecting circuit CCD to the conductor 256, and thence directly through the intermediate flip-flop TO of circuit IFF in FIGS 16. and thence via conductors 257 and 258 to the connecting circuit CCC in FIG. 18*b* to operate the trigger YA therein which is directly connected via conductor 270 to the TEX-panel and on for printing. The proper phase or time division selection for all of these traffic signals is controlled by the input OZ3 to the OR-gates of the pulse gates PP10, PP11, PP12, and PP13 in the connecting circuit CCD, which inputs OZ3 are connected to the terminal OZ3 from the AND-gate G20 in receiver pulse phase comparator circuit PV′ shown in FIG. 25.

When the traffic is completed and a closure signal or a free line condition is received from a TEX-panel directly after the traffic, that is, by the sending of seven idle time $\alpha$ signals controlled by the transmitter program counter circuit PZ (FIG. 20), the reception of these seven $\alpha$ or closing signals in the TOR-channel receiver part is indicated via the inverter outputs OW3 and OW4, positive and negative, respectively, shown at the right of FIG. 26. This is the opposite polarity for that indicating idle time $\beta$ signals. This opposite polarity on input OW3 to the pulse gate PP13 in the connecting circuit CCD at the left in FIG. 26, is conducted via conductor 261 through flip-flop trigger TR of circuit IFF (FIG. 16) and conductor 262 to re-set the trigger YC in connecting circuit CCB of FIG. 18*b*, to cancel the definite call indication on the conductor 263 from its output to the TEX-panel, thereby indicating the availability of this TEX-panel for any TOR-channel. These seven idle time $\alpha$ signals also can be sent after an address signal by operating the shut-off switch in the transmitting or calling TEX-panel, however, such rarely occurs. Once a TEX-panel is disconnected, the TOR-channel previously connected to it continues to send idle signals automatically until it is selected for the transmission of another message.

Also when the idle time $\alpha$ signals are received at a TOR-channel, there is a constant "start" polarity on the printer or message signal conductor 270 from the connecting circuit CCB of FIG. 18*b*, and when an idle time $\beta$ signal is received from the associated TOR-channel, there is a constant "stop" polarity applied to this conductor 270. Thus according to the present FLEX system when an idle time $\beta$ signal is given, this means that the TEX-panel can be connected to another TOR-channel; similar to when an idle $\alpha$ or clearing signal was given in the prior art when a constant and direct connection between each TEX-panel and TOR-channel was employed.

FIGS. 27 through 32 are time diagrams of the operations of the different triggers and gates shown in the receiver program counter circuit PO of FIG. 26, including its control by the address processor circuit AV shown in FIG. 24, for reception sequences of the different type signals, namely, idle time $\beta$ and $\alpha$ signals and address signals, and the counting of the numbers thereof. In effect, these time diagrams show in more detail how the signals transmitted in the time diagrams of FIGS. 22, 22*a*, 22′, 22*a*′, 23, 23*a*, 23′ and 23*a*′ are received.

Figure 27A:
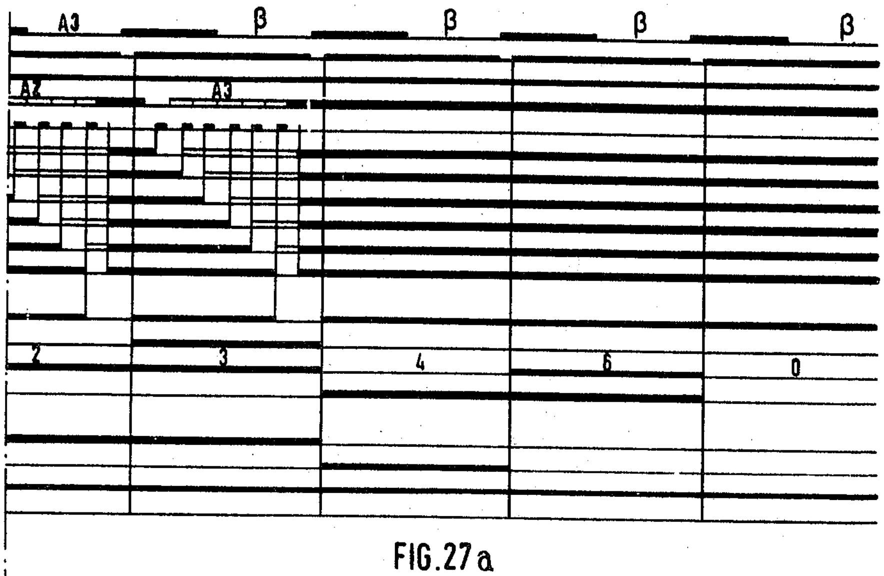
Figure 27:
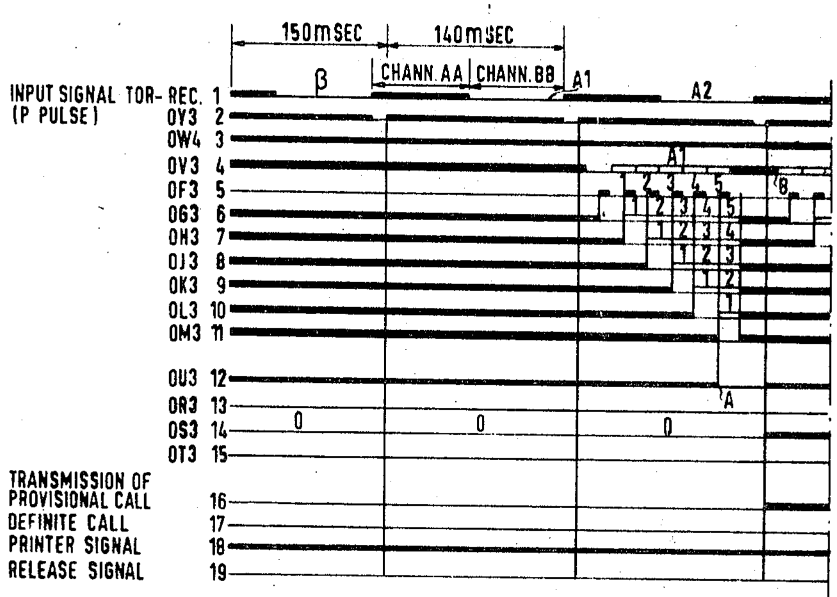

Referring first to the time diagram of FIGS. 27 and 27*a*, there is shown how three consecutive address signals are received which are followed by idle time $\beta$ signals. In line 1 of this diagram there are shown the seven-unit input signals of two TOR-channels AA and BB from a TOR receiver, with the signals of only one of these channels (BB) being shown in the spaces indicated $\beta$, A1, A2, A3, $\beta$, $\beta$, $\beta$, and $\beta$. The thick horizontal lines between these spaces represent the times in which the other channel AA receives its signals. The description of the numbered horizontal lines of FIG. 27 correspond also to the similarly numbered lines in each of the following time diagrams of FIGS. 27*a* through 32.

In lines 2 there is shown the ten millisecond timing pulse from the TOR-channel which occurs between each received signal of 140 milliseconds. After inversion of this timing pulse, as indicated by the output OY3 in FIG. 15 from the TOR-channel receiving part, it is conducted to the receiver programming circuit PO of FIG. 26 to control the OR-gate in the upper right-hand corner of FIG. 26 to produce the pulse P. The other input to this same OR-gate is from the repetition indicator signal introduced over the input conductor OX3 which has a constant polarity from the TOR-channel receiving part shown in FIG. 15, which input OX3 blocks operation of the circuit when the TOR-channel is in repetition. Thus the output pulse P of this particular OR-gate is only "zero" during ten milliseconds after each TOR revolution, which means that the cycle of the present system is about 150 milliseconds or the distance between the vertical lines in the time diagrams in FIGS. 27 through 32, and then only when the TOR-channel is not in repetition. Also, only during the transition from "zero" to "one" of the pulse P, do the flip-flops of the counter CPO shown in the receiving programming circuit PO of FIG. 26 make any change in position.

Figure 29:
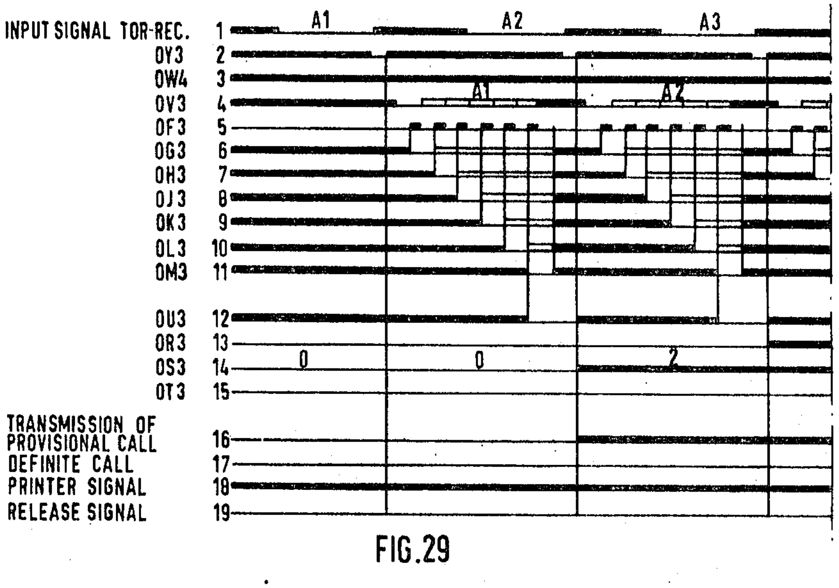
Figure 29:
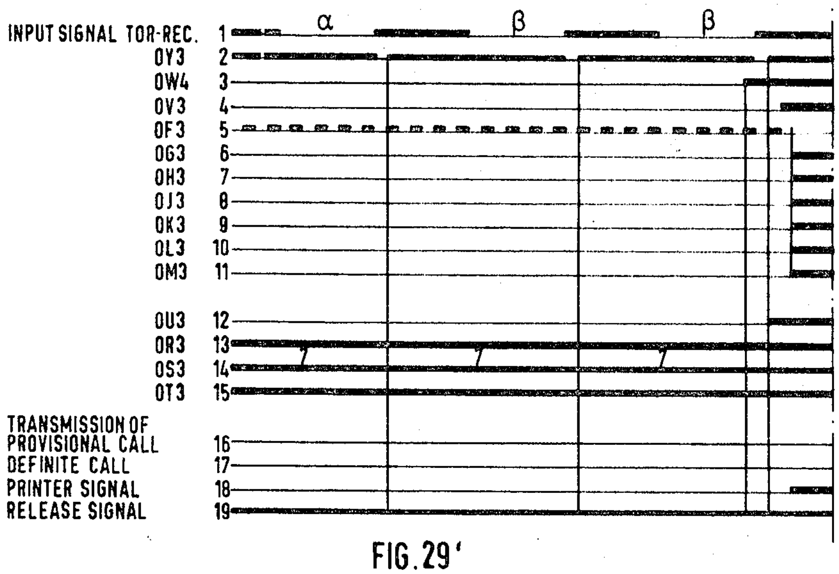

In lines 3 the output OW from the TOR-channel receiver part of FIG. 15, is connected to the inverters shown at the left side of FIG. 26, the output OW4 of the second of which takes a "one" value after reception of two consecutive $\beta$ signals, and a "zero" value after the reception of two consecutive $\alpha$ signals (this latter is shown in line 3 of the time diagram of FIG. 29). The outputs in the terminals OW4 and OW3 from these two inverters produce opposite conditions which are used to control the trigger OU in FIG. 26.

In lines 4, a five-unit start-stop signal (or "start" signal) via conductor OV from the TOR-channel receiving part in FIG. 15, is connected to the address processor circuit AV after passing through the inverters shown in the upper left-hand corner of FIG. 24. This start-stop signal OV3 from the output of the first inverter only opens up or is of "zero" value during the time that traffic or address signals are to be received.

In lines 5, the output of the binary divider OF shown in FIG. 24 is indicated. This is the second of the two cascaded binary counters OE and OF by which the 200 Hertz or cycle frequency from the input conductor CD-12 from the pulse phase distributor PPD shown in FIG. 7, is divided by four.

In lines 6 through 11, there are shown the outputs OG3, OH3, OJ3, OK3, OL3 and OM3, respectively, of the series of shift register triggers OG through OM shown in FIG. 24 of the address processor circuit AV. The "zero" to "one" transitions of the trigger OF via its output OF3, which occurs once each twenty milliseconds, serves as a shift pulse for the shift register consisting of the flip-flops OG through OL. Into this shift register of triggers OG through OL, are fed the "start" and then successively the five information signal elements of the received signal from the TOR-channel receiving part. For this purpose, the four-counter triggers OE and OF will start as soon as there occurs in the output signal a "start" element. The initial position of the four-counter triggers OE–OF is such that the "zero" to "one" transition on the output terminal OF3 will fall in the middle of the "start" element with a tolerance of plus or minus 2.5 milliseconds. During the first "zero" to "one" transition, the "start" element is shifted on to the trigger OG, during the second transition it is shifted on to the trigger OH, during the third transition on to the trigger OJ, and so forth. The four-counters OE–OF operate until twenty milliseconds after the moment in which the "start" element will have reached the trigger OM, during which twenty milliseconds the trigger OM is in "zero" position or its "start" polarity. This is the heavy dark line which crosses the vertical line and ends at the point A indicated in line 11 in FIG. 27. The five information signal elements now will be present in parallel on the flip-flops or triggers OG through OL for further processing in the address processor circuit AV. The following "zero" to "one" transition of the output OF 3 shifts the "start" element on to trigger OM, and brings this trigger OM back into its "one" position, which causes a transition in its output OM3 to re-set all the other flip-flops in shift register OG through OL into their "one" position, and to re-set the four-counter triggers OE–OF into their initial or starting position for counting a new or the next received signal cycle. The input pulse gate G19 to the four-counter triggers OE–OF in FIG. 24 is now further blocked until the "start" element of the following five-element information signal is received, indicated at B in line 4 of FIG. 27.

In lines 12, the output from the flip-flop OU in receiver program counter circuit PO in FIG. 26 is shown. This flip-flop OU assumes at each "zero" to "one" transition in pulse P its "one" position or the position occupied by output OW4 (see lines 4), that is at each vertical line in the time graphs of FIGS. 27 through 32 where there is a break in the pulse shown in line 2. If in the meantime a five-unit start-stop signal arrives, the "zero" to "one" transition now occurring on the output OM4 will convert a possible "one" position of the trigger OU into the "zero" position, as shown at the point A in line 12 of FIG. 27. During the occurrence of a "zero" to "one" transition in the pulse, it thus may be concluded from the position of trigger OU that: if OU is in its "one" position, a $\beta$ signal has been received; and if OU is in its "zero" position, a five-unit traffic signal or an $\alpha$ signal has been received. This information is used in controlling the flip-flops OR, OS, OT and AF in the receiver program counter circuit shown in FIG. 26.

In lines 13, 14 and 15 the positions of the flip-flops OR, OS and OT of the counter CPO in the receiver program counter circuit PO are shown. These flip-flops OR, OS and OT change their position during the occurrence of a "zero" to "one" transition on the pulse P, whereby their new position will depend upon their former positions in combination with the positions of the trigger OU. The combination of positions have been numbered as follows:

| Positions | Trigger OR | Trigger OS | Trigger OT |
|---|---|---|---|
| "0" | "zero" | "zero" | "zero" |
| "1" | "one" | "zero" | "zero" |
| "2" | "zero" | "one" | "zero" |
| "3" | "one" | "one" | "zero" |
| "4" | "zero" | "zero" | "one" |
| "5" | "one" | "zero" | "one" |
| "6" | "zero" | "one" | "one" |
| "7" | "one" | "one" | "one" |

The different positions 0 through 7 of the counter CPO are indicated at the inputs and outputs of the pulse gates PP1 through PP9 shown along the upper portion of the wiring diagram of the receiving program circuit of PO in FIG. 26.

Position 0 for the counter CPO is taken after two consecutive $\beta$ signals have been received. In this position a TOR-channel is not connected with the TEX-panel. If during this "zero" position a five-unit information signal arrives, the information in the flip-flops OG through OK is (during the now occurring transition from "zero" to "one" on the output conductor OM3) transferred to the register flip-flops OA to OD in the receiver register circuit PR′ shown in FIG. 25. This is now considered as the first address signal (A1).

The counter CPO is brought from its 0 into its 2 position by way of the pulse gate PP4 when the trigger OU has been brought from its "zero" to its "one" position by the reception of the first address signal A1. During the position 2 of the counter CPO, a preliminary call is transmitted to the TEX-panel of which the binary number has in the meantime (during position 0 described above) been fixed in the receiver pulse phase register PR′. The second address signal (A2) arriving during this position 2 is registered in the flip-flops ON through OQ of FIG. 24, which takes place also during a "zero" to "one" transition in the output conductor OM 3.

The counter CPO reaches position 3 from position 2 by way of pulse gate PP2, because the trigger OU has been brought into its "zero" position by the reception of the second address signal (A2). A preliminary call (see line 16 in the diagram of FIG. 27), is also transmitted during this position 3 at which time the third address signal (A3) also arrives. During the now following "zero" position of the trigger OM, the comparator circuit (comprising NAND-gate G21) shown in FIG. 24 compares the third address signal (A3) (meanwhile registered in the triggers OG through OK) with the second address signal (A2) still present on the triggers ON through OQ. If these two address signals are the same, the second address signal (A2) is transferred to register triggers OA through OD of the receiver pulse phase register PR′ shown in FIG. 25 during the "zero" to "one" transition on the trigger OM. If the third address signal (A3) is not the same as the second address signal (A2), the first address signal (A1), which has been transferred to triggers OA through OD, remains in these triggers. It is now supposed that not more than a single address signal out of three address signals has been mutilated in transition.

The counter circuit CPO is brought into position 4 by way of pulse gate PP7 from position 3, because the trigger OU has reached its "zero" position by the reception of the third address signal (A3). During this position 4 a definitive call indication is transmitted to the selected or called TEX-panel, on the basis of the address signal now present in the register triggers OA through OD, as shown in line 17 in the time diagram of FIG. 27*a*.

The counter CPO goes from position 4 into position 6 by way of the pulse gate PP9, because the third address signal (A3) has been followed by a $\beta$ signal, which is recognizable from the "one" position of the trigger OU during the "zero" to "one" transition in the pulse P controlling this trigger OU.

The counter circuit CPO then gets from position 6 into position 0 by way of pulse gate PP3, because the first $\beta$ signal has been followed by a second $\beta$ signal. Since no traffic has as yet been received, the normally "on" printer has not been changed (see line 18 in the time diagram of FIGS. 27 and 27*a*).

Thus the reception of several address and $\beta$ signals are indicated by the pulses in lines 16 through 19 of FIGS. 27 and 27*a*, according to the different positions of the counter circuit CPO shown in FIG. 26.

Figure 28A:
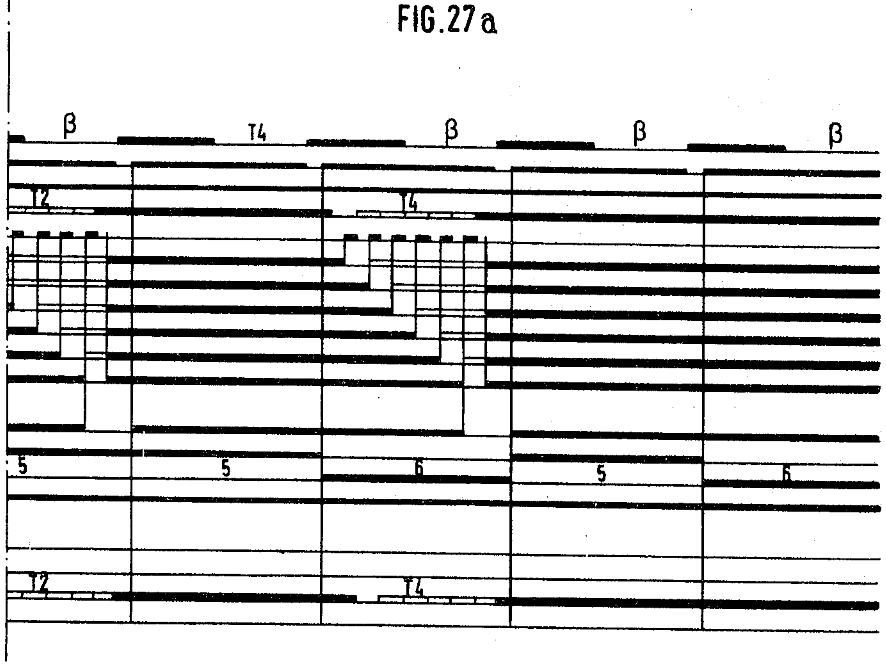
Figure 28:
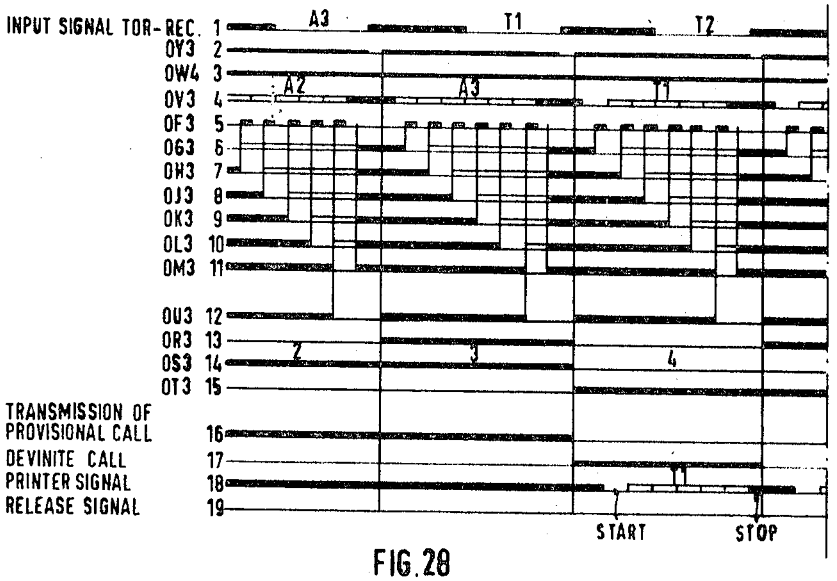

Referring now to the time diagram shown in FIGS. 28 and 28*a*, the reception of the last of three address signals (A3) is immediately followed by traffic signals (T1) and (T2), as shown along line 1 of FIG. 28. The counter circuit CPO in FIG. 26 now assumes the following positions, after its position 4 for the reception of the third address signal (A3); namely: it goes from position 4 to position 5 by way of pulse gate PP8, because after the third address signal (A3) a traffic signal (T1) has arrived, as may be deduced from the "zero" position of the trigger OU during the "zero" to "one" transition effected by the pulse P controlling this trigger OU. Also during the traffic which now follows, position 5 of this counter circuit CPO is maintained.

Let it be supposed that the traffic signal (T3) has been transposed into a $\beta$ signal. Then by way of the pulse gate PP9 the counter circuit CPO will go from position 5 to position 6, but after the reception of a single $\beta$ signal another traffic signal (T4) is received. This return to position 5 occurs by way of pulse gate PP8 shown in FIG. 26.

In lines 16 through 19 in the graph of FIGS. 28 and 28*a*, the transfer to the printer (see line 18) of these five-unit traffic signals together with a start and stop element are shown during positions 4 and 5 of the counter circuit CPO.

Referring now to lines 1 of the diagrams of FIGS. 29, 29*a*, 29′, and 29′*a*, one of which diagrams follows the other in sequence, there is shown in FIGS. 29 and 29*a* the reception of a closing signal or idle time α signal after reception of the three address signals, and then in FIGS. 29′ and 29′*a*, after the last α signal there are received β signals followed by three new address signals. In other words, FIGS. 29, 29*a*, 29′, and 29′*a* denote the transference of a release signal.

Line 3 of FIG. 29*a* shows that the output pulse OW 4 changed from its "one" to its "zero" value after the reception of two consecutive α signals, as a consequence of which the counter CPO goes from its position 4 to its position 7 by a direct control of flip-flops OR, OS and OT by the pulse OW3 input. Then after three consecutive α signals are received (see line 19), a release signal is given to the TEX-panel.

Line 3 of FIG. 29′ shows the pulse OW4 brought from its "zero" to "one" value by the reception of two consecutive β signals. At the now following "zero" to "one" transition in the pulse P, the trigger OU will come into its "one" position. The next following "zero" to "one" transition brings the counter circuit CPO from its position 7 to its position 0 by way of the pulse gate PP3.

Figure 30:
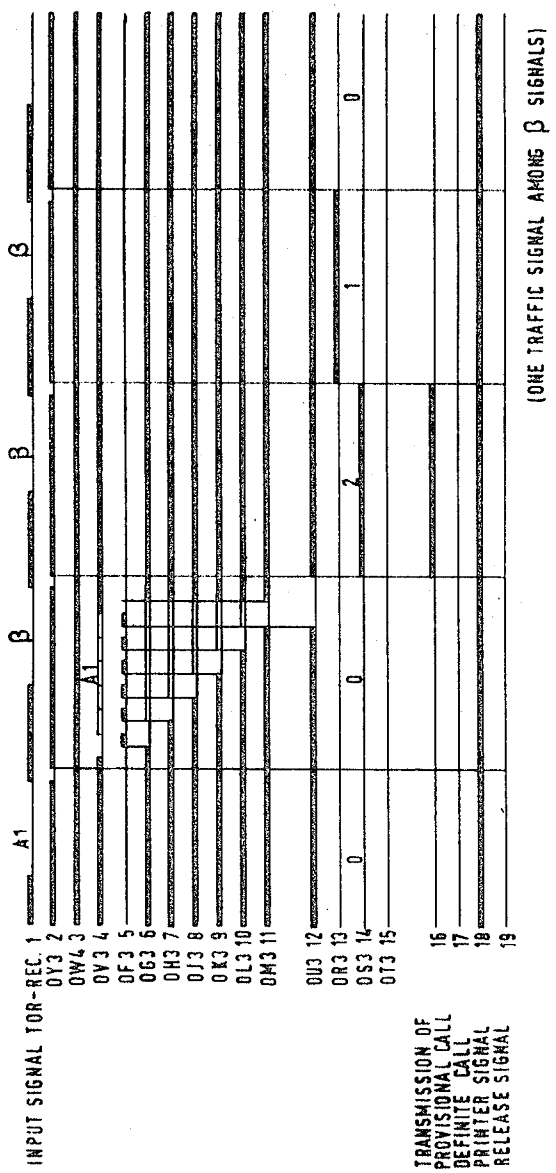
FIG. 30 represent the detection of one traffic signal among idle time signals.

Referring now to the time diagram of FIG. 30, there is shown the operation of the triggers of FIG. 26, when a traffic signal is received between a series of idle time β signals, which traffic signal herein is indicated as (A1), because it is considered as an address signal by the circuit of the system of this invention. This would only occur if one of the β signals were mutilated into what might be considered a traffic signal. In this case the receiving program counter circuit PO of FIG. 26 considers this signal in the first instance as the first address signal (A1), and the counter circuit CPO therein goes from its position 0 to its position 2 according to the above table. During this position 2, a provisional call is transmitted to the TEX-panel which corresponds to what has been regarded as a first address signal. If after this first address signal, a β signal arrives, the counter circuit CPO is transferred from its position 2 again into its position 1 by way of pulse gate PP1. The immediate return into the position 0 of the counter circuit CPO is not yet possible, because there is no certainty that this first address signal (A1) has been a transposed β signal, and that the now arriving β signal has not been a transposed second address signal (A2). Thus the position 0 of the counter CPO is again occupied, if and only if the second β signal followed the first β signal, so that pulse gate PP6 is operated and no comparison is made. Therefore the β signals must be different from any binary phase time division number.

Figure 31:
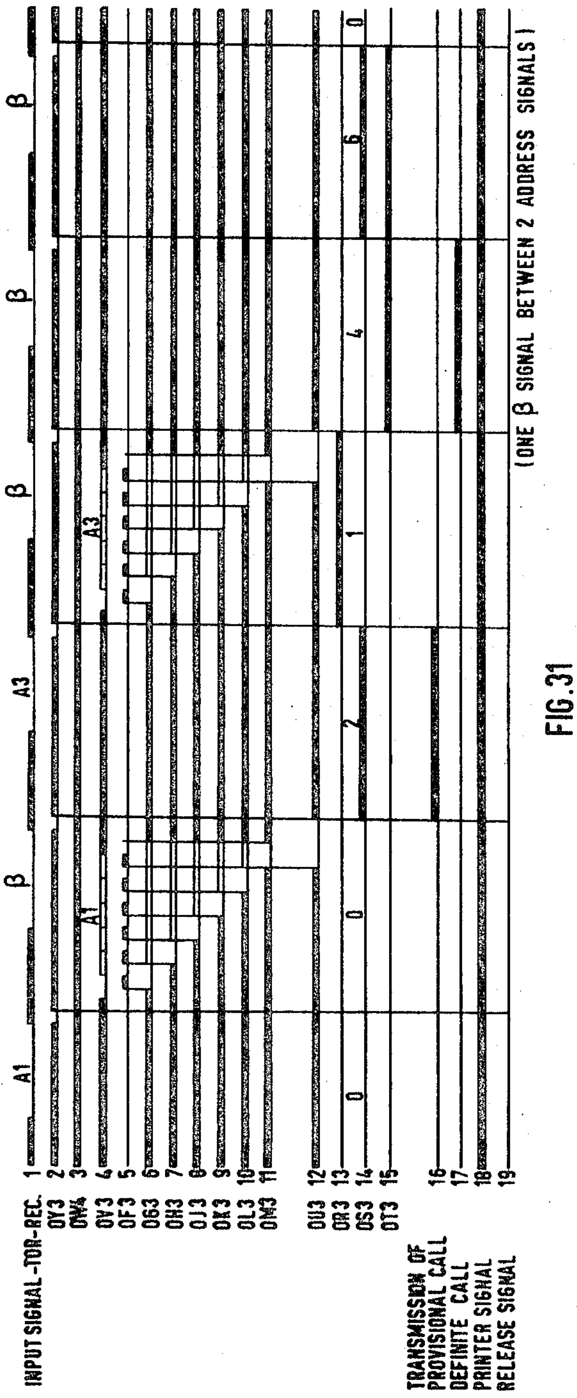
FIG. 31 represents the detection of an idle time signal among traffic signals.

Referring to the time diagram of FIG. 31, there is shown how the circuit of FIG. 26 will operate in the event that a β signal occurs between two address signals; that is, when the second address signal (A2) is transmitted into a β signal. In this case the counter circuit CPO shown in FIG. 26 goes from its position 1 into its position 4 by way of pulse gate PP5, but the transmutation of the second address signal (A2) is considered only a mutilation of an address signal, and since two address signals (A1) and (A3) are properly received, the corresponding TEX-panel is properly seized and held at least until the following two β signals are received.

Figure 32:
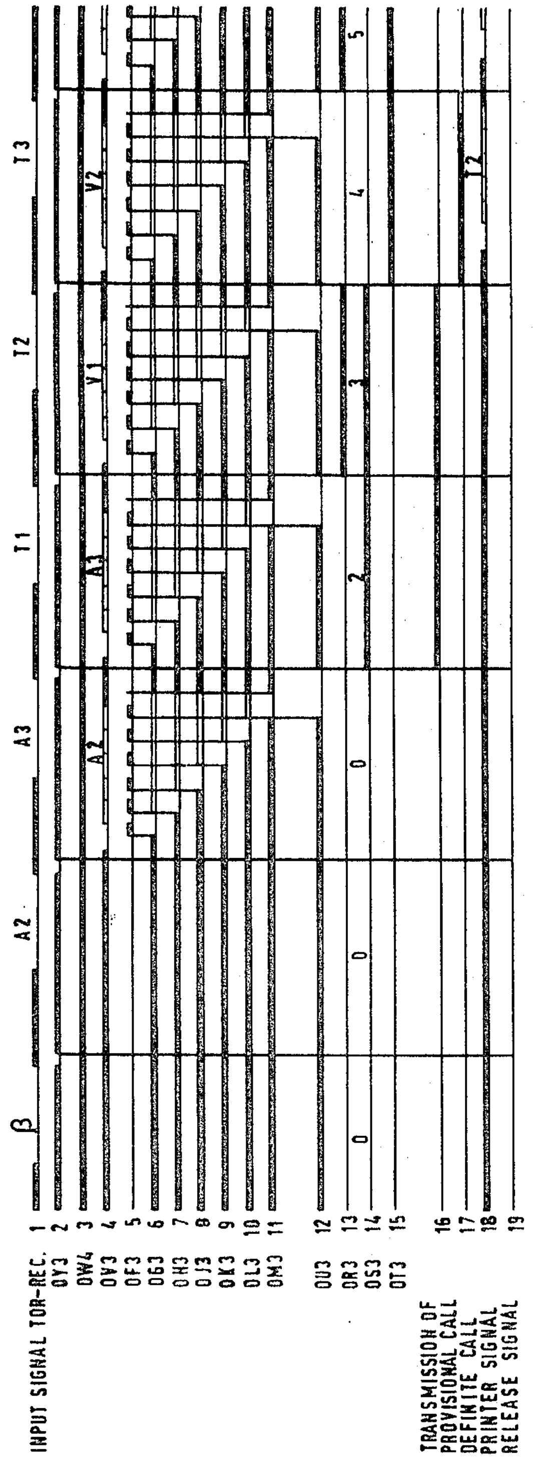
FIG. 32 represents mutilation of the first of three address signals into an idle time signal.

Referring lastly to the time diagram shown in FIG. 32, this diagram indicates what happens if the first of the address signals (A1) is mutilated into a β signal. In this case, the second and the third address signals (A2) and (A3) and the first traffic signal (T1) are regarded as the first, second and third address signals, and therefore the first traffic signal (T1) which is considered as the third address signal, is lost in the comparator circuit of the address processor AV in FIG. 24. However, this occurs very rarely and such a loss is usually not serious.

While there is described above the principles of this invention in connection with specific apparatus, it is to be clearly understood that the description is made only by way of example and not as limitation to the scope of this invention.

We claim:

1. In a multi-channel telecommunication system for multi-element binary code signals between at least two stations (A and B), a system for automatically switching from one channel to another when said one channel comes to a predetermined inefficiency criterion;

each of said channels having an automatic error correction device (ARQ), a transmitting part, and a receiving part at each station, a plurality of connecting circuits (TEX-panels) at each station for subscribers to said channels, each connecting circuit having a transmitting part and receiving part, said automatic switching system comprising:

(a) a transmitting programming circuit (TPC) connected to each transmitting part of each said connecting circuit, (b) separate first selecting switch means (ST) connected to and controlled by each said transmitting programming circuit for connecting each said transmitting programming circuit at one station with any one of said transmitting parts of all said channels at said one station, (c) a receiving programming circuit (RPC) connected to each receiving part of each said channel, (d) separate second selecting switch means (SR) connected to and controlled by each said receiving programming circuit for connecting each said receiving programming circuit at one station with any one of said receiving parts of all said connecting circuits at said one station, and (e) separate efficiency testing means (EO) connected between said receiving part of each channel at said one station and said first selecting means of all of said transmitting programming circuits, whereby the efficiency of each channel can be determined by each said transmitting programming circuit before selection of a channel is made.

2. A system according to claim 1 wherein said first and second selecting switch means comprise mechanical selecting switches.

3. A system according to claim 1 wherein said first and second selecting switch means comprise electronic selecting switches.

4. A system according to claim 1 wherein said first and second selecting switch means comprises time-division electronic switching means (PPD, PPS).

5. A system according to claim 1 wherein said multi-element code signals are telegraphic code signals, said channels are ARQ-channels (TOR), and said connecting circuits are telex-panels (TEX).

6. A system according to claim 1 wherein said multi-element code signals are modulated telephone signals.

7. A system according to claim 1 wherein said transmitting programming circuit includes means (ADG–FIG. 18*a*) for generating an address corresponding to the connecting circuit at the remote station.

8. A system according to claim 1 wherein said programming circuit includes a pulse generator means (CPG–FIG. 7+) for generating phase time dividing pulses according to a binary counter means (PPD).

9. A system according to claim 8 wherein said binary counter means includes means (PV–FIG. 17) for forming an address in said transmitting programming circuit.

10. A system according to claim 8 wherein said transmitting programming circuit includes an allotter (TCA–FIGS. 11, 11′) connected to said pulse generating means for allotting each phase of the pulses to different connecting circuits and to different channels.

11. A system according to claim 10 wherein said receiving programming circuit includes an address processing means (AV–FIG. 24) for comparing the binary code number of the address with the phase number of the pulses from the pulse generating means.

12. A system according to claim 8 wherein said efficiency testing means includes means (TBT–FIG. 13) to determine a given time period by counting a number of phase pulses from said generator means, means (S1) for adjusting said number, and means (EO–NK–NQ–FIG. 15) for counting the numbers of errors received in the automatic correction system during a given period of time counted by said phase pulses.

13. A system according to claim 12 wherein said number adjusting means includes means (G30, G31–FIG. 15) for automatically decreasing the number of said errors during said given time, thereby increasing the efficiency required for producing an efficient channel after the channel has once been determined to be inefficient.

14. A system according to claim 1 wherein said transmitting programming circuit includes means (TCA–FIGS. 11, 11′ and AAC–FIG. 17) for selecting an available and efficient channel circuit at said station.

15. A system according to claim 14 wherein said programming means also includes means (DC, DB–FIG. 11′) for transmitting a signal over an efficient channel to the remote station to indicate that another channel has become inefficient and should be released by the connecting circuit at said remote station.

16. In a multi-channel telecommunication system for multi-element binary code signals between at least two stations (A and B), a system for automatically switching from one channel to another when said one channel comes to a predetermined inefficiency criterion;

each of said channels (TOR) having at each station;
  an automatic error correction device (RQ),
  a transmitting part, and
  a receiving part, and
a plurality of connecting (TEX-panels) circuits at each station for subscribers to said channel, each connecting circuit having:
  a transmitting part, and
  a receiving part,
said automatic switching system comprising:
  (a) a transmitting programming circuit (TPC) connected to each transmitting part of each said connecting circuit,
  (b) separate first selecting switch mens (ST) connected to and controlled by each said transmitting programming circuit for connecting each said transmitting programming circuit at one station with any one of said transmitting parts of all said channels at said one station via conductors (*a*, *b*, *c*) between said first switch means and each said channel transmitting parts.
  (c) a receiving programming circuit (RCP) connected to each receiving part of each said channel,
  (d) separate second selecting switch means (SR) connected to and controlled by each said receiving programming circuit for connecting (*g*, *h*, *i*) each said receiving programming circuit at one station with any one of said receiving parts of all said connecting circuits at said one station, and
  (e) separate efficiency testing means (EO) connected between said receiving part of each of said channels at said one station and one of said conductors (*d*) to each of said first selecting switch means, whereby the efficiency of each channel can be determined by each said transmitting programming circuit before selection of a channel is made.

17. In a telecommunication system for signals between at least two stations (A, B) for a plurality of information terminals for inputs and outputs connectable to each station, each station comprising:
  *n* simplex adapter circuits (TEX-panels) each connectable to one of said terminals, and each having
    a transmitting part, and
    a receiving part, and
  *m* duplex channel (TOR-) circuits, each connectable to an adapter circuit at the corresponding station, and each having
    a transmitting part, and
    a receiving part
  wherein *m* and *n* are whole numbers more than one, the improvement comprising:
  a switching device between said adapter circuits and said channel circuits at each station for connecting said adapter circuits to said channel circuits, each said switching device comprising:
    (a) *n* programming and address generator means (TPC) each being connected to said transmitting part of one of said adapter circuits, for controlling (TCA) the selection of an available and efficient channel circuit in response to a call by a terminal connected to its associated adapter circuit and for the generation (ADG) of an address signal of that adapter circuit at the remote called station that corresponds to said adapter circuit responsive to said calling terminal,
    (b) *n* first selector means (ST), each being connected to and controlled by one of said programming and address generator means, and each being connected (*a*, *b*,) to all *m* of said transmitting parts of said channel circuits, for connecting said calling adapter circuit to said available and efficient (*d*) channel circuit, and for indicating (*c*) when said channel circuit is occupied,
    (c) *m* address processing means (RPC) each being connected to said receiving part of one of said channel circuits, for controlling (AV, PR′) the connection of said channel circuit to an adapter circuit corresponding to an address signal received from a remote calling station,
    (d) *m* second selector means (SR), each being connected to and controlled by one of said address processing means, and each being connected (*g*, *h*, *i*) to all *n* of said receiving parts of said adapter circuits for connecting the receiving part of a calling channel circuit to the addressed adapter circuit of the called terminal, and
    (e) *m* efficiency testing means (EO), each connected to said receiving part of one of said channel circuits, and (*d*) to all *n* of said first selector means for indicating to all *n* of said programming and address generator means when the efficiency of its corresponding channel circuit is less than a predetermined minimum for good communication.

18. A system according to claim 17 wherein said adapter circuits comprise TEX-panels connected to telegraph telex exchanges.

19. A system according to claim 17 wherein said duplex channel circuits comprise automatic error correction circuits of the ARQ type.

20. A system according to claim 17 wherein said programming and address generating means includes a pulse generator means (CPG–FIG. 7 and PPD) for generating phase time dividing pulses according to a binary counter means.

21. A system according to claim 20 wherein said first selector means includes an allotter means (TCA) connected to said pulse generator means for allotting each phase of the pulses to different panels of different adapter circuits and to different channel circuits according to the binary numbers from said counter means.

22. A system according to claim 21 wherein said address processing means includes means (PR'–FIG. 25) for registering said generated address signals and comparing them with said phase number of the panel to be connected thereto.

23. A system according to claim 20 wherein said efficiency testing means includes two counter circuits (TBT) (CM–CW–FIG. 13), one connected to said pulse generating means for counting out a predetermined period of time, and the other (EO–NK–NQ–FIG. 15) which is connected to said receiving part of said channel circuit for counting the number of repeated signals during said predetermined period of time.

24. A system according to claim 23 including means (G30, G31–FIG. 15) for changing the predetermined minimum in response to the reaching of said predetermined minimum so that the channel will not be available until a higher degree of efficiency has been tested thereon by said efficiency testing means.

25. A system according to claim 17 wherein said programming and address generator means (NOR–gate GC) includes means (DC, DD–FIG. 11') for automatically selecting another available and efficient channel when a channel over which a message is being sent has been tested by said efficiency testing means to be less than the predetermined minimum for good communication.

26. A system according to claim 25 wherein said programming and address generator means includes means (DC, DD, 280–FIG. 11') for interrupting an occupied and efficient channel, when at least one channel remains unoccupied and efficient and all the remaining channels are inefficient, for closing the connection of a called adapter circuit which has been automatically disconnected because its channel has become inefficient.

27. A system according to claim 17 wherein said programming and address generator means includes means for interrupting (DC, DD, 280–FIG. 11') an occupied and efficient channel, when at least one channel is occupied and efficient and all the remaining channels are inefficient, for closing the connection of a calling adapter circuit for which there is no available and efficient channel.

28. In a multi-two-way channel multi-subscriber telecommunication system, means for selecting one of a plurality of automatic error (ARQ) correcting (TOR) channels between two stations (A and B) for one of a plurality of one-way traffic circuits (TEX) for multi-element signals via a corresponding plurality of subscriber exchange connected panels, each channel and each panel having a transmitting part and a receiving part, said selecting means comprising: a switching device between said panels and channels at each station, said switching device comprising:

(a) a pulse phase means (CPG and PPD) time dividing and the connections of said panels with said channels,
(b) means (TCA) for each panel connected to said time dividing means for determining which channels are occupied,
(c) means (EO) connected to the receiving part of each channel for testing the efficiency of said channels,
(d) means (AAC) connected to the transmitting part of each panel responsive to the initiation of a call from that panel,
(e) means (TCA, PR, PV) connected to said call initiation means, to said channel occupied determining means, and to said channel efficiency testing means, to select an available and efficient channel for said call,
(f) means (ADG) for each panel connected to said call initiation means and to said channel selecting means for generating an address signal equal to the phase number of that panel,
(g) means (PZ) for each panel connected to said address generating means for sending three of said address signals over said selected channel,
(h) means (AV) at said other station connected to said selected channel, responsive to the receipt of said address signal for selecting the correspondingly numbered panel at said other station,
(i) means (PO) connected to said panel selecting means for definitely connecting said selected panel to said selected channel during the entire transmission of said call over said selected channel,
(j) means (ZE–AAC) connected to said call initiating means for releasing said selected channel when the call is completed to make said channel available for other calls,
(k) means (GC–TCA) connected to said channel efficiency testing means and said channel selecting means for automatically releasing said selected channel and selecting another available and efficient channel when the efficiency of said selected channel has fallen below a predetermined minimum, and
(l) means (280–DC, DD) connected to said automatic channel releasing means for effecting a channel release in order to transmit over it a signal indicating to the other station of the release of an inefficient channel in the event there is no other available channel for communicating said release.

29. In a multi-channel telecommunication system for multi-element signals between two stations (A and B), each station having (a) a plurality of automatic error (ARQ) correcting two-way duplex channels for said signals, and
(b) a plurality of adapters (TEX) connected to an exchange which serves a plurality of output and input terminals which send and receive messages by said signals, and each channel and each adapter having a transmitting part and a receiving part the improvement comprising a switching device between said adapters and said channels at each station, said switching device comprising:

(A) means (CPG) for generating time dividing pulses for controlling said device including:
  (1) means for generating phase (PPD) divisions according to a binary code of numbers, whereby the phase number can be used as an address signal for correspondingly phased adapter receiving part, and
  (2) means for phasing (PPS) said signals according to different numbered ones of said adapter receiving parts and said channel transmitting part;
(B) means (EO) connected to the receiving part of each channel, and to the pulse generating means, for testing the efficiency of said channels, including:
  (1) means (NK–NQ–FIG. 15) for counting the number of signals which are repeated because of errors during the predetermined period of time,
  (2) counting means (TBT–FIG. 13) connected to said pulse generating means for determining said period of time,
  (3) (G30, G31) connected to said signal counting means for changing said period of time as desired when the number of predetermined repetitions of said signals have been counted within said period of time,
  (4) means (NR3) connected to said pulse generating means for resetting said signal counting means when the number of repetitions counted in said period of time have not reached the predetermined amount, and
  (5) means (CZA, CZB) for delaying the disconnection of an inefficient channel for up to a predetermined time in order to try to empty the memory circuit of said channel,
(C) means (TCA–TPC) connected to said pulse generating means, to said adapter transmitting part, and to said efficiency testing means, for selecting an available and efficient channel for connection to an adapter having a message from an output terminal to be sent to another input terminal for said message, including:

(1) means (GA) for determining which channels are available for said connection, (2) means (143–TN12) for determining the efficiency of each channel, (3) means (G13, 149) for blocking said connection to all occupied channels and to all inefficient channels, (4) means (GC) for changing the selection of another available and efficient channel when the channel selector becomes inefficient during the sending of a message, and (5) means (DC, DD) for interrupting a connection when at least one channel is occupied and all the remaining channels are inefficient, for closing the connection of the adapter output terminal for which there is now no available and efficient channel, (D) means (AAC) responsive to an output terminal connected to said adapter transmitting part, to said selecting means, and to said pulse generating means for connecting said channel transmitting part to said selected available and efficient channel transmitting part including:

(1) means (PR) for passing signals from said adapter output terminal during the pulse corresponding to said selected channel, (2) means (ADG) for generating an address signal, corresponding in phase to the number of said adapter of said output terminal, (3) means (ZE) for indicating the presence and absence of traffic signals to said connection from said adapter output terminal, (4) means (PZ–ZH, ZJ) for indicating the termination of traffic signals from said adapter output terminal, and (5) means (ZK, ZL, ZM) for repeating said address, absence-of-traffic signals, and termination indication signals; and (E) means (RPC) connected to said channel receiving part and to said pulse generating means, for connecting said selected channel receiving part to said addressed adapter receiving part, including:

(1) means (AV) for registering signals received over said channel, (2) means (PO) for counting the number of address signals received, (3) means (PV′) for comparing at least two of said received address signals.

(4) means (PP11, TP, YB) for temporarily reserving an adapter receiving part in response to a first received address signal corresponding to the pulse phase number of said adapter, (5) means (PP13, TR, YC) for definitely occupying an adapter receiving part in response to at least two identically received address signals, (6) means (OG, PP10) for passing traffic, absence-of-traffic indicating signals, and call termination indicating signals from said channel to said addressed adapter corresponding to the adapter of the called terminal, (7) means (CPO) for counting said absence-of-traffic indicating signals for disconnecting said channels from said addressed adapter, and (8) means (NT) for simulating an interruption of said connections when said channel is occupied and no other channels are available and efficient for giving a disconnecting indication for the input terminal for which there is now no available and efficient channel.

30. A system according to claim 1 including delay means to indicate unavailability of any said channel for one of said connecting circuits when all of said channels are inefficient.

References Cited

UNITED STATES PATENTS 3,042,752 7/1962 Fulmer.

RALPH D. BLAKESLEE, Primary Examiner

U.S. Cl. X.R.

179—170, 175.21

PO-1050
(5/69)

UNITED STATES PATENT OFFICE
CERTIFICATE OF CORRECTION

Patent No. 3,457,373 Dated July 22, 1969

Inventor(s) Hendrik Cornelis Anthony van Duuren, Herman da Silva, and Wilhelm Frederik Brok It is certified that error appears in the above-identified patent and that said Letters Patent are hereby corrected as shown below:

Column 7, line 26, "15" should read --25--; line 70, "II" should read --III--. Column 10, line 52, "dock" should read --block--. Column 19, line 38, after "that", insert --at--; line 67, after "at", insert --at--. Column 21, line 54, "II" should read --III--. Column 23, line 51 should be read after line 48; line 57, after "B" insert --signals--. Column 24, line 20, after "signals", second occurrence, insert --)--; line 63, "of", first occurrence, should read --to--. Column 25, line 25, "12b" should read --12b'--; line 71, "connecting" should read --connection--. Column 28, line 28, after "Figs." insert --22--. Column 35, line 28, after "pulse", insert --P--. Column 41, line 31, "unoccupied" should read --occupied--. Column 42, line 57, after "(3)", insert --means--. Column 43, line 27, after "pulse" insert --phase--.

SIGNED AND SEALED
APR 28 1970

(SEAL)
Attest:

Edward M. Fletcher, Jr.
Attesting Officer

WILLIAM E. SCHUYLER, JR.
Commissioner of Patents